US007903280B2

(12) United States Patent
Yazawa et al.

(10) Patent No.: US 7,903,280 B2
(45) Date of Patent: Mar. 8, 2011

(54) INK JET PRINTING APPARATUS AND PRINTING METHOD

(75) Inventors: Takeshi Yazawa, Yokohama (JP); Hitoshi Nishikori, Inagi (JP); Daisaku Ide, Tokyo (JP); Jun Yasutani, Kawasaki (JP); Hirokazu Kameda, Kawasaki (JP); Manabu Kanazawa, Yokohama (JP); Fumiko Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 963 days.

(21) Appl. No.: 11/750,619

(22) Filed: May 18, 2007

(65) Prior Publication Data
US 2007/0273899 A1    Nov. 29, 2007

(30) Foreign Application Priority Data
May 26, 2006    (JP) ................... 2006-147291

(51) Int. Cl.
*G06F 15/00* (2006.01)
*B41J 2/21* (2006.01)
(52) U.S. Cl. .......................... 358/1.8; 347/43
(58) Field of Classification Search ............ 358/1.8, 358/1.15, 1.13, 1.14, 1.1, 1.9, 503, 505, 1.4; 347/43, 40, 72, 76, 248; 400/61, 72, 76, 400/124.1, 470, 120.02
See application file for complete search history.

(56) References Cited

U.S. PATENT DOCUMENTS

| | | | |
|---|---|---|---|
| 6,260,938 B1 | 7/2001 | Ohtsuka et al. | |
| 6,352,327 B1 | 3/2002 | Yano et al. | |
| 6,533,393 B1 * | 3/2003 | Meyer et al. | 347/43 |
| 6,543,892 B2 | 4/2003 | Kubota et al. | |
| 6,764,154 B2 | 7/2004 | Nishikori et al. | |
| 7,287,830 B2 | 10/2007 | Ide et al. | |
| 2003/0193532 A1 | 10/2003 | Moriyama et al. | |
| 2005/0035995 A1 | 2/2005 | Yazawa et al. | |
| 2005/0168495 A1 | 8/2005 | Nakatani et al. | |
| 2007/0273720 A1 | 11/2007 | Yasutani et al. | |
| 2008/0079765 A1 | 4/2008 | Takamiya et al. | |

FOREIGN PATENT DOCUMENTS

| | | |
|---|---|---|
| JP | 8-150735 | 6/1996 |
| JP | 2000-177150 | 6/2000 |
| JP | 2003-305836 | 10/2003 |
| JP | 2005-238835 | 9/2005 |

* cited by examiner

Primary Examiner — Saeid Ebrahimi Dehkordy
(74) Attorney, Agent, or Firm — Fitzpatrick, Cella, Harper & Scinto

(57) ABSTRACT

By suppressing deviation of dot-formation positions stemming from insufficient accuracy in conveying a printing medium due to eccentricity of a conveying roller, a printed image in which unevenness is less visible is obtained. An accumulated amount of conveyance errors is reduced by narrowing a nozzle-use range and by reducing a conveyance amount over an entire printing region according to the number of colors to be used and desired printing quality in printing an image. Moreover, the nozzles used when the nozzle-use range is narrowed are not fixed, and are switched to be used as appropriate. This prevents only certain nozzles from being used concentratedly, and allows all of the nozzles to maintain substantially the same ejection performance.

12 Claims, 47 Drawing Sheets

CYCLE OF ONE
REVOLUTION OF
CONVEYING ROLLER

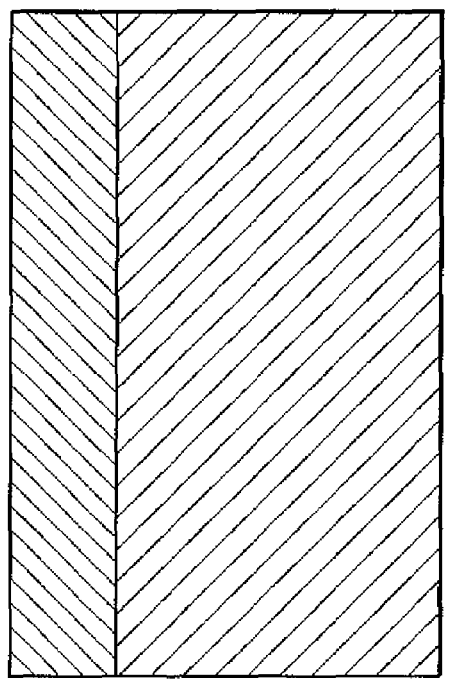
FIG.29A
FIG.29B
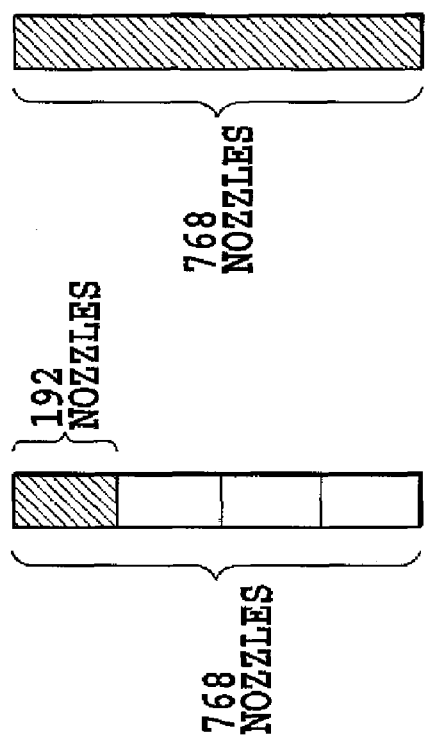
FIG.29C

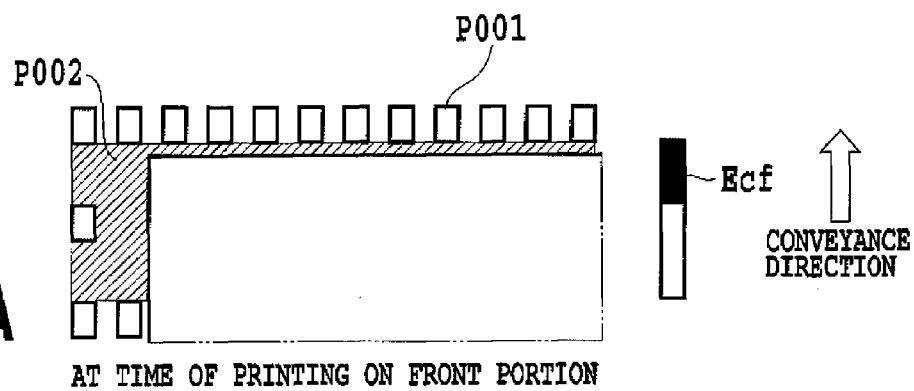
FIG.34A  AT TIME OF PRINTING ON FRONT PORTION
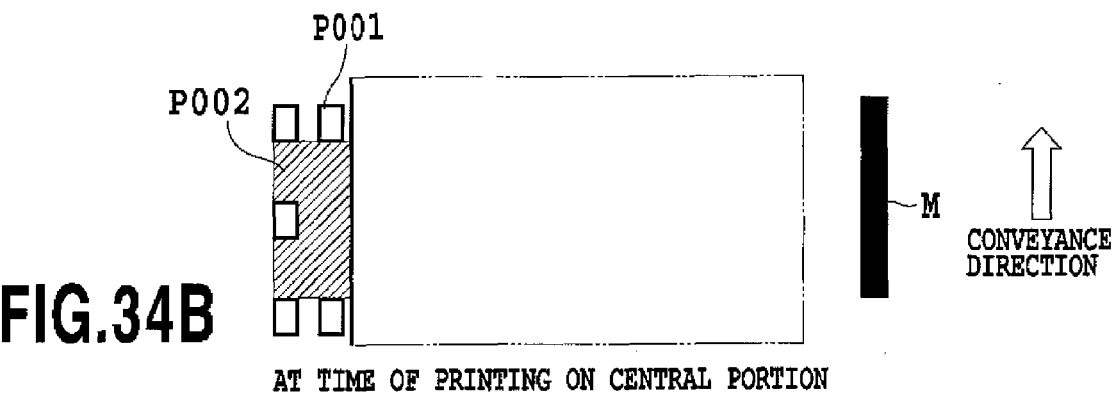
FIG.34B  AT TIME OF PRINTING ON CENTRAL PORTION
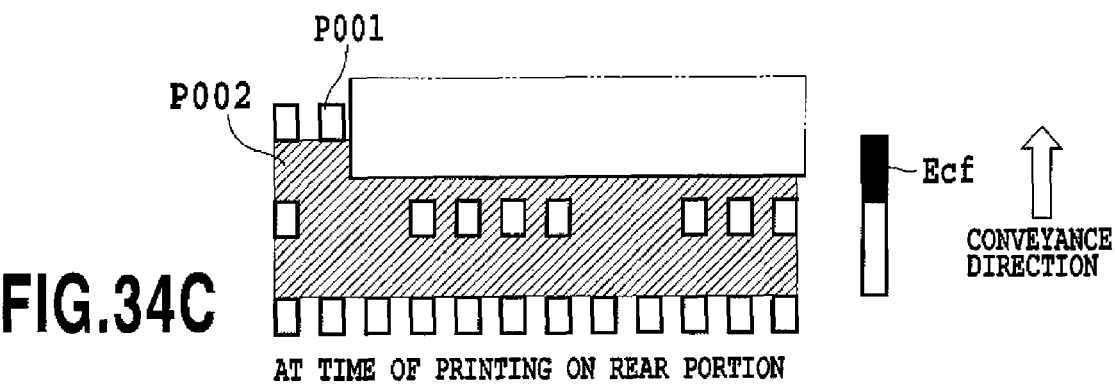
FIG.34C  AT TIME OF PRINTING ON REAR PORTION

CONVEYANCE
DIRECTION

PRINT SCAN
AT REAR-EDGE
SEPARATION TIME

CONVEYANCE
DIRECTION

| C | M | Y | K | LC | LM | R | G | MBk | PBk | Gray |
|---|---|---|---|---|---|---|---|---|---|---|
| $2.7 \times 10^8$ | $2.7 \times 10^8$ | $2.7 \times 10^8$ | $2.7 \times 10^8$ | $2.7 \times 10^8$ | $2.7 \times 10^8$ | $2.7 \times 10^8$ | $2.7 \times 10^8$ | $2.7 \times 10^8$ | $2.7 \times 10^8$ | $2.7 \times 10^8$ |

FIG. 43

INK JET PRINTING APPARATUS AND PRINTING METHOD

BACKGROUND OF THE INVENTION

1. Field of the Invention

The present invention relates to an ink jet printing apparatus and a printing method for applying ink as a printing agent to a printing medium to form an image.

2. Description of the Related Art

In these days, OA (Office Automation) equipment such as personal computers and word processors have come into wide use, and various printing apparatuses have been provided to print information outputted from this equipment on different types of printing media. An ink jet printer using ink as a printing agent is one of such printing apparatuses. In general, the printing apparatus capable of printing color images applies printing agents of three colors including cyan (C), magenta (M) and yellow (Y) or of four colors including black (K) in addition to the above three colors onto a printing medium, and thereby forms an image with various colors expressed by subtractive color mixing.

However, in recent years, with a widespread use of digital cameras, there is also a need for an image quality comparable to that of silver-salt photographs even with an ink jet printing apparatus capable of easily outputting a shot image onto a printing medium such as paper. To this end, there is an ink-jet printing apparatus which is designed for enhancing image quality of print results of color-photo-like images, by printing with low-density inks of a light cyan (Lc) and a light magenta (Lm) in addition to the above ink of four colors.

Recently, single-lens reflex type digital cameras are marketed at relatively low prices, and ink jet printing apparatuses are therefore used for printing monochrome images as well as color-photo-like images. Even when printing a monochrome image, chromatic inks are used for correcting color tone, in addition to a black ink that serves as a basic tone of the monochrome image.

When forming images, print is made on the basis of a signal value that specifies an applied amount of a printing agent of each color. However, even if the applied amounts of printing agents of the respective colors are specified on the basis of these signal values to obtain desired colors, the desired colors cannot be faithfully reproduced in many cases. For example, when sizes of dots formed on a printing medium with the respective printing agents are different, even slightly, from one another, colors in a printed image composed of the collection of these dots may be observed as being slightly different from intended colors.

The above condition may occur in an ink jet printer, due to a phenomenon in which an individual difference among printing heads results in a slight difference among the amounts (volumes) of ink droplets ejected respectively from printing heads, for example. In an electro-photographic printer, the above condition may occur due to a slight difference among sizes of dots in a latent image formed on a photosensitive material. Moreover, the slight difference among dot sizes may also occur due to a relationship between a type of printing medium to be used and characteristics of printing agents such as ink and toner. Furthermore, the size of dots to be formed may also be changed due to the change of these printing apparatuses (also of the printing head in a case of the ink jet printer) over time.

In many image-forming apparatus, such a phenomenon may occur in which a color reproduced in an actual printed image is different from a color intended in a color space. In the present specification, such a phenomenon is referred to as "color deviation."

The color deviation is noticeably observed when monochrome images, for example, achromatic images, are formed. When forming such achromatic images, only three color inks of C, M and Y or of Lc, Lm and Y are conventionally used particularly in a low-density region (a gray region).

FIG. 44 shows the content of a conventional color conversion look-up table (LUT) in a case where six colors (K, C, M, Lm and Lc) are used to express a gray line (achromatic line) of which color ranges from white to black. Here, the horizontal axis indicates a range of colors from white (W) represented by (R, G, B)=(0, 0, 0) to black (K) represented by (R, G, B)=(255, 255, 255), and the vertical axis corresponds to a density signal of each color to be outputted. As shown in FIG. 44, three color inks of Lc, Lm and Y are used to express gray in the low density region. Dots are formed discretely in a process where density is gradually increased from low to high. Consequently, ink having lower density is used to reduce granular impression that may be visually recognized when dots having relatively high reflection density scatter in a background region having relatively low reflection density. In a vicinity of an intermediate density region, outputted values for using inks of Lm and Lc approximate the respective maximum values, and it becomes difficult to express higher color density only by combining these inks. On the other hand, in this density region, granular impression due to single dots is made less recognizable since the printing medium is filled with many dots. Accordingly, by gradually adding inks of C, M and K from the vicinity of the intermediate density region, it is possible to increase density with reduced granular impression. Concurrently, outputted values for inks of Lc, Lm and Y are gradually reduced. Finally, the outputted value for ink K is set higher than values of the other inks, and thereby an achromatic image having a good tone characteristic can be expressed.

However, particularly in the low-density region, only three color inks of Lc, Lm and Y are used to express the low-density region (gray). For this reason, even a slight change in an applied amount of a printing agent of each color results in a relatively great change in hue due to an imbalance among the amounts of printing agents of these three colors. This makes it difficult to adjust the printing agents or the color materials thereof. Moreover, even a slight change in the sizes of formed dots due to a slight change in the applied amounts results in a relatively large change in colors. This means that, particularly in the gray region, a chromatic color is added to an achromatic color which is originally intended to be printed. As a result, color deviation is noticeably observed.

Japanese Patent Laid-Open No. 2005-238835 discloses a color-conversion LUT different from the above LUT.

FIG. 45 shows the content of the color-conversion LUT described in Japanese Patent Laid-Open No. 2005-238835. Ink K is used in all of the regions including from the low density region to the high density region, and the outputted value for the ink K is maintained higher than those for the other color inks. The amount of ink K increases monotonously, and the ink K, which is an achromatic color, is used in all of the density regions defined by image data in order to print an achromatic image. This makes it possible to prevent color deviation that may occur due to a slight imbalance among the amounts of inks of the respective colors in a case of expressing a monochrome image by using the chromatic inks. In other words, although the chromatic inks are also used together with ink K in the low-density region, the chromatic inks do not have a function of reducing granular impression or a function as basic colors for forming gray while balancing with each other. The outputted value of the chromatic ink merely increases monotonously even when the density changes.

An achromatic ink (gray ink, and the like.) different from ink K in density is sometimes used in place of a plurality of chromatic inks (for example, see Japanese Patent Laid-Open No. 2000-177150). That is, use of gray or black in all of the density regions can prevent color deviation in the same way as that disclosed in Japanese Patent Laid-Open No. 2005-238835.

On the other hand, use of the achromatic ink from the point in the low-density region may worsen granular impression. However, printing heads, of which amount of ejected ink per dot is sufficiently small, have recently been developed. In a case where a printing head of this kind is used, formed dots are hardly noticeable at a distance of distinct vision. For this reason, the color deviation, rather than granular impression, has an adverse effect on an image. Hence, it is effective to apply the technique disclosed in Japanese Patent Laid-Open No. 2000-177150 or No. 2005-238835.

As mentioned above, in a case where the monochrome image is formed, a large effect on the "color deviation" is demonstrated when an ink K is dominantly used from the low-density region. However, from a study on printed results of monochrome images with various densities, the present inventors have discovered that an adverse effect on the image was increased in the wide density range, due to deviation in dot-formation positions.

FIG. 46A is a schematic view showing dot arrangement in a case where an image having uniform density is printed by using an ink K dominantly. FIG. 46B is a schematic view showing dot arrangement in a case where an image having uniform density is printed by using three inks C, M and Y. Each of 46A and 46B shows a state in which dots are arranged without deviation in dot-formation positions. In other words, in both of FIGS. 46A and 47B, dots are uniformly arranged, and no granular impression occurs on the image.

Each of FIGS. 47A and 47B shows a dot arrangement in a case where the deviation in dot-formation positions occurs at the time when the same image as that in FIG. 46A or 46B is formed. As is clear from FIG. 47A, in a case where the ink K is dominantly used, the number of dots forming the image is small, that is, the coverage is low. For this reason, the amount of the ink to be applied to the printing medium is obviously less than that in a case of using the three color inks C, M and Y. Accordingly, it is apparent that the deviation in dot-formation positions is conspicuous, and that the deviation largely influences an appearance of the image, as compared with a case where the deviation in dot-formation positions occurs when the three color inks C, M and Y are used (FIG. 47B).

The deviation in dot-formation positions is caused by various factors such as: noise components including variations in nozzle shapes of the printing heads, and vibrations of the apparatus at the time of a print operation; and a distance between the printing medium and the printing head. The present inventors have recognized that one of the significant factors for the deviation in dot-formation positions was accuracy in conveying the printing medium. Normally, a roller (a conveying roller) is used as a conveyance mechanism for conveying a printing medium, and the conveying roller is rotated by the amount corresponding to a designated angle, with the printing medium pressed thereagainst. Thereby, the printing medium can be conveyed by the amount corresponding to a desired length. Accuracy in conveying a printing medium is determined with accuracy in stopping the conveying roller, eccentricity of the conveying roller, and the amount of slippage between the printing medium and the conveying roller.

The eccentricity of the conveying roller indicates a state in which the rotation axis of the conveying roller is shifted from the central axis thereof, and is a major cause of the deviation in dot-formation positions. The conveying roller is usually manufactured by controlling the amount of its eccentricity within a fixed amount. However, the stricter standard for the amount of eccentricity causes a yield reduction of the conveying roller, and thereby manufacturing costs for the printing apparatus increases. For this reason, it is not favorable that the standard for the amount of eccentricity be made too strict.

However, the eccentricity in the conveying roller causes a difference in the amount of conveyance of a printing medium even when the conveying roller rotates at the same rotation angle, and this makes it impossible to convey a desired amount of the printing medium. Specifically, when the difference is caused in the amount of conveyance, dots are formed in positions shifted from originally-intended positions along the conveyance direction of the printing medium. For this reason, dots are formed sparsely in some positions and densely in other positions. As a result, unevenness (hereinafter referred to as eccentricity-derived unevenness) occurs with a cycle corresponding to the amount of conveyance which is equivalent to one revolution of the conveying roller.

It is easy to visually recognize the eccentricity-derived unevenness particularly when a monochrome image is formed by using an ink K dominantly. In a case of such a monochrome image, since dots of the ink K are dominantly present on a white printing medium, the contrast therebetween is higher than that of dots of chromatic inks. Accordingly, in portions (white lines extending in the main scanning direction) where dots are locally sparse due to the deviation of dot-formation positions resulted from eccentric rotations of the conveying roller, color of the printing medium itself is more likely to be seen for the same reason as that explained in FIG. 47A. Thereby, a strong contrast appears between the white lines and portions (black lines extending in the main scanning direction) where dots are locally dense. As a result, this contrast is visually recognized easily as eccentricity-derived unevenness which appears periodically in the direction of conveying the printing medium.

As mentioned above, the eccentricity-derived unevenness is markedly noticeable when an achromatic monochrome image is printed by using an ink K dominantly. However, the eccentricity-derived unevenness is primarily caused by eccentricity of a conveying roller. Accordingly, even in a case of printing a monochrome image by using inks of other colors dominantly, or in a case of printing an image in which the coverage of a printing medium is low due to only a small number of ink colors to be used, the eccentricity-derived unevenness occurs with a greater or lesser degree of visibility.

Moreover, even when the color image is printed, the eccentricity-derived unevenness occurs in a greater or lesser degree of visibility.

Most of recent printing apparatuses including those using the ink jet printing method allow a user to perform various selection settings for printing. For example, many printing apparatuses are provided with a structure allowing a user to select a type of printing medium, and to select a printing mode in which a printing speed is prioritized over printing quality or a printing mode in which the printing quality is prioritized over the printing speed. Normally, such a selection is set by using a setting screen displayed on a display of a host computer connected to the printing apparatus or by using a display screen of a display device prepared in the printing apparatus.

It can be said that the user generally wishes images of high quality to be printed in a case where the higher-quality printing medium is selected, and where a mode for higher-quality printing is selected. Accordingly, in the aforementioned cases, it is strongly desired that the eccentricity-derived unevenness be suppressed as much as possible.

SUMMARY OF THE INVENTION

In view of the aforementioned circumstances, an object of the present invention is to provide a structure in which it is possible to suppress deviation of dot-formation positions stemming from insufficient conveyance accuracy due to eccentricity of a conveying roller. In particular, an object of the present invention is to obtain a printed image with unevenness being appropriately suppressed according to the number of ink colors to be used for printing an image and a desired printing quality. Moreover, another object of the present invention is to prevent only certain printing elements from being concentratedly used for printing in the structure in which deviation of dot-formation positions stemming from insufficient conveyance accuracy is suppressed.

In a first aspect of the present invention, there is provided an ink jet printing apparatus for printing an image on a printing medium by performing a print scan that makes a print while causing a printing head, which includes arrays of printing elements for ejecting inks of different colors, to scan on a printing medium, and by conveying the printing medium in a direction intersecting with a direction of the print scan, the apparatus comprising:

print controller capable of executing a first printing mode for performing the print scan that makes a print by using a part of the array of printing elements arranged continuously, over an entire print region on the printing medium; and switching unit which switches, in the array of printing elements, the continuously-arranged printing elements used in the first printing mode.

In a second aspect of the present invention, there is provided a method of ink jet printing an image on a printing medium by performing a print scan that makes a print while causing a printing head, which includes arrays of printing elements for ejecting inks of different colors, to scan on a printing medium, and by conveying the printing medium in a direction intersecting with a direction of the print scan, the method comprising the steps of:

executing the print scan, which makes a print by using a part of the array of printing elements arranged continuously, over an entire printing region of the printing medium; and switching the continuously-arranged printing elements used when the print scan is executed, in the array of printing elements.

According to the present invention, it is possible to narrow a range of the nozzles to be used for printing (hereinafter referred to as a "nozzle-use range") or reduce a amount of conveyance over an entire printing region, according to the number of ink colors to be used and a desired printing quality in printing an image. This makes it possible to reduce an accumulated amount of conveyance errors, and to thereby suppress unevenness stemming from deviation of dot-formation positions due to insufficient conveyance accuracy. Moreover, the nozzle-use range is not fixed, and are switched to be used as appropriate. Thereby, a case where only certain printing elements are concentratedly used for printing does not occur, and thus it is made possible to maintain ejection performance which allows substantially equal ejection from all of the printing elements.

Further features of the present invention will become apparent from the following description of exemplary embodiments (with reference to the attached drawings).

BRIEF DESCRIPTION OF THE DRAWINGS

FIG. 27 is an explanatory view showing a setting screen that can be used when setting printing quality, a type of printing medium to be used at the time of printing, and the like;

FIGS. 29A to 29C are schematic views each explaining an influence upon an image in a case where printing is continued with nozzles to be used being restricted;

FIGS. 34A to 34C are schematic views each explaining an operation performed when normal printing is performed in the process in FIG. 33;

FIG. 43 is a schematic view showing an example of a threshold value of a dot count value used in the process in FIG. 42;

DESCRIPTION OF THE EMBODIMENTS

Figure 1:
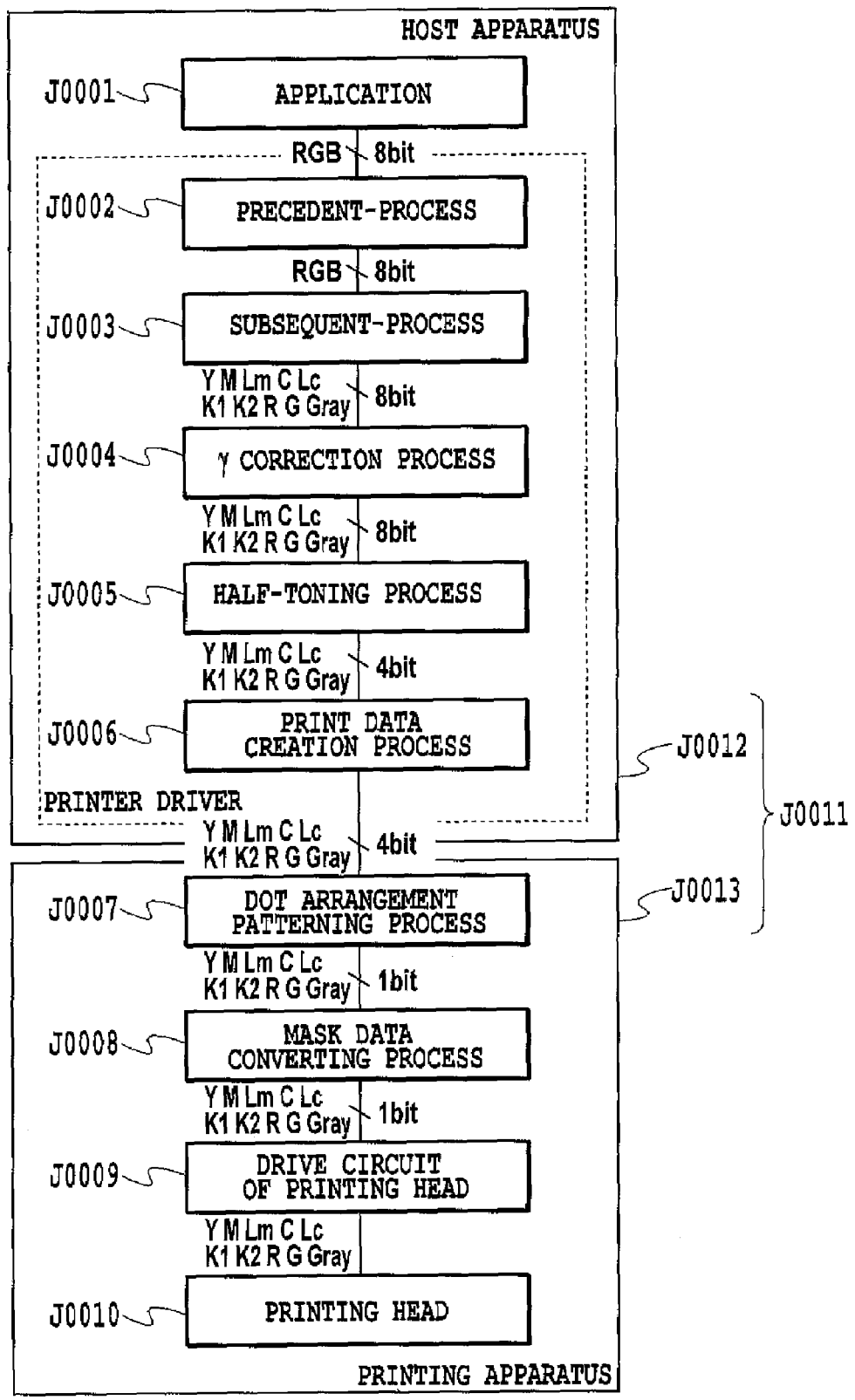
FIG. 1 is a diagram for explaining a flow in which image data are processed in a printing system to which an embodiment of the present invention is applied.

Descriptions will be provided below for embodiments of the present invention by referring to the drawings.

1. Basic Configuration 1.1 Outline of Printing System

FIG. 1 is a diagram for explaining a flow in which image data are processed in a printing system to which an embodiment of the present invention is applied. This printing system J0011 includes a host apparatus J0012 which generates image data indicating an image to be printed, and which sets up a user interface (UI) for generating the data and so on. In addition, the printing system J0011 includes a printing apparatus J0013 which prints an image on a printing medium on the basis of the image data generated by the host apparatus J0012. The printing apparatus J0013 performs a printing operation by use of 10 color inks of cyan (C), light cyan (Lc), magenta (M), light magenta (Lm), yellow (Y), red (R), green (G), black 1 (K1), black 2 (K2) and gray (Gray). To this end, a printing head H1001 for ejecting these 10 color inks is used for the printing apparatus J0013. These 10 color inks are pigmented inks respectively including ten color pigments as the color materials thereof.

Programs operated with an operating system of the host apparatus J0012 include an application and a printer driver. An application J0001 executes a process of generating image data with which the printing apparatus makes a print. Personal computers (PC) are capable of receiving these image data or pre-edited data which is yet to process by use of various media. By means of a CF card, the host apparatus according to this embodiment is capable of populating, for example, JPEG-formatted image data associated with a photo taken with a digital camera. In addition, the host apparatus according to this embodiment is capable of populating, for example, TIFF-formatted image data read with a scanner and image data stored in a CD-ROM. Moreover, the host apparatus according to this embodiment is capable of capturing data from the Web through the Internet. These captured data are displayed on a monitor of the host apparatus. Thus, an edit, a process or the like is applied to these captured data by means of the application J001. Thereby, image data R, G and B are generated, for example, in accordance with the sRGB specification. A user sets up a type of printing medium to be used for making a print, a printing quality and the like through a UI screen displayed on the monitor of the host apparatus. The user also issues a print instruction through the UI screen. Depending on this print instruction, the image data R, G and B are transferred to the printer driver.

The printer driver includes a precedent process J0002, a subsequent process J0003, a γ correction process J0004, a half-toning process J0005 and a print data creation process J0006 as processes performed by itself. Brief descriptions will be provided below for these processes J0002 to J0006.

(A) Precedent Process

The precedent process J0002 performs mapping of a gamut. In this embodiment, data are converted for the purpose of mapping the gamut reproduced by image data R, G and B in accordance with the sRGB specification onto a gamut to be produced by the printing apparatus. Specifically, a respective one of image data R, G and B deal with 256 gradations of the respective one of colors which are represented by 8 bits. These image data R, G and B are respectively converted to 8-bit data R, G and B in the gamut of the printing apparatus J0013 by use of a three-dimensional LUT.

(B) Subsequent Process

On the basis of the 8-bit data R, G and B obtained by mapping the gamut, the subsequent process J0003 obtains 8-bit color separation data on each of the 10 colors. The 8-bit color separation data correspond to a combination of inks which are used for reproducing a color represented by the 8-bit data R, G and B. In other words, the subsequent process J0003 obtains color separation data on each of Y, M, Lm, C, Lc, K1, K2, R, G, and Gray. In this embodiment, like the precedent process, the subsequent process is carried out by using the three dimensional LUT, simultaneously using an interpolating operation.

(C) γ Correction Process

The γ correction J0004 converts the color separation data on each of the 10 colors which have been obtained by the subsequent process J0003 to a tone value (gradation value) representing the color. Specifically, a one-dimensional LUT corresponding to the gradation characteristic of each of the color inks in the printing apparatus J0013 is used, and thereby a conversion is carried so that the color separation data on the 10 colors can be linearly associated with the gradation characteristics of the printer.

(D) Half-toning Process

The half-toning process J0005 quantizes the 8-bit color separation data on each of Y, M, Lm, C, Lc, K1, K2, R, G and Gray to which the γ correction process has been applied so as to convert the 8-bit separation data to 4-bit data. In this embodiment, the 8-bit data dealing with the 256 gradations of each of the 10 colors are converted to 4-bit data dealing with 9 gradations by use of the error diffusion method. The 4-bit data are data which serve as indices each for indicating a dot arrangement pattern in a dot arrangement patterning process in the printing apparatus.

(E) Print Data Creation Process

The last process performed by the printer driver is the print data creation process J0006. This process adds information on print control to data on an image to be printed whose contents are the 4-bit index data, and thus creates print data.

Figure 2:
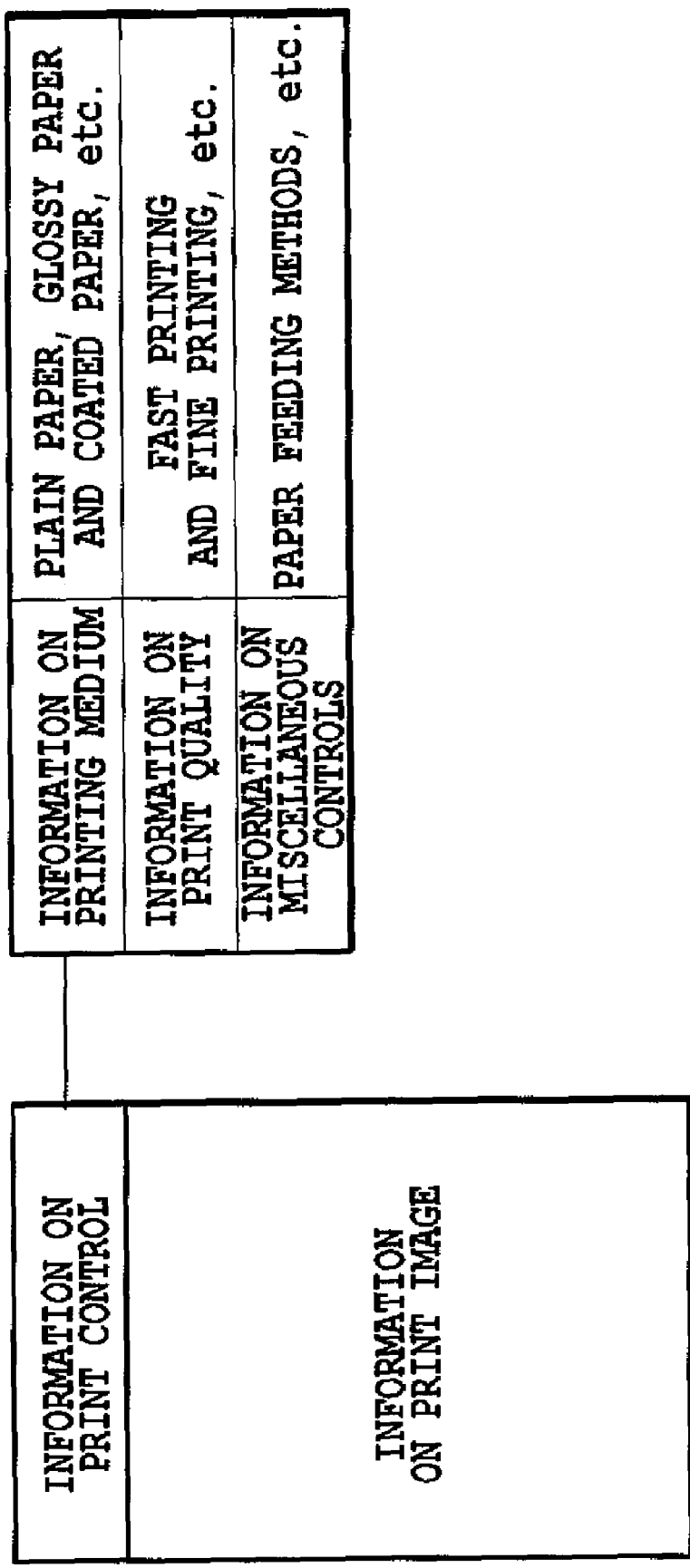
FIG. 2 is an explanatory diagram showing an example of a configuration of print data transferred from a printer driver of a host apparatus to a printing apparatus in the printing system shown in FIG. 1.

FIG. 2 is a diagram showing an example of a configuration of the print data. The print data are configured of the information on print control and the data on an image to be printed. The information on print control is in charge of controlling a printing operation. The data on an image to be printed indicates an image to be printed (the data are the foregoing 4-bit index data). The information on print control is configured of "information on printing medium," "information on print quality," and "information on miscellaneous controls" including information on paper feeding methods or the like. A type of printing media on which to make a print is described in the information on printing medium. One type of printing medium selected out of a group of plain paper, glossy paper, mat paper, a post card, a printable disc and the like is specified in the information on printing medium. Print quality to be sought are described in the information on print quality. One type of print quality selected out of a group of "fine (high-quality print)," "normal," "fast (high-speed print)" and the like is specified in the information on print quality. Note that these pieces of information on print control are formed on the basis of contents which a user designates through the UI screen in the monitor of the host apparatus J0012. This will be described later by referring to FIG. 27. In addition, image data originated in the half-toning process J0005 are described in the data on an image to be printed. The print data thus generated are supplied to the printing apparatus J0013.

The printing apparatus J0013 performs a dot arrangement patterning process J0007 and a mask data converting process J0008 on the print data which have been supplied from the host apparatus J0012. Descriptions will be provided next for the dot arrangement patterning process J0007 and the mask data converting process J0008.

(F) Dot Arrangement Patterning Process

In the above-described half-toning process J0005, the number of gradation levels is reduced from the 256 tone values dealt with by multi-valued tone information (8-bit data) to the 9 tone values dealt with by information (4-bit data). However, data with which the printing apparatus J0013 is actually capable of making a print are binary data (1-bit) data on whether or not an ink dot should be printed. Taken this into consideration, the dot arrangement patterning process J0007 assigns a dot arrangement pattern to each pixel represented by 4-bit data dealing with gradation levels 0 to 8 which are an outputted value from the half-toning process J0005. The dot arrangement pattern corresponds to the tone value (one of the levels 0 to 8) of the pixel. Thereby, whether or not an ink dot should be printed (whether a dot should be on or off) is defined for each of a plurality of areas in each pixel. Thus, 1-bit binary data indicating "1 (one)" or "0 (zero)" are assigned to each of the areas of the pixel. In this respect, "1 (one)" is binary data indicating that a dot should be printed. "0 (zero)" is binary data indicating that a dot should not be printed.

Figure 3:
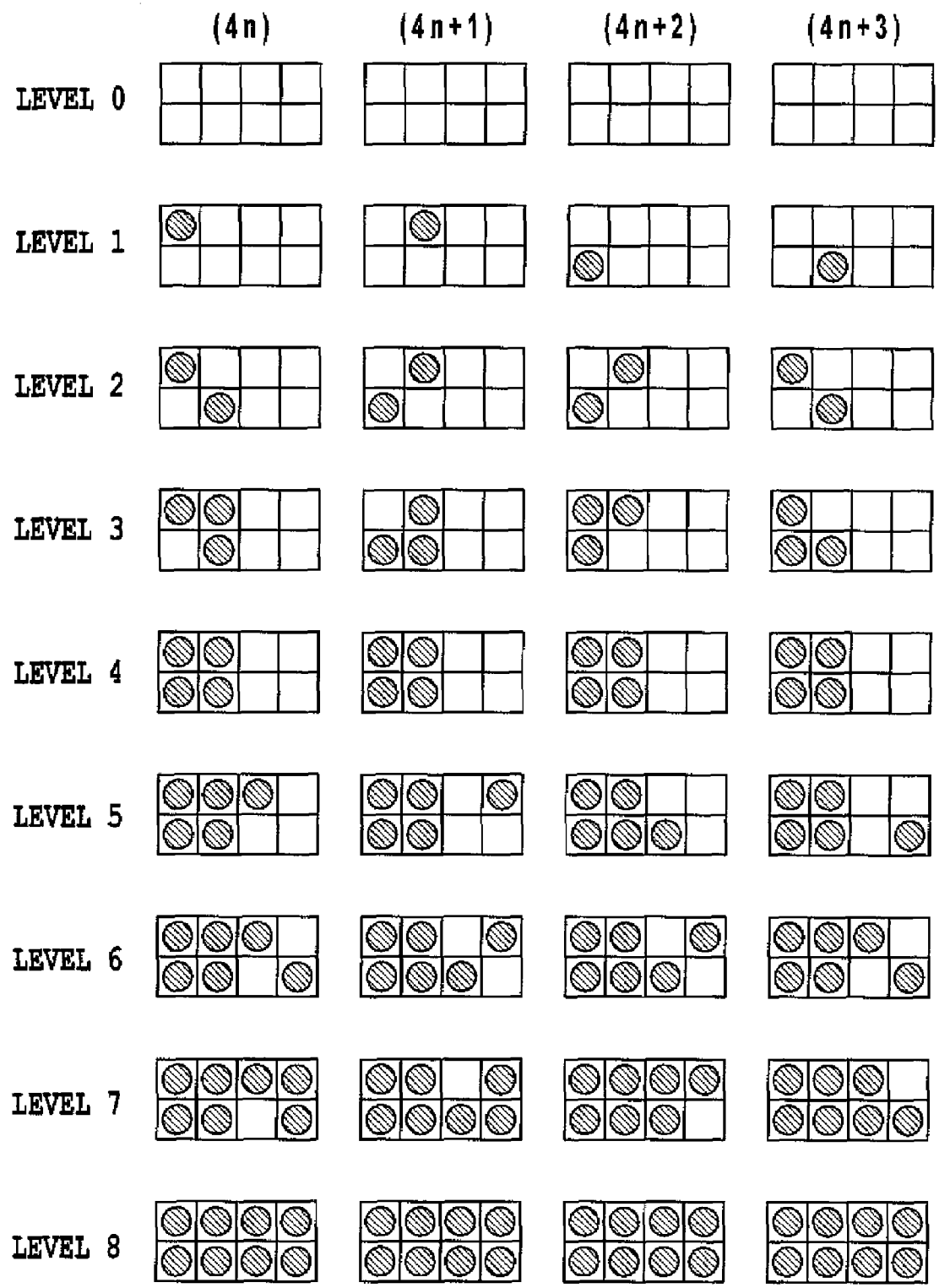
FIG. 3 is a diagram showing output patterns which correspond to input levels, and which are obtained by conversion in a dot arrangement patterning process in the printing apparatus used in the embodiment.

FIG. 3 shows output patterns corresponding to input levels 0 to 8. These output patterns are obtained through the conversion performed in the dot arrangement patterning process of the embodiment. Level numbers in the left column in the diagram correspond respectively to the levels 0 to 8 which are the outputted values from the half-toning process in the host apparatus. Regions each configured of 2 vertical areas×4 horizontal areas are shown to the right of this column. Each of the regions corresponds to a region occupied by one pixel receiving an output from the half-toning process. In addition, each of the areas in one pixel corresponds to a minimum unit for which it is specified whether the dot thereof should be on or off. Note that, in this description, a "pixel" means a minimum unit which is capable of representing a gradation, and also means a minimum unit to which the image processes (the precedent process, the subsequent process, the γ correction process, the half-toning process and the like) are applied using multi-valued data represented by the plurality of bits.

In this figure, an area in which a circle is drawn denotes an area where a dot is printed. As the level number increases, the number of dots to be printed increases one-by-one. In this embodiment, information on density of an original image is finally reflected in this manner.

From the left to the right, (4n) to (4n+3) denotes horizontal positions of pixels, each of which receives data on an image to be printed. An integer not smaller than 1 (one) is substituted for n in the expression (4n) to (4n+3). The patterns listed under the expression indicate that a plurality of mutually-different patterns are available depending on a position where a pixel is located even though the pixel receives an input at the same level. In other words, the configuration is that, even in a case where a pixel receives an input at one level, the four types of dot arrangement patterns under the expression (4n) to (4n+3) at the same level are assigned to the pixel in an alternating manner.

In FIG. 3, the vertical direction is a direction in which the ejection openings of the printing head are arrayed, and the horizontal direction is a direction in which the printing head moves. The configuration enabling a print to be made using the plurality of different dot arrangement patterns for one level brings about the following two effects. First, the number of times that ejection is performed can be equalized between two nozzles in which one nozzle is in charge of the patterns located in the upper row of the dot arrangement patterns at one level, and the other nozzle is in charge of the patterns located in the lower row of the dot arrangement patterns at the same level. Secondly, various noises unique to the printing apparatus can be disaggregated.

When the above-described dot arrangement patterning process is completed, the assignment of dot arrangement patterns to the entire printing medium is completed.

(G) Mask Data Converting Process

In the foregoing dot arrangement patterning process J0007, whether or not a dot should be printed is determined for each of the areas on the printing medium. As a result, if binary data indicating the dot arrangement are inputted to a drive circuit J0009 of the printing head H1001, a desired image can be printed. If the binary data derived from the dot arrangement patterning process J0007 is inputted to the drive circuit J0009 without intervention the mask data converting process J0008, what is termed as a one-pass print can be made. The one-pass print means that a print to be made for a single scan region on a printing medium is completed by the printing head H1001 moving once. On the contrary, if the binary data derived from the dot arrangement patterning process J0007 is inputted to the drive circuit J0009 through the mask data converting process J0008, what is termed as a multi-pass print can be made. The multi-pass print means that a print to be made for a single scan region on the printing medium is completed by the printing head moving a plurality of times. Here, descriptions will be provided for a mask data converting process, taking an example of the multi-pass print.

Figure 4:
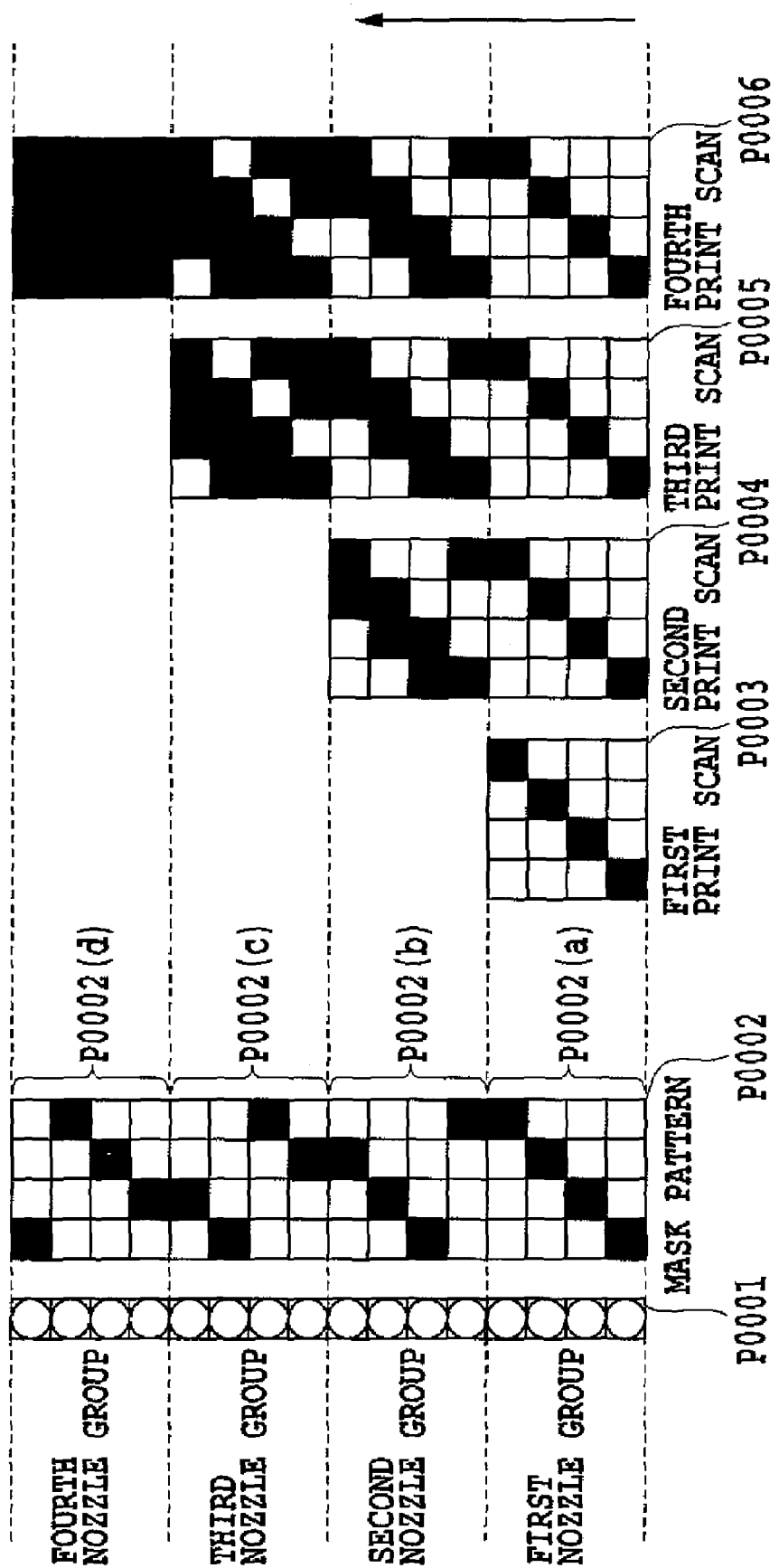
FIG. 4 is a schematic diagram for explaining a multi-pass printing method which is performed by the printing apparatus used in the embodiment.

FIG. 4 is a schematic diagram showing the printing head and print patterns for the purpose of describing the multi-pass printing method. The print head H1001 applied to this embodiment has 768 nozzles per one color, which may be actually involved in printing, and are arranged to allow printing with a density of 1200 dpi (dots/inch). For the sake of convenience, however, descriptions will be provided for the printing head and the print patterns, supposing that the printing head H1001 has 16 nozzles. The nozzles are divided into a first to a fourth nozzle groups. Each of the four nozzle groups includes four nozzles. Mask P0002 are configured of a first to a fourth mask patterns P0002(a) to P0002(d). The first to the fourth mask patterns P0002(a) to P0002(d) define the respective areas in which the first to the fourth nozzle groups are capable of making a print. Blackened areas in the mask patterns indicate printable areas, whereas whitened areas in the mask patterns indicate unprinted areas. The first to the fourth mask patterns are complementary to one another. The configuration is that, when these four mask patterns are superposed over one another, a print to be made in a region corresponding to a 4×4 area is completed.

Patterns denoted by reference numerals P0003 to P0006 show how an image is going to be completed by repeating a print scan. Each time a print scan is completed, the printing medium is transferred by a width of the nozzle group (a width of four nozzles in this figure) in a direction indicated by an arrow in the figure. In other words, the configuration is that an image in any same region (a region corresponding to the width of each nozzle region) on the printing medium is completed by repeating the print scan four times. Formation of an image in any same region on the printing medium by use of multiple nozzle groups by repeating the scan the plurality of times in the afore-mentioned manner makes it possible to bring about an effect of reducing variations characteristic of the nozzles, and an effect of reducing variations in accuracy in transferring the printing medium.

Figure 5:
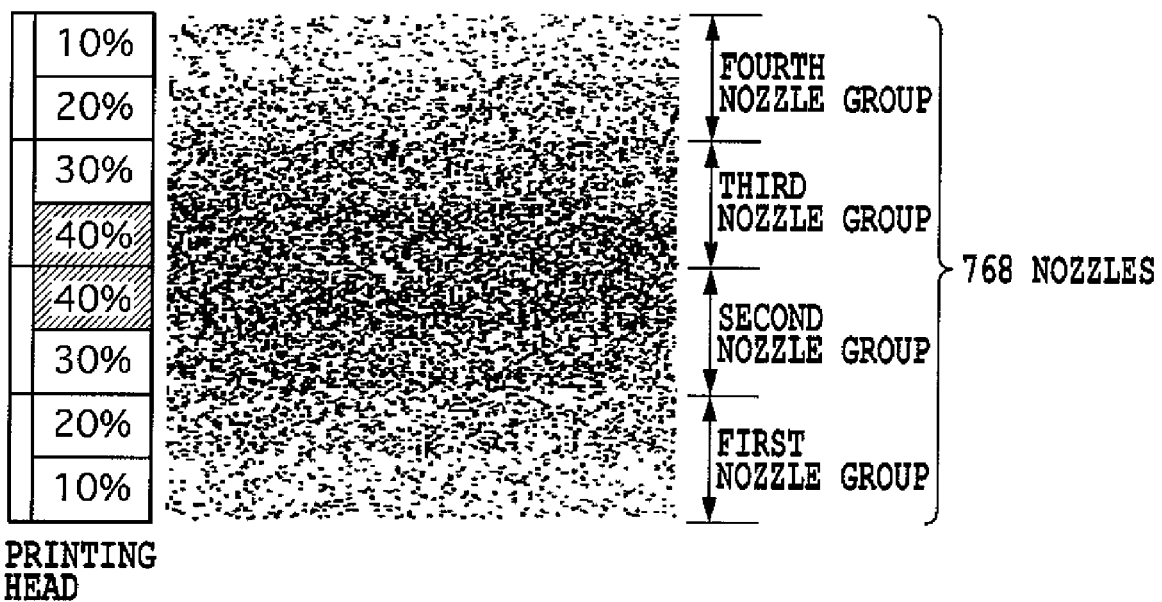
FIG. 5 is an explanatory diagram showing an example of mask patterns which are applied to the multi-pass printing method which is performed by the printing apparatus used in the embodiment.

FIG. 5 shows an example of mask which is capable of being actually applied to this embodiment. The printing head H1001 to which this embodiment is applied has 768 nozzles (the maximum number which may be actually involved in printing) per one color, and 192 nozzles belong to each of the four nozzle groups. As for the size of the mask, the mask has 768 areas in the vertical direction, and this number is equal to the number of nozzles. The mask has 256 areas in the horizontal direction. The mask has a configuration that the four mask patterns respectively corresponding to the four nozzle groups maintain a complementary relationship among themselves.

In the case of the ink jet printing head applied to this embodiment, which ejects a large number of fine ink droplets by means of a high frequency, it has been known that an air flow occurs in a neighborhood of the printing part during printing operation. In addition, it has been proven that this air flow particularly affects a direction in which ink droplets are ejected from nozzles located in the end portions of the printing head. For this reason, in the case of the mask patterns of this embodiment, a distribution of printable ratios is biased depending on which nozzle group a region belongs to, and on where a region is located in each of the nozzle groups, as seen from FIG. 5. As shown in FIG. 5, by employing the mask patterns having a configuration which makes the printable ratios of the nozzles in the end portions of the printing head smaller than those of nozzles in a central portion thereof, it is possible to make inconspicuous an adverse effect stemming from variations in positions where ink droplets ejected from the nozzles in the end portions of the printing head are landed. Incidentally, in the present embodiment, it is not indispensable that the mask pattern having the biased distribution of printable ratios is employed. In the present embodiment, a mask pattern with an even distribution of printable ratios can be employed.

Note that a printable ratio specified by a mask pattern is as follows. A printable ratio of a mask pattern is a percentage denomination of a ratio of the number of printable areas constituting the mask pattern (blackened areas in the mask pattern P0002(a) to P0002(d) of FIG. 4) to the sum of the number of printable areas and the number of unprintable areas constituting the mask pattern (the whitened areas in the mask patterns P0002(a) to P0002(d) of FIG. 4). In other words, a printable ratio (%) of a mask pattern is expressed by $$M \div (M+N) \times 100$$

where M denotes the number of printable areas constituting the mask pattern and N denotes the number of unprintable areas constituting the mask pattern.

In this embodiment, data for the mask as shown in FIG. 5 are stored in memory in the main body of the printing apparatus. The mask data converting process J0008 performs the AND process on the mask data with the binary data obtained in the foregoing dot arrangement patterning process. Thereby, binary data to be a print object in each print scan are determined. Subsequently, the binary data are transferred to the driving circuit J0009. Thus, the printing head H1001 is driven, and hence inks are ejected in accordance with the binary data.

FIG. 1 shows that the host apparatus J0012 is configured to perform the precedent process J0002, the subsequent process J0003, the γ correction process J0004, the half-toning process J0005 and the print data creation process J0006. In addition, FIG. 1 shows that the printing apparatus J0013 is designed to perform the dot arrangement patterning process J0007 and the mask data converting process J0008. However, the present invention is not limited to this embodiment. For example, the present invention may be carried out as an embodiment in which parts of the processes J0002 to J0005 are designed to be performed by the printing apparatus J0013 instead of by the host apparatus J0012. Otherwise, the present invention may be carried out as an embodiment in which all of these processes are designed to be performed by the host apparatus J0012. Alternately, the present invention may be carried out as an embodiment in which the processes J0002 to J0008 are designed to be performed by the printing apparatus J0013.

1.2 Configuration of Mechanisms

Descriptions will be provided for a configuration of the mechanisms in the printing apparatus to which this embodiment is applied. The main body of the printing apparatus of this embodiment is divided into a paper feeding section, a paper conveying section, a paper discharging section, a carriage section, a flat-pass printing section and a cleaning section from a viewpoint of functions performed by the mechanisms. These mechanisms are contained in an outer case.

Figure 6:
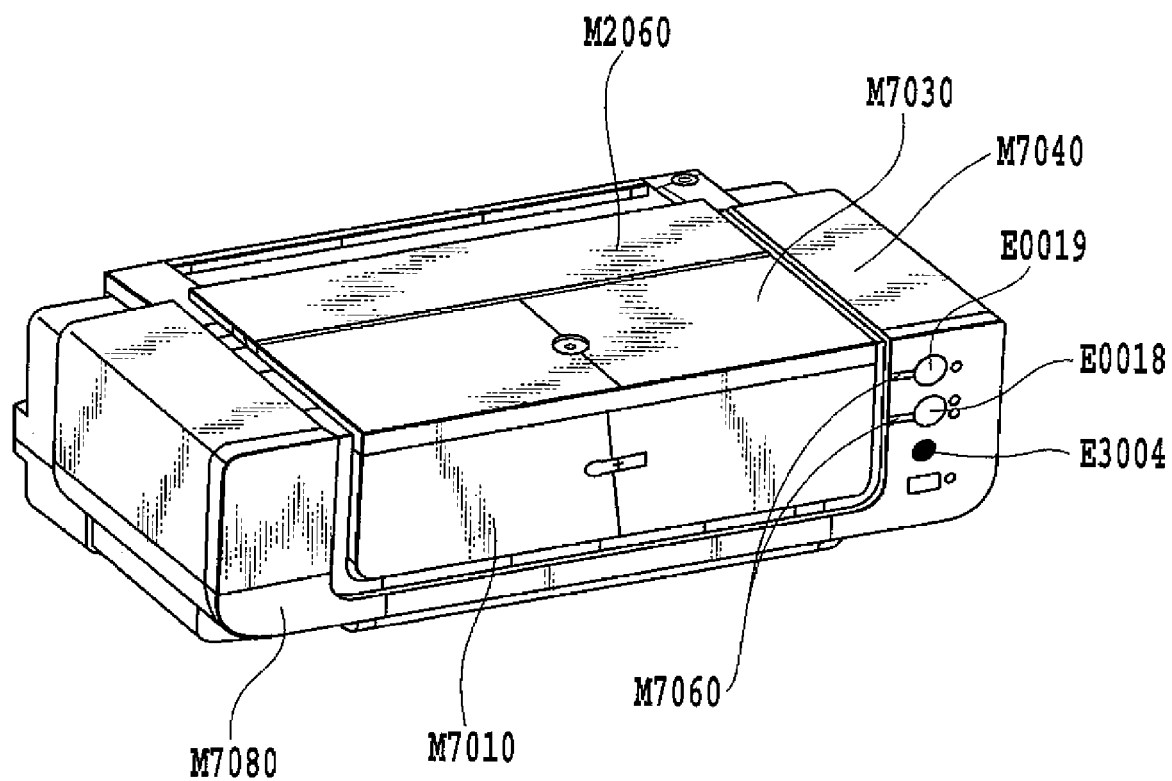
FIG. 6 is a perspective view of the printing apparatus used in the embodiment, and shows the printing apparatus in an unused condition when viewed from the front.
Figure 7:
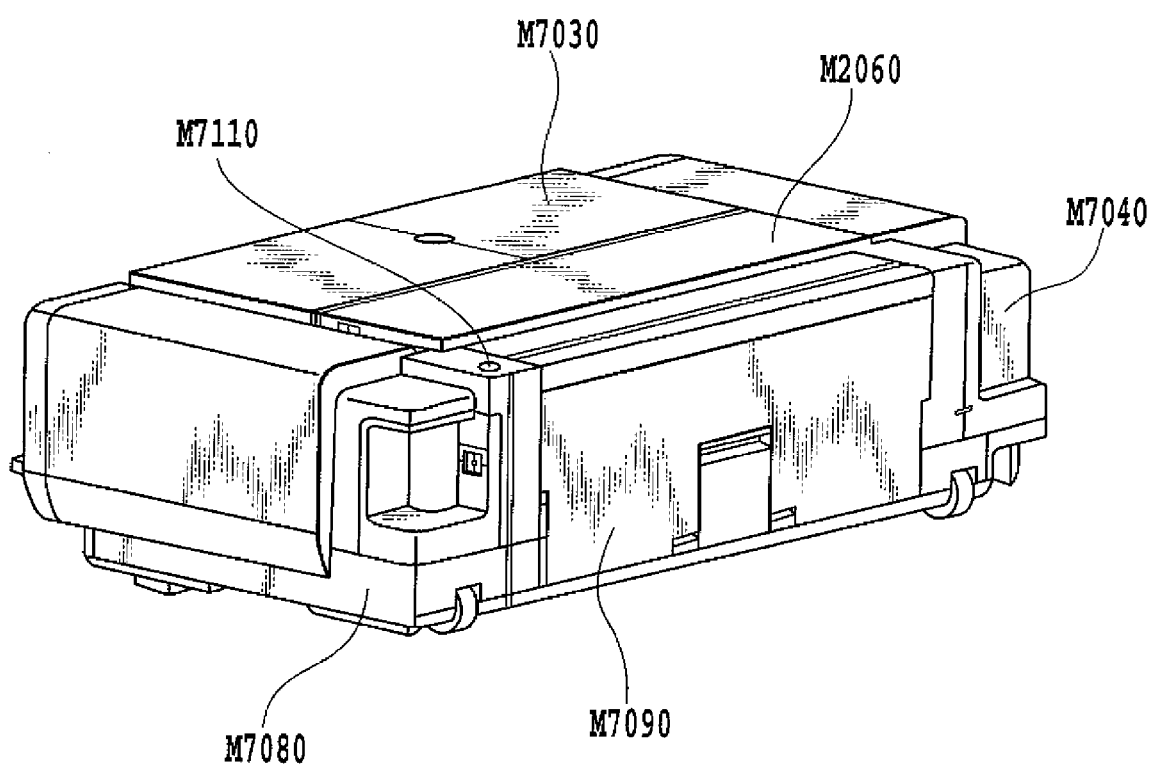
FIG. 7 is another perspective view of the printing apparatus used in the embodiment, and shows the printing apparatus in the unused condition when viewed from the back.
Figure 8:
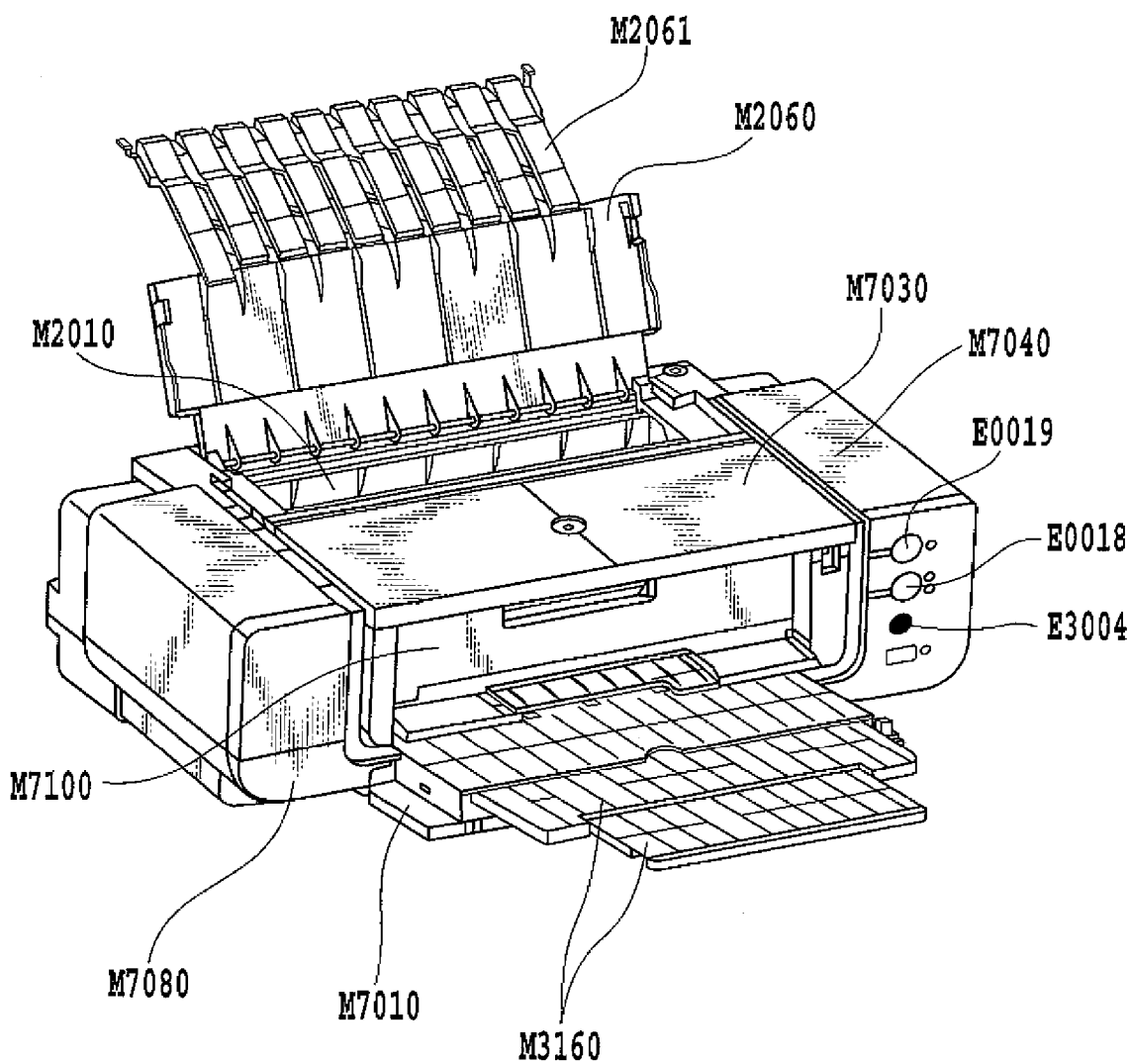
FIG. 8 is yet another perspective view of the printing apparatus used in the embodiment, and shows the printing apparatus in a used condition when viewed from the front.
Figure 9:
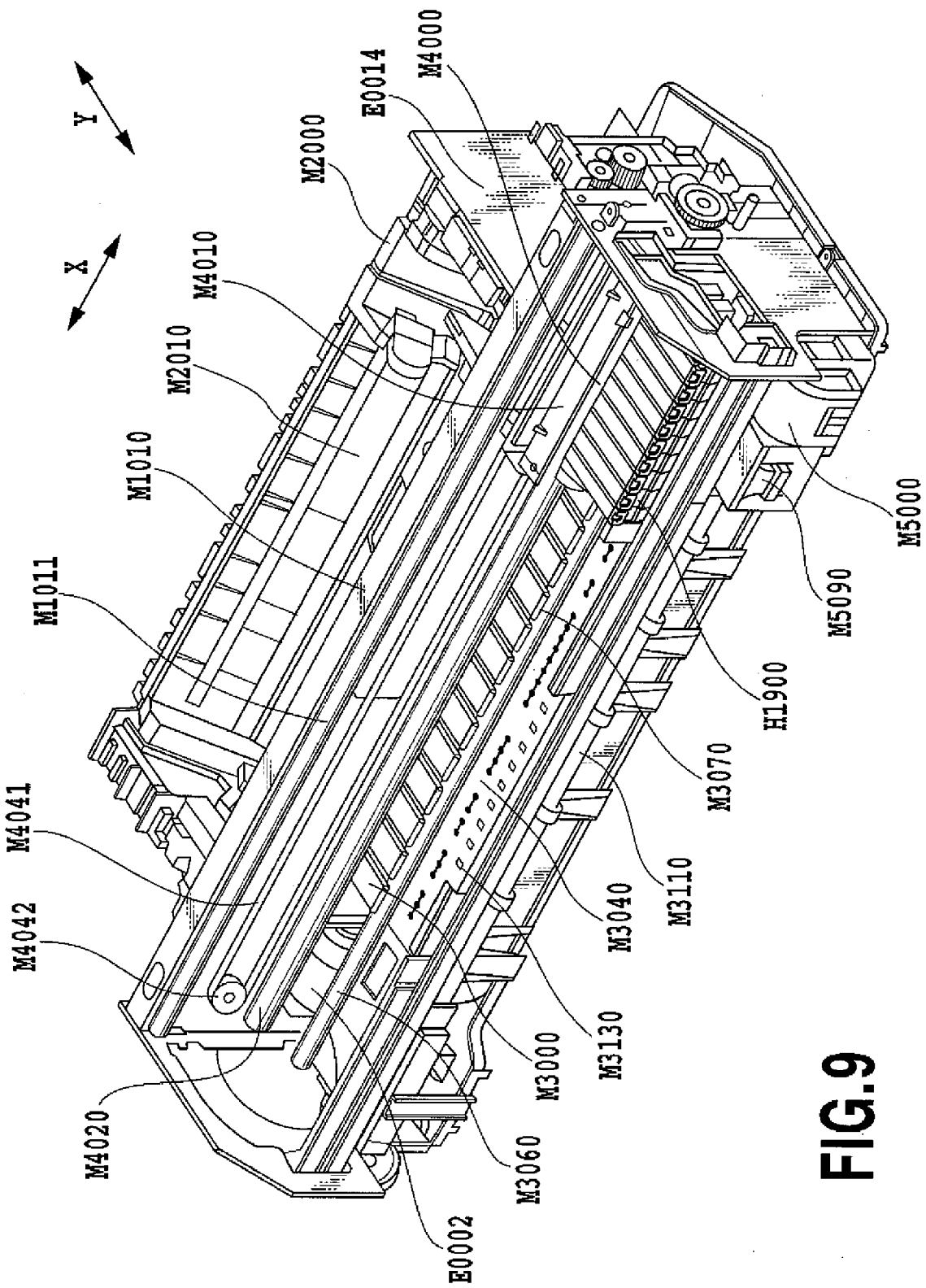
FIG. 9 is a diagram for explaining an internal mechanism of the main body of the printing apparatus used in the embodiment, and is a perspective view showing the printing apparatus when viewed from the right above.
Figure 10:
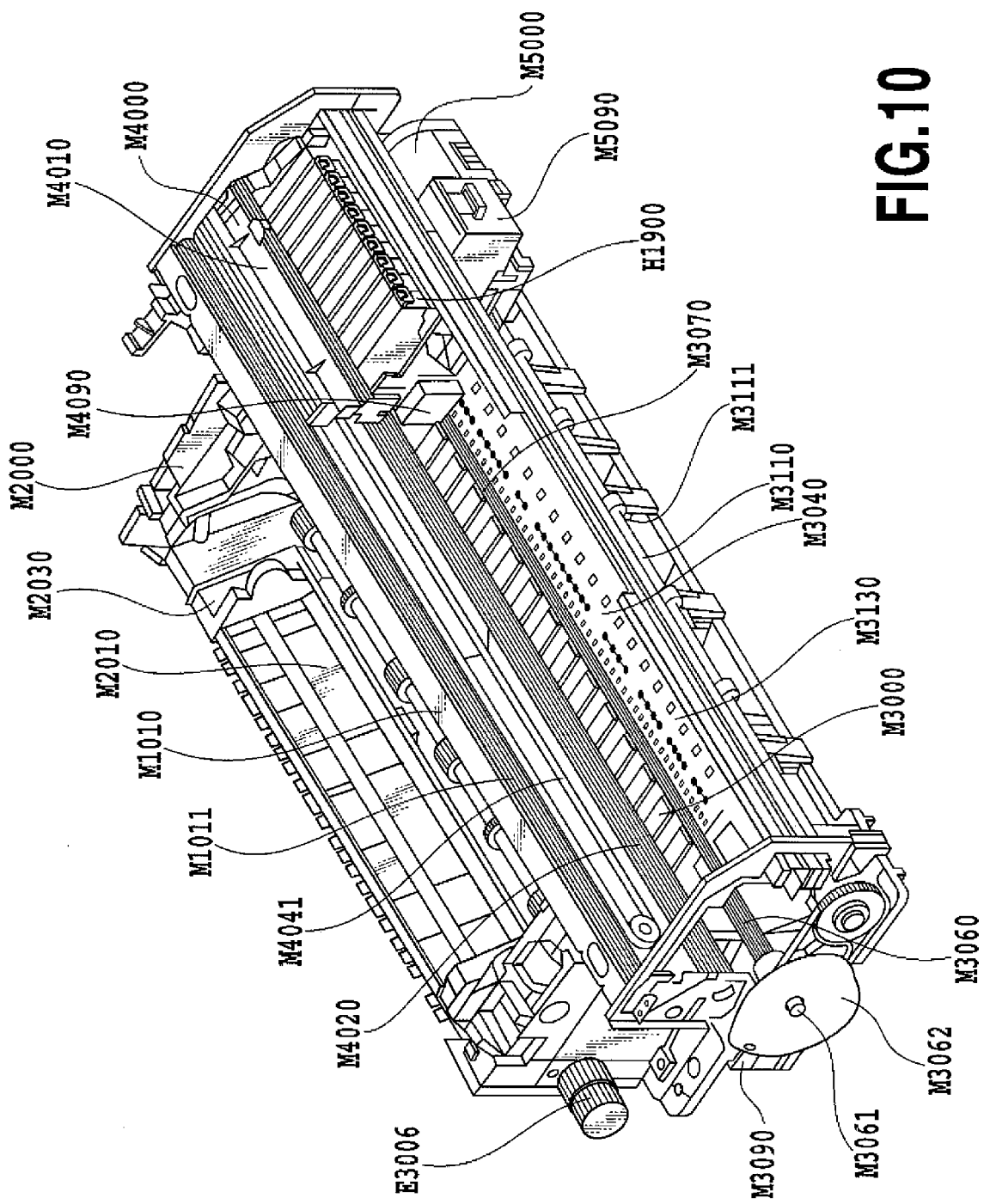
FIG. 10 is another diagram for explaining the internal mechanism of the main body of the printing apparatus used in the embodiment, and is another perspective view showing the printing apparatus when viewed from the left above.
Figure 11:
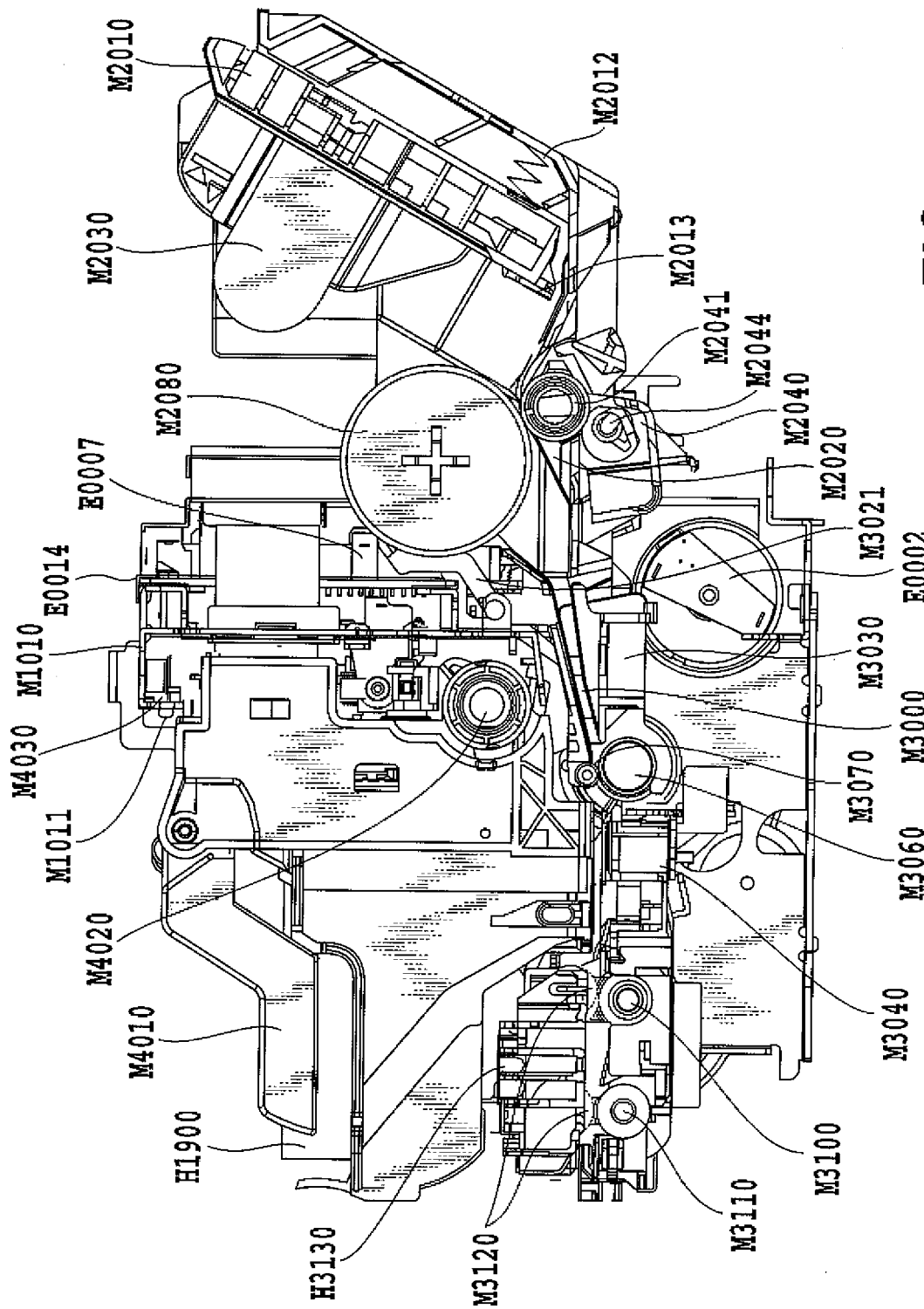
FIG. 11 is a side, cross-sectional view of the main body of the printing apparatus used in the embodiment for the purpose of explaining the internal mechanism of the main body of the printing apparatus.
Figure 12:
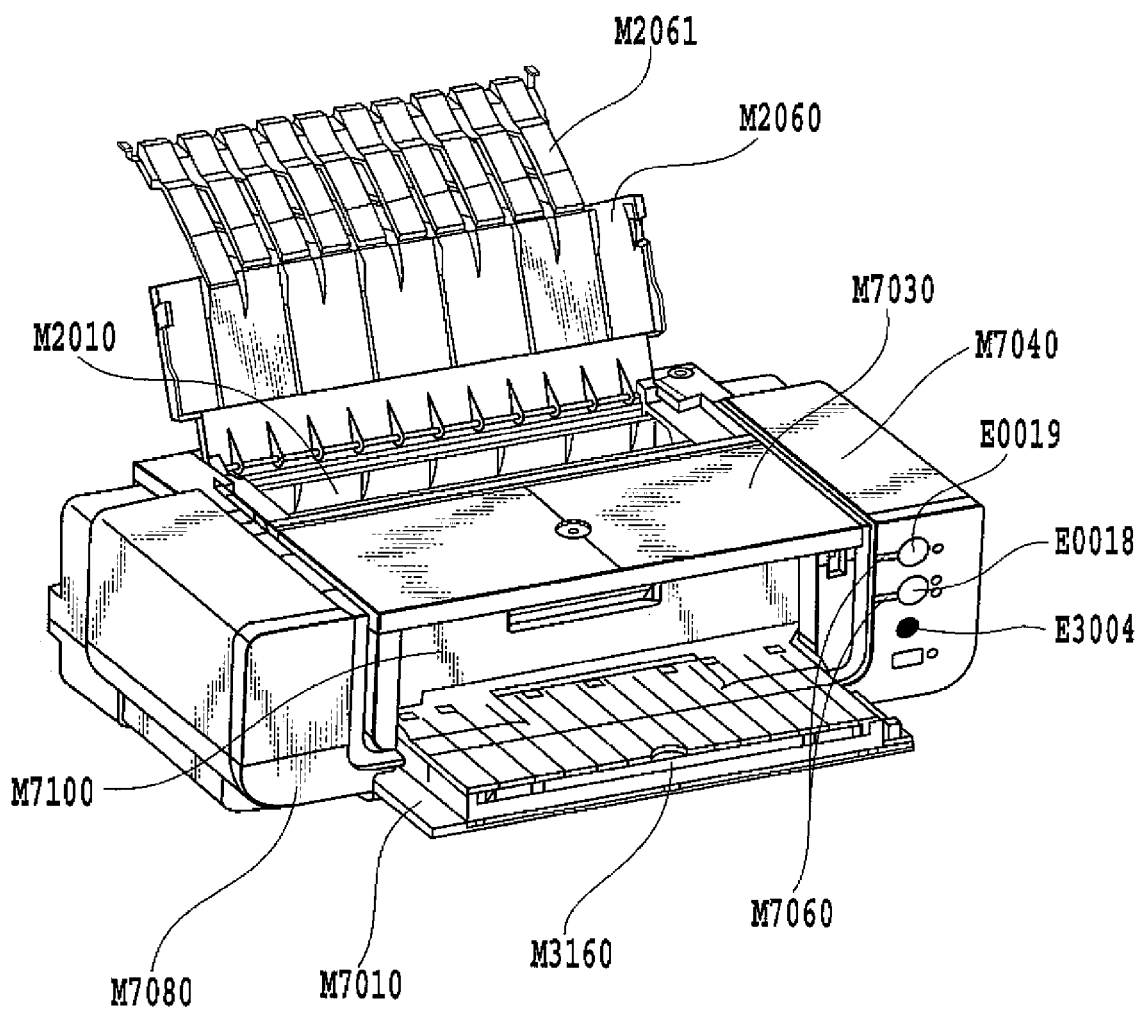
FIG. 12 is yet another perspective view of the printing apparatus used in the embodiment, and shows the printing apparatus in the process of performing a flat-pass printing operation when viewed from the front.
Figure 13:
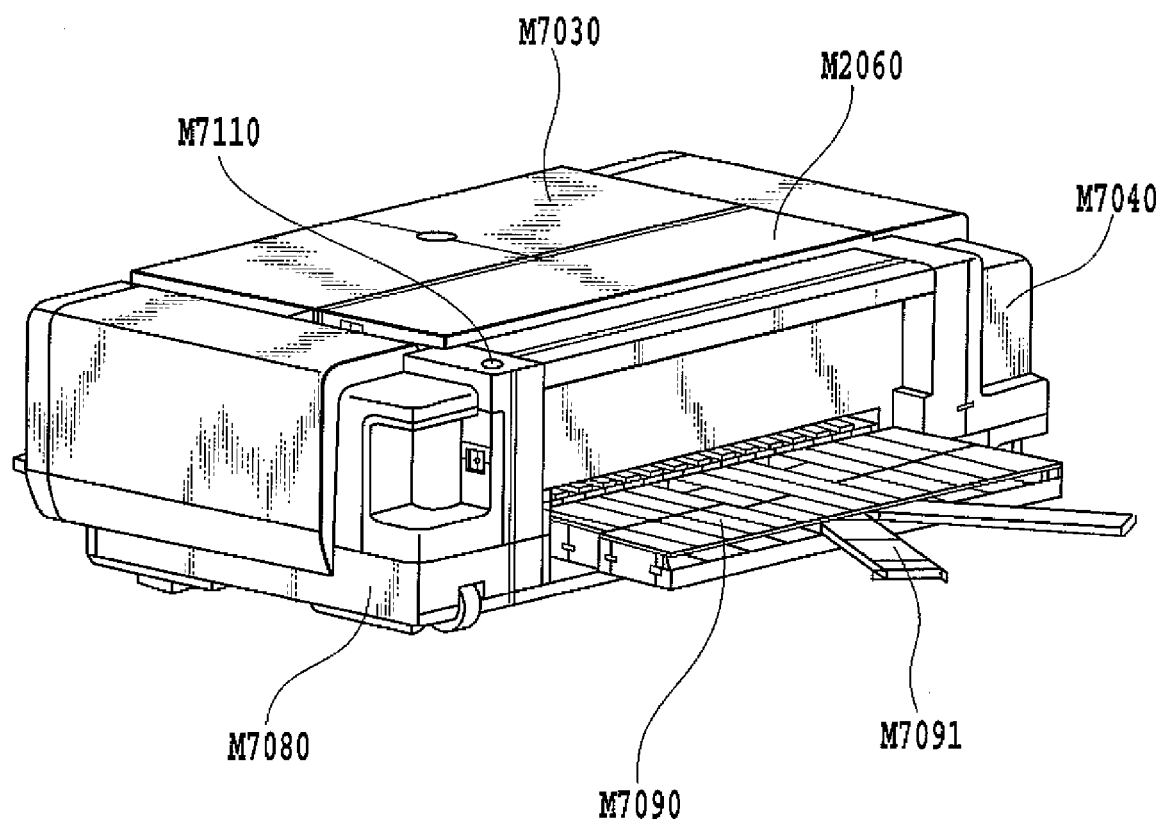
FIG. 13 is still another perspective view of the printing apparatus used in the embodiment, and shows the printing apparatus in the process of performing the flat-pass printing operation when viewed from the back.
Figure 14:
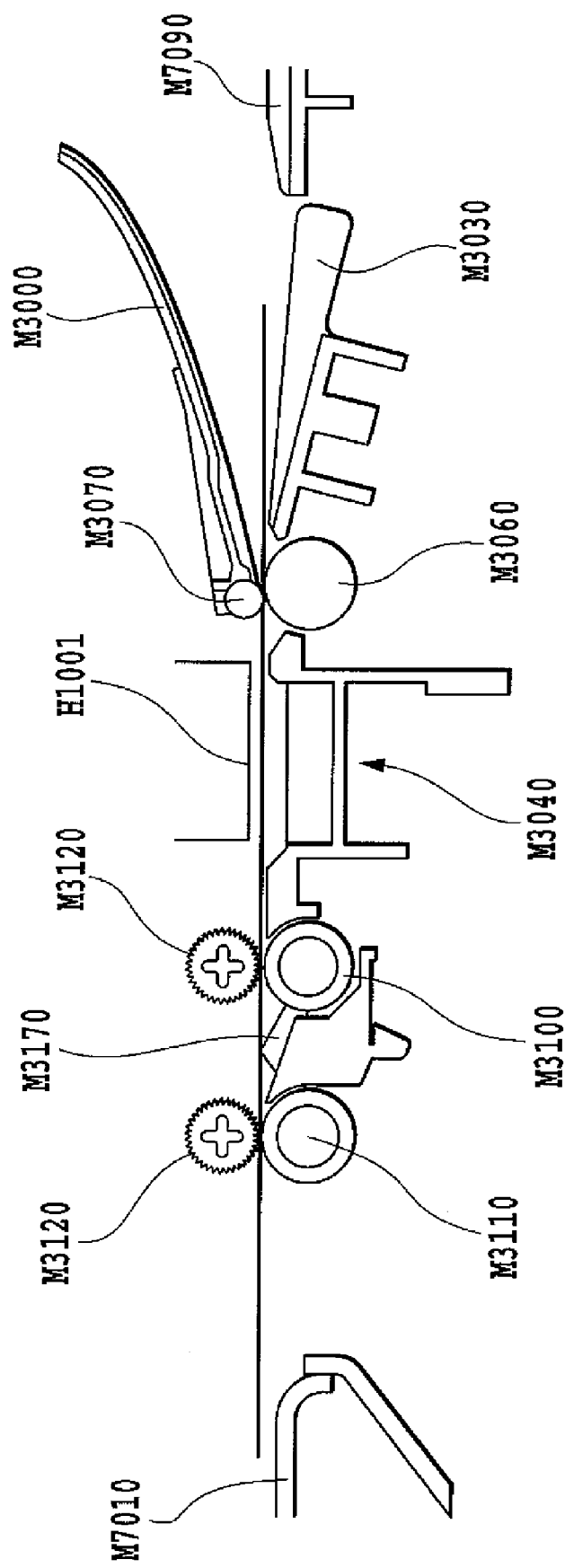
FIG. 14 is a schematic, side, cross-sectional view of the internal mechanism for explaining the flat-pass printing operation performed in the embodiment.
Figure 15:
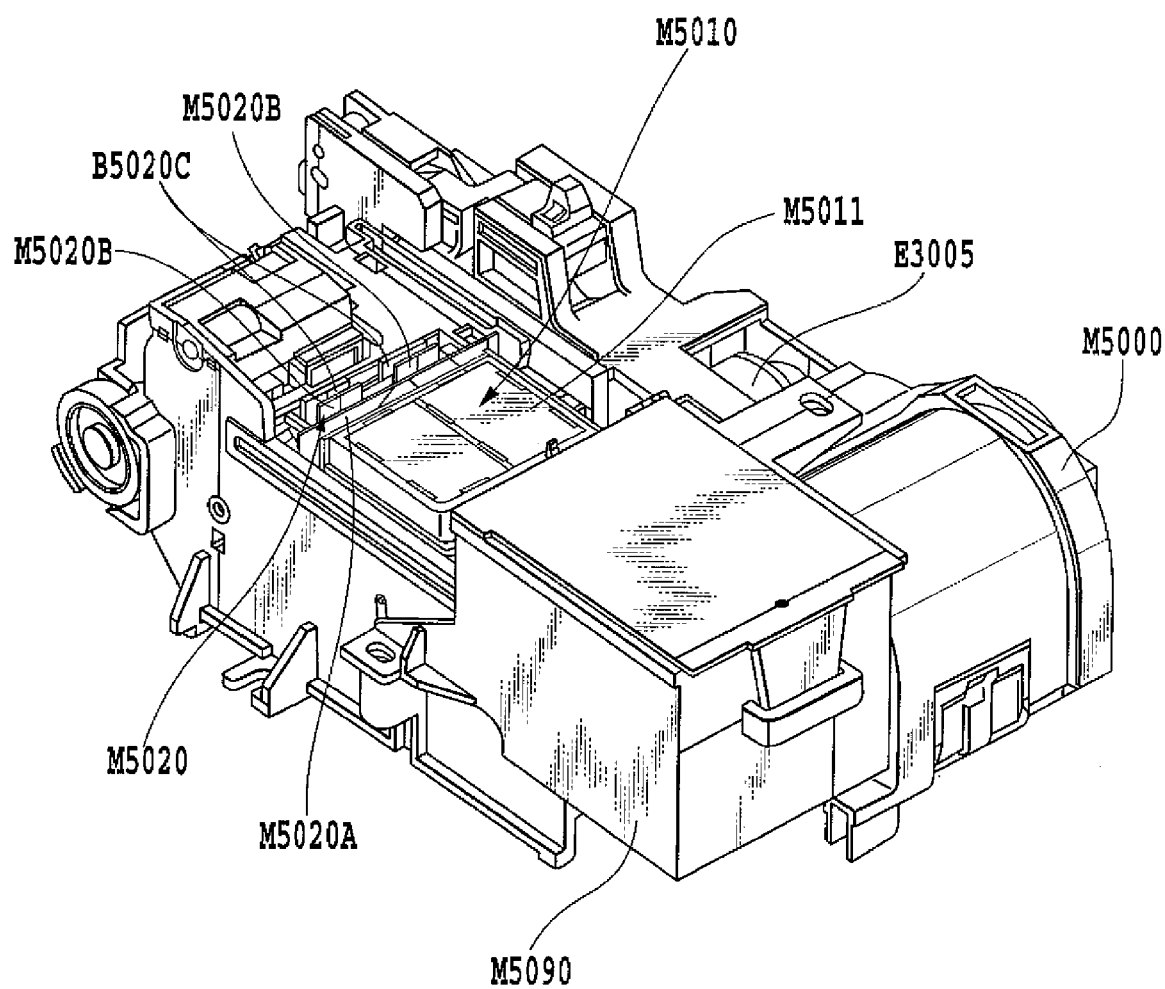
FIG. 15 is a perspective view showing a cleaning section in the main body of the printing apparatus used in the embodiment.
Figure 16:
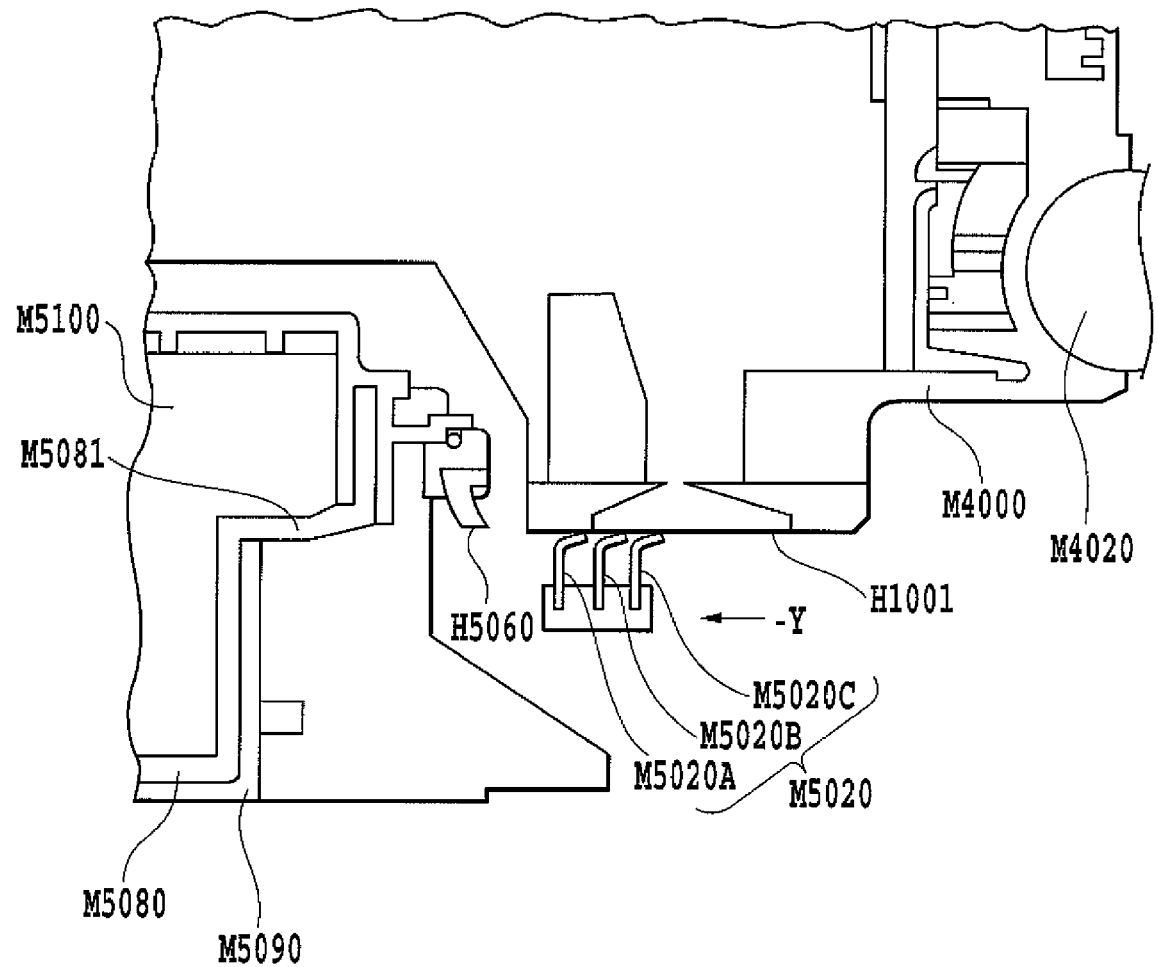
FIG. 16 is a cross-sectional view of a wiper portion in the cleaning section shown in FIG. 15 for explaining a configuration and an operation of the wiper portion.
Figure 17:
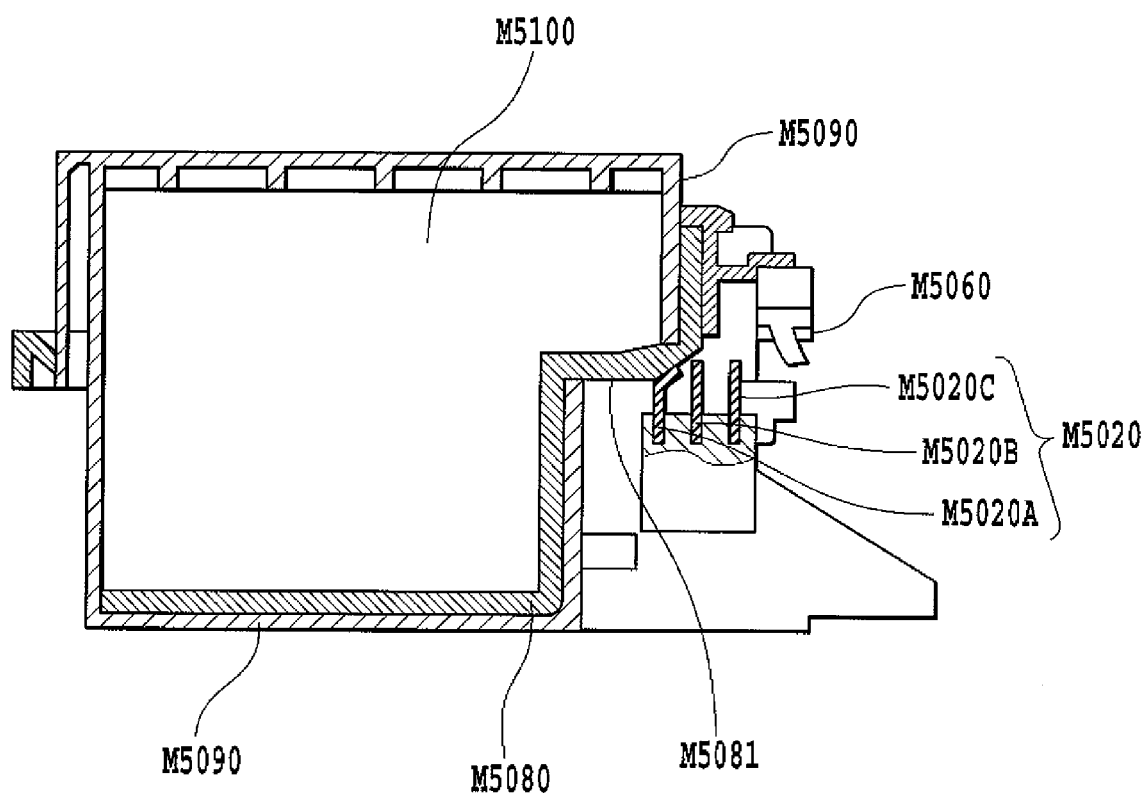
FIG. 17 is a cross-sectional view of a wetting liquid transferring unit in the cleaning section for explaining a configuration and an operation of the wetting liquid transferring unit.

FIGS. 6, 7, 8, 12 and 13 are perspective views respectively showing appearances of the printing apparatus to which this embodiment is applied. FIG. 6 shows the printing apparatus in an unused condition when viewed from the front. FIG. 7 shows the printing apparatus in an unused condition when viewed from the back. FIG. 8 shows the printing apparatus in a used condition when viewed from the front. FIG. 12 shows the printing apparatus during flat-pass printing when viewed from the front. FIG. 13 shows the printing apparatus during flat-pass printing when viewed from the back. In addition, FIGS. 9 to 11 and 14 to 16 are diagrams for describing internal mechanisms in the main body of the printing apparatus. In this respect, FIG. 9 is a perspective view showing the printing apparatus when viewed from the right above. FIG. 10 is a perspective view showing the printing apparatus when viewed from the left above. FIG. 11 is a side, cross-sectional view of the main body of the printing apparatus. FIG. 14 is a cross-sectional view of the printing apparatus during flat-pass printing. FIG. 15 is a perspective view of the cleaning section. FIG. 16 is a cross-sectional view for describing a configuration and an operation of a wiping mechanism in the cleaning section. FIG. 17 is a cross-sectional view of a wetting liquid transferring unit in the cleaning section.

Descriptions will be provided for each of the sections by referring to these figures whenever deemed necessary.

(A) Outer Case (Refer to FIGS. 6 and 7)

The outer case is attached to the main body of the printing apparatus in order to cover the paper feeding section, the paper conveying section, the paper discharging section, the carriage section, the cleaning section, the flat-pass section and the wetting liquid transferring unit. The outer case is configured chiefly of a lower case M7080, an upper case M7040, an access cover M7030, a connector cover, and a front cover M7010.

Paper discharging tray rails (not illustrated) are provided under the lower case M7080, and thus the lower case M7080 has a configuration in which a divided paper discharging tray M3160 is capable of being contained therein. In addition, the front cover M7010 is configured to close the paper discharging port while the printing apparatus is not used.

An access cover M7030 is attached to the upper case M7040, and is configured to be turnable. A part of the top surface of the upper case has an opening portion. The printing apparatus has a configuration in which each of ink tanks H1900 or the printing head H1001 (refer to FIG. 21) is replaced with a new one in this position. Incidentally, in the printing apparatus of this embodiment, the printing head H1001 has a configuration in which a plurality of ejecting portions are formed integrally into one unit. The plurality of ejecting portions corresponding respectively to a plurality of mutually different colors, and each of the plurality of ejecting portions is capable of ejecting an ink of one color. In addition, the printing head is configured as a printing head cartridge H1000 which the ink tanks H1900 are capable of being attached to, and detached from, independently of one another depending on the respective colors. The upper case M7040 is provided with a door switch lever (not illustrated), LED guides M7060, a power supply key E0018, a resume key E0019, a flat-pass key E3004 and the like. The door switch lever detects whether the access cover M7030 is opened or closed. Each of the LED guides M7060 transmits, and displays, light from the respective LEDs. Furthermore, a multi-stage paper feeding tray M2060 is turnably attached to the upper case M7040. While the paper feeding section is not used, the paper feeding tray M2060 is contained within the upper case M7040. Thus, the upper case M7040 is configured to function as a cover for the paper feeding section.

The upper case M7040 and the lower case M7040 are attached to each other by elastic fitting claws. A part provided with a connector portion therebetween is covered with a connector cover (not illustrated).

(B) Paper Feeding Section (Refer to FIGS. 8 and 11)

As shown in FIGS. 8 and 11, the paper feeding section is configured as follows. A pressure plate M2010, a paper feeding roller M2080, a separation roller M2041, a return lever M2020 and the like are attached to a base M2000. The pressure plate M2010 is that on which printing media are stacked. The paper feeding roller M2080 feeds the printing media sheet by sheet. The separation roller M2041 separates a printing medium. The return lever M2020 is used for returning the printing medium to a stacking position.

(C) Paper Conveying Section (Refer to FIGS. 8 to 11)

A conveying roller M3060 for conveying a printing medium is rotatably attached to a chassis M1010 made of an upwardly bent plate. The conveying roller M3060 has a configuration in which the surface of a metal shaft is coated with ceramic fine particles. The conveying roller M3060 is attached to the chassis M1010 in a state in which metallic parts respectively of the two ends of the shaft are received by bearings (not illustrated). The conveying roller M3060 is provided with a roller tension spring (not illustrated). The roller tension spring pushes the conveying roller M3060, and thereby applies an appropriate amount of load to the conveying roller M3060 while the conveying roller M3060 is rotating. Accordingly, the conveying roller M3060 is capable of conveying printing medium stably.

The conveying roller M3060 is provided with a plurality of pinch rollers M3070 in a way that the plurality of pinch rollers M3070 abut on the conveying roller M3060. The plurality of pinch rollers M3070 are driven by the conveying roller M3060. The pinch rollers M3070 are held by a pinch roller holder M3000. The pinch rollers M3070 are pushed respectively by pinch roller springs (not illustrated), and thus are brought into contact with the conveying roller M3060 with the pressure. This generates a force for conveying printing medium. At this time, since the rotation shaft of the pinch roller holder M3000 is attached to the bearings of the chassis M1010, the rotation shaft rotates thereabout.

A paper guide flapper M3030 and a platen M3040 are disposed in an inlet to which a printing medium is conveyed. The paper guide flapper M3030 and the platen M3040 guide the printing medium. In addition, the pinch roller holder M3000 is provided with a PE sensor lever M3021. The PE sensor lever M3021 transmits a result of detecting the front end or the rear end of each of the printing medium to a paper end sensor (hereinafter referred to as a "PE sensor") E0007 fixed to the chassis M1010. The platen M3040 is attached to the chassis M1010, and is positioned thereto. The paper guide flapper M3030 is capable of rotating about a bearing unit (not illustrated), and is positioned to the chassis M1010 by abutting on the chassis The printing head H1001 (refer to FIG. 21) is provided at a side downstream in a direction in which the conveying roller M3060 conveys the printing medium.

Descriptions will be provided for a process of conveying printing medium in the printing apparatus with the foregoing configuration. A printing medium sent to the paper conveying section is guided by the pinch roller holder M3000 and the paper guide flapper M3030, and thus is sent to a pair of rollers which are the conveying roller 3060 and the pinch roller M3070. At this time, the PE sensor lever M3021 detects an edge of the printing medium. Thereby, a position in which a print is made on the printing medium is obtained. The pair of rollers which are the conveying roller M3060 and the pinch roller M3070 are driven by an LF motor E0002, and are rotated. This rotation causes the printing medium to be conveyed over the platen M3040. A rib is formed in the platen M3040, and the rib serves as a conveyance datum surface. A gap between the printing head H1001 and the surface of the printing medium is controlled by this rib. Simultaneously, the rib also suppresses flapping of the printing medium in cooperation with the paper discharging section which will be described later.

A driving force with which the conveying roller M3060 rotates is obtained by transmitting a torque of the LF motor E0002 consisting, for example, of a DC motor to a pulley M3061 disposed on the shaft of the conveying roller M3060 through a timing belt (not illustrated). A code wheel M3062 for detecting an amount of conveyance performed by the conveying roller M3060 is provided on the shaft of the conveying roller M3060. In addition, an encode sensor M3090 for reading a marking formed in the code wheel M3062 is disposed in the chassis M1010 adjacent to the code wheel M3062. Incidentally, the marking formed in the code wheel M3062 is assumed to be formed at a pitch of 150 to 300 lpi (line/inch) (an example value).

(D) Paper Discharging Section (Refer to FIGS. 8 to 11)

The paper discharging section is configured of a first paper discharging roller M3100, a second paper discharging roller M3110, a plurality of spurs M3120 and a gear train.

The first paper discharging roller M3100 is configured of a plurality of rubber portions provided around the metal shaft thereof. The first paper discharging roller M3100 is driven by transmitting the driving force of the conveying roller M3060 to the first paper discharging roller M3100 through an idler gear.

The second paper discharging roller M3110 is configured of a plurality of elastic elements M3111, which are made of elastomer, attached to the resin-made shaft thereof. The second paper discharging roller M3110 is driven by transmitting the driving force of the first paper discharging roller M3100 to the second paper discharging roller M3110 through an idler gear.

Each of the spurs M3120 is formed by integrating a circular thin plate and a resin part into one unit. A plurality of convex portions are provided to the circumference of each of the spurs M3120. Each of the spurs M3120 is made, for example, of SUS. The plurality of spurs M3120 are attached to a spur holder M3130. This attachment is performed by use of a spur spring obtained by forming a coiled spring in the form of a stick. Simultaneously, a spring force of the spur spring causes the spurs M3120 to abut respectively on the paper discharging rollers M3100 and M3110 at predetermined pressures. This configuration enables the spurs 3120 to rotate to follow the two paper discharging rollers M3100 and M3110. Some of the spurs M3120 are provided at the same positions as corresponding ones of the rubber portions of the first paper discharging roller M3110 are disposed, or at the same positions as corresponding ones of the elastic elements M3111 are disposed. These spurs chiefly generates a force for conveying printing medium. In addition, others of the spurs M3120 are provided at positions where none of the rubber portions and the elastic elements M3111 is provided. These spurs M3120 chiefly suppresses lift of a printing medium while a print is being made on the printing medium.

Furthermore, the gear train transmits the driving force of the conveying roller M3060 to the paper discharging rollers M3100 and M3110.

With the foregoing configuration, a printing medium on which an image is formed is pinched with nips between the first paper discharging roller M3110 and the spurs M3120, and thus is conveyed. Accordingly, the printing medium is delivered to the paper discharging tray M3160. The paper discharging tray M3160 is divided into a plurality of parts, and has a configuration in which the paper discharging tray M3160 is capable of being contained under the lower case M7080 which will be described later. When used, the paper discharging tray M3160 is drawn out from under the lower case M7080. In addition, the paper discharging tray M3160 is designed to be elevated toward the front end thereof, and is also designed so that the two side ends thereof are held at a higher position. The design enhances the stackability of printing media, and prevents the printing surface of each of the printing media from being rubbed.

(E) Carriage Section (Refer to FIGS. 9 to 11)

The carriage section includes a carriage M4000 to which the printing head H1001 is attached. The carriage M4000 is supported with a guide shaft M4020 and a guide rail M1011.

The guide shaft M4020 is attached to the chassis M1010, and guides and supports the carriage M4000 so as to cause the carriage M4000 to perform reciprocating scan in a direction perpendicular to a direction in which a printing medium is conveyed. The guide rail M1011 is formed in a way that the guide rail M1011 and the chassis M1010 are integrated into one unit. The guide rail M1011 holds the rear end of the carriage M4000, and thus maintains the space between the printing head H1001 and the printing medium. A slide sheet M4030 formed of a thin plate made of stainless steel or the like is stretched on a side of the guide rail M1011, on which side the carriage M4000 slides. This makes it possible to reduce sliding noises of the printing apparatus.

The carriage M4000 is driven by a carriage motor E0001 through a timing belt M4041. The carriage motor E0001 is attached to the chassis M1010. In addition, the timing belt M4041 is stretched and supported by an idle pulley M4042. Furthermore, the timing belt M4041 is connected to the carriage M4000 through a carriage damper made of rubber. Thus, image unevenness is reduced by damping the vibration of the carriage motor E0001 and the like.

An encoder scale E0005 for detecting the position of the carriage M4000 is provided in parallel with the timing belt M4041 (the encoder scale E0005 will be described later by referring to FIG. 18). Markings are formed on the encoder scale E0005 at pitches in a range of 150 lpi to 300 lpi. An encoder sensor E0004 for reading the markings is provided on a carriage board E0013 installed in the carriage M4000 (the encoder sensor E0004 and the carriage board E0013 will be described later by referring to FIG. 18). A head contact E0101 for electrically connecting the carriage board E0013 to the printing head H1001 is also provided to the carriage board E0013. Moreover, a flexible cable E0012 (not illustrated) is connected to the carriage M4000 (the flexible cable E0012 will be described later by referring to FIG. 18). The flexible cable E0012 is that through which a drive signal is transmitted from an electric substrate E0014 to the printing head H1001.

As for components for fixing the printing head H1001 to the carriage M4000, the following components are provided to the carriage M4000. An abutting part (not illustrated) and pressing means (not illustrated) are provided on the carriage M4000. The abutting part is with which the printing head H1001 positioned to the carriage M4000 while pushing the printing head H1001 against the carriage M4000. The pressing means is with which the printing head H1001 is fixed at a predetermined position. The pressing means is mounted on a headset lever M4010. The pressing means is configured to act on the printing head H1001 when the headset lever M4010 is turned about the rotation support thereof in a case where the printing head H1001 is intended to be set up.

Moreover, a position detection sensor M4090 including a reflection-type optical sensor is attached to the carriage M4000. The position detection sensor is used while a print is being made on a special medium such as a CD-R, or when a print result or the position of an edge of a sheet of paper is being detected. The position detection sensor M4090 is capable of detecting the current position of the carriage M4000 by causing a light emitting device to emit light and by thus receiving the emitted light after reflecting off the carriage M4000.

In a case where an image is formed on a printing medium in the printing apparatus, the set of the conveying roller M3060 and the pinch rollers M3070 transfers the printing medium, and thereby the printing medium is positioned in terms of a position in a column direction. In terms of a position in a row direction, by using the carriage motor E0001 to move the carriage M4000 in a direction perpendicular to the direction in which the printing medium is conveyed, the printing head H1001 is located at a target position where an image is formed. The printing head H1001 thus positioned ejects inks onto the printing medium in accordance with a signal transmitted from the electric substrate E0014. Descriptions will be provided later for details of the configuration of the printing head H1001 and a printing system. The printing apparatus of this embodiment alternately repeats a printing main scan and a sub-scan. During the printing main scan, the carriage M4000 scans in the row direction while the printing head H1001 is making a print. During the sub-scan, the printing medium is conveyed in the column direction by conveying roller M3060. Thereby, the printing apparatus is configured to form an image on the printing medium.

(F) Flat-pass Printing Section (Refer to FIGS. 12 to 14)

A printing medium is fed from the paper feed section in a state where the printing medium is bent, because the passage through which the printing medium passes continues curving up to the pinch rollers as shown in FIG. 11. For this reason, if a thicker printing medium with a thickness of approximately 0.5 mm or more, for example, is attempted to be fed from the paper feeding section, a reaction force of the bent printing medium occurs, and thus resistance to the paper feeding increases. As a result, it is likely that the printing medium cannot be fed. Otherwise, even if the printing medium can be fed, the delivered printing medium remains bent, or is folded.

A flat-pass print is made on printing media, such as thicker printing media, which a user does not wish to fold, and on printing media, such as CD-Rs, which cannot be bent.

Types of flat-pass prints include a type of print made by manually supplying a printing medium from a slit-shaped opening portion (under a paper feeding unit) in the back of the main body of a printing apparatus, and by thus causing pinch rollers of the main body to nip the printing medium. However, the flat-pass print of this embodiment employs the following mode. A printing medium is fed from the paper discharging port located in the front side of the main body of the printing apparatus to a position where a print is going to be made, and the print is made on the printing medium by switching back the printing medium.

The front cover M7010 is usually located below the paper discharging section, because the front cover M7010 is also used as a tray in which several tens of printing media on which prints have been made are stacked (refer to FIG. 8). When a flat-pass print is going to be made, the front tray M7010 is elevated up to a position where the paper discharging port is located (refer to FIG. 12) for the purpose of supplying a printing medium from the paper discharging port horizontally in a direction reverse to the direction in which a printing medium is usually conveyed. Hooks and the like (not illustrated) are provided to the front cover M7010. Thus, the front cover M7010 is capable of being fixed to a position where the printing medium is supplied for the purpose of the flat-pass print. It can be detected by a sensor whether or not the front cover M7010 is located at the position where the printing medium is supplied for the purpose of the flat-pass print. Depending on this detection, it can be determined whether the printing apparatus is in a flat-pass printing mode.

In the case of the flat-pass printing mode, first of all, a flat-pass key E3004 is operated for the purpose of placing a printing medium on the front tray M7010 and inserting the printing medium from the paper discharging port. Thereby, a mechanism (not illustrated) lifts the spur holder M3130 and the pinch roller holder M3000 respectively up to positions higher than a presumed thickness of the printing medium. In addition, in a case where the carriage M4000 exists in an area through which the printing medium is going to pass, a lifting mechanism (not illustrated) lifts the carriage M4000 up. This makes it easy to insert the printing medium therein. Moreover, by pressing a rear tray button M7110, a rear tray M7090 can be opened. Furthermore, a rear sub-tray M7091 can be opened in the form of the letter V (refer to FIG. 13). The rear tray M7090 and the rear sub-tray M7091 are trays with which a long printing medium is supported in the back of the main body of the printing apparatus. This is because, if the long printing medium is inserted from the front of the main body of the printing apparatus, the long printing medium juts out of the back of the main body of the printing apparatus. If a thicker printing medium is not kept flat while a print is being made on the thicker printing medium, the thicker printing medium may be rubbed against a face (ejection face) of the head on which ejection openings are disposed, or the conveyance load may change. This is likely to adversely affect the print quality. For this reason, the disposition of these trays is effective. However, if a printing medium is not long enough to jut out of the back of the main body of the printing apparatus, the rear tray M7090 and the like need not be opened.

In the foregoing manner, a printing medium can be inserted from the paper discharging port to the inside of the main body of the printing apparatus. A printing medium is positioned on the front tray M7010 by aligning the rear edge (an edge at the side located closest to a user) and the right edge of the printing medium to a position in the front tray M7010 where a marker is formed.

At this time, if the flat-pass key E3004 is operated once again, the spur holder M3130 comes down, and thus the paper discharging rollers M3100, M3110 and the spurs M3120 jointly nip the printing medium. Thereafter, the paper discharging rollers M3100 and M3110 draw the printing medium into the main body of the printing apparatus by a predetermined amount thereof (in a direction reverse to the direction in which the printing medium is conveyed during normal printing). Because the edge at the side closest to the user (the rear edge) of a printing medium is aligned to the marker when the printing medium is set up at the beginning, it is likely that the front edge (the edge located farthest from a user) of the printing medium may not reach the conveying roller M3060, if the printing medium is shorter. With this taken into consideration, the predetermined amount is defined as a distance between the rear edge of a printing medium with the presumably shortest length and the conveying roller M3060. Once a printing medium is transferred by the predetermined amount, the rear edge of the printing medium reaches the conveying roller M3060. Thus, the pinch roller holder M3000 is lowered at the position, and the conveying roller M3060 and the pinch rollers M3070 are caused to nip the printing medium. Subsequently, the printing medium is further transferred so that the rear edge of the printing medium is nipped by the conveying roller M3060 and the pinch rollers M3070. Thereby, the supplying of the printing medium for the purpose of the flat-pass print is completed (at a position where the printing medium waits for a print to be made thereon).

A nip force with which the paper discharging roller M3100 and M3110 as well as the spurs M3120 nip a printing medium is set relatively weak lest the force should adversely affect image formation while the printing medium is being delivered during a normal print. For this reason, in the case where a flat-pass print is going to be made, it is likely that the position of the printing medium shifts before the print starts. In this embodiment, however, a printing medium is nipped by the conveying roller M3060 and the pinch rollers M3070 which have a relatively stronger nip force. This secures a position where a printing medium should be set. In addition, while a printing medium is being conveyed into the inside of the main body by the predetermined amount, a flat-pass paper detection sensor lever (hereinafter referred to as an "FPPE sensor lever") M3170 blocks or forms a light path of an FPPE sensor E9001 which is an infrared-ray sensor, and which is not illustrated here. Thereby, the position of the rear edge (the position of the front edge during the print) of the printing medium can be detected. Incidentally, the FPPE sensor lever may be rotatably provided between the platen M3040 and the spur holder M3130.

Once a printing medium is set at the position where the printing medium waits for a print to be made thereon, a print command is executed. Specifically, the conveying roller M3060 conveys the printing medium to a position where the printing head H1001 is going to make a print on the printing medium. Thereafter, the print is made in the same manner as a normal printing operation is performed. After the print, the printing medium is discharged to the front tray M7010.

In a case where the flat-pass print is intended to be made successively, the printing medium on which the print has been made is removed from the front tray M7010, and the next printing medium is set thereon. After that, it is sufficient that the foregoing processes are repeated. Specifically, the subsequent print starts with the setting of a printing medium after the spur holder M3130 and the pinch roller holder M3000 are lifted up by pressing the flat-pass key E3004.

On the other hand, in a case where the flat-pass print is intended to be completed, the printing apparatus is returned to the normal printing mode by returning the front tray M7010 to the normal print position.

(G) Cleaning Section (Refer to FIGS. 15 and 16)

The cleaning section is a mechanism for cleaning the printing head H1001. The cleaning section is configured of a pump M5000, caps M5010, a wiper portion M5020 and the like. The caps M5010 are those which prevent the printing head H1001 from being dried out. The wiper portion M5020 is used for cleaning the surface of the printing head H1001 on which the ejection openings are formed.

Figure 18:
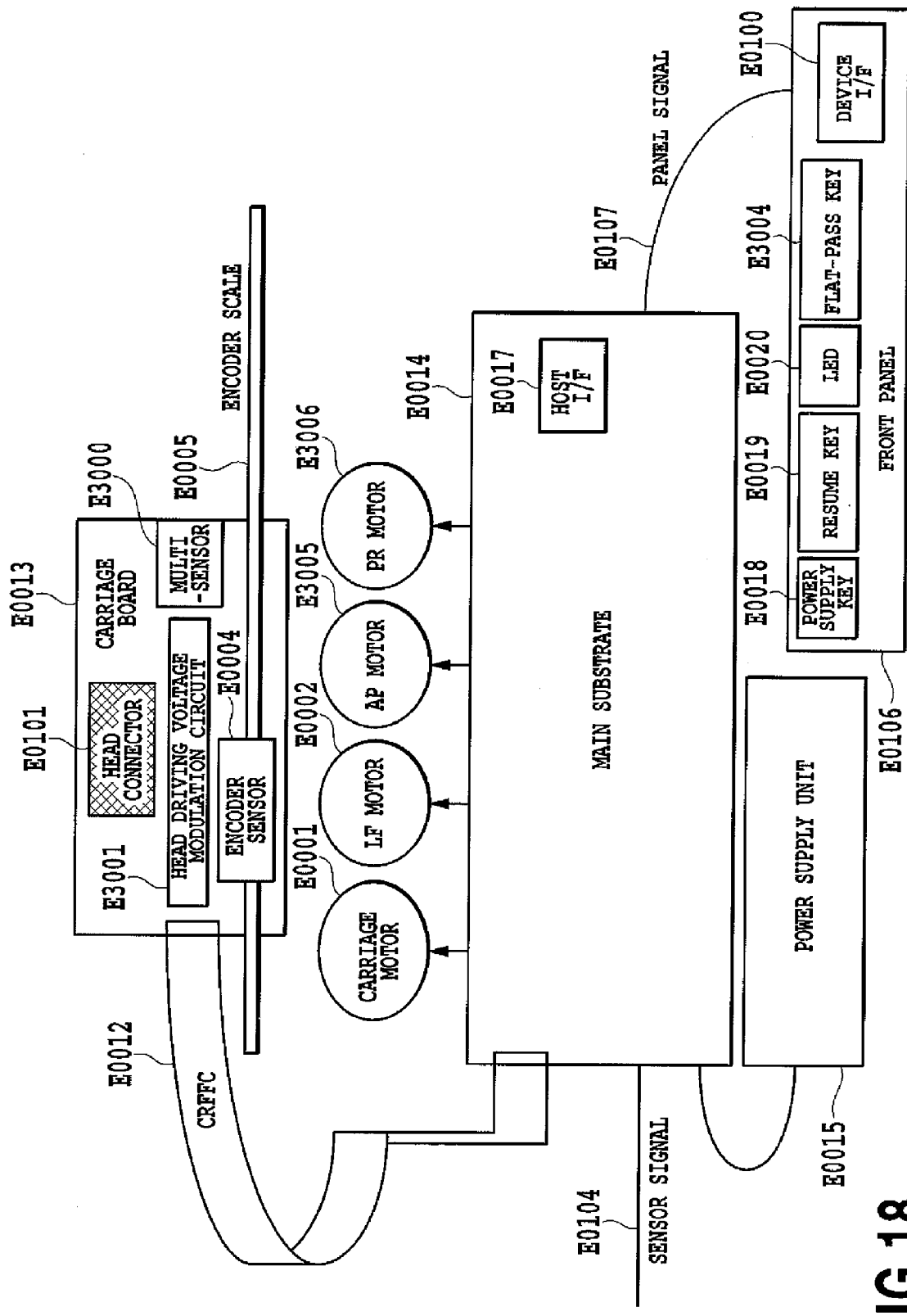
FIG. 18 is a block diagram schematically showing the entire configuration of an electrical circuit in the embodiment of the present invention.

In the case of this embodiment, a chief driving force of the cleaning section is transmitted from an AP motor E3005 (see FIG. 18). The pump M5000 is designed to be operated by rotation in one direction which is generated by means of a one-way clutch (not illustrated). The wiper portion M5020 and the caps M5010 are designed to ascend and descend by rotation in the other direction which is generated by the one-way clutch Incidentally, the AP motor E3005 is also used as a driving power supply for an operation of feeding printing medium, but a motor specialized for operating the cleaning section may be provided to the cleaning section instead.

The motor E0003 drives the caps M5010 so as for the caps M5010 to be capable of ascending and descending by means of an ascending/descending mechanism (not illustrated). When the caps M5010 go up to an ascending position, the caps M5010 cap each of the ejection faces of several ejecting portions provided to the printing head H1001. While no print operation is being performed, the caps M5010 can protect the printing head H1001. Otherwise, the caps M5010 can recover the printing head H1001 by suction. While a print operation is being performed, the caps M5010 can be placed in a descending position which prevents the caps M5010 from interfering with the printing head H1001. In addition, by opposing the caps M5010 to the ejection face, the caps M5010 are capable of receiving preliminary ejections. In a case where, for instance, the printing head H1001 is provided with ten ejecting portions, two caps M5010 are provided to the cleaning section in the illustrated example so that the ejection face corresponding to each five ejecting portions can be capped collectively by corresponding one of the two caps M5010.

A wiper portion M5020 made of an elastic member such as rubber is fixed to a wiper holder (not illustrated). The wiper holder is capable of moving in directions indicated by −Y and +Y in FIG. 16 (−Y and +Y are directions in which the ejection openings in the ejecting portions are arranged). When the printing head H1001 gets to the home position, the wiper holder moves in the direction indicated by an arrow −Y. Thereby, a surface of the printing head H1001 can be wiped. Once the wiping operation is completed, the carriage is caused to escape out of the range where the wiping operation is designed to be performed, and thus the wiper is returned to a position which prevents the wiper from interfering with the ejection face and the like. Incidentally, the wiper portion M5020 of this example is provided with a wiper blade M5020A for wiping the entire surface of the printing head H1001 including all of the ejection faces of the ejecting portions. In addition, the wiper portion M5020 is provided with the other two wiper blades M5020B and M5020C. The wiper blade M5020B wipes vicinities of nozzles for ejection faces of five of the ten ejecting portions, whereas the wiper blade M5020C wipes vicinities of nozzles for ejection faces of the other five of the ten ejecting portions.

After wiping, the wiper portion M5020 abuts on a blade cleaner M5060. Thereby, the wiper blades M5020A to M5020C are configured to be cleaned of inks and the like which have been adhered to themselves. In addition, the wiper portion M5020 has the following configuration (a wetting liquid transferring unit). A wetting liquid is transferred onto the wiper blades M5020A to M5020C before wiping. This enhances cleaning performance of the wiping operation. Descriptions will be provided later for a configuration of this wetting liquid transferring unit and the wiping operation.

The suction pump M5000 is capable of generating negative pressure in a state where an airtight space is formed inside the cap M5010 by connecting the cap M5010 to the ejection faces. Thereby, inks can be filled in the ejecting portions from the ink tanks H1900. In addition, dust, adhering matter, bubbles and the like which exist in the ejection openings and the internal ink passage leading to the ejection openings can be removed by suction.

What is used for the suction pump M5000 is, for example, a tube pump. This includes a member having a curved surface which is formed by squeezing and holding at least part of a flexible tube; a roller being capable of pressing the flexible tube towards the member; and a roller supporting part which supports the roller, and which is capable of rotating. Specifically, the roller supporting part is rotated in a predetermined direction, and thereby the roller is rolled on the member in which the curved surface has been formed, while pressing the flexible tube. In response to this, the negative pressure is generated in the airtight space formed by the cap M5010. This negative pressure sucks inks from the ejection openings, and subsequently sucks up the inks into the tube or the suction pump from the cap M5010. Thereafter, the sucked inks are further transferred to a suitable member (a waste ink absorbing member) provided inside the lower case M7080.

Note that an absorbing member M5011 is provided to the inside portion of the cap M5010 for the purpose of reducing the amount of inks remaining on the ejection faces of the printing head H1001 after the suction. In addition, consideration is made for sucking inks, which remain in the cap M5010 and the absorbing member M5011, in a state where the cap M5010 is opened, and for thus precluding the ink residue from coagulating and for accordingly preventing an adverse affect from occurring subsequently by sucking. It is desirable that no abrupt negative pressure should work on the ejection faces by providing an open-to-atmosphere valve (not illustrated) in a middle of the ink suction passage, and by thus beforehand opening the valve when the cap M5010 is intended to be detached from the ejection faces.

Furthermore, the suction pump M5000 can be operated not only for the purpose of the recovery by suction, but also for the purpose of discharging inks which have been received by the cap M5010 by the preliminary ejection operation performed in the state where the cap M5010 is opposite to the ejection faces. Specifically, when an amount of inks held in the cap M5010 after preliminary ejection reaches a predetermined amount, the inks held in the cap M5010 can be transferred to the waste ink absorbing member through the tube by operating the suction pump M5000.

The series of operations performed successively, such as the operations of the wiper portion M5020, the ascent/descent of the cap M5010 and the opening/closing of the valve, can be controlled by means of a main cam (not illustrated) provided on the output axle of the motor E0003, and a plurality of cams and arms and like which move so as to follow the main cam. Specifically, rotation of the main cam in response to a direction in which the motor E0003 rotates operates cams, arms and the like in each of the units and parts. Thereby, the predetermined operations can be performed. The position of the main cam can be detected with a position detection sensor such as a photo-interrupter.

(H) Wetting Liquid Transferring Unit (Refer to FIGS. 16 and 17)

Recently, inks containing pigment components as coloring agents (pigmented inks) are increasingly used for the purpose of enhancing the printing density, water resistance, light resistance of printed materials. Pigmented inks are produced through dispersing coloring agents themselves, which are originally solids, into water by adding dispersants thereto, or by introducing functional groups to pigment surfaces. Consequently, dried matter of pigmented inks resulting from drying the inks through evaporating moisture from the inks on the ejection faces damages the ejection faces more than dried coagulated matter of dyed inks in which the coloring agents are dissolved at molecular level. In addition, polymer compounds used for dispersing the pigments into the solvent are apt to be adsorbed to the ejection faces. This type of problem occurs in matter other than pigmented inks in a case where polymer compounds exist in the inks as a result of adding reactive liquids to the inks for the purpose of administering the viscosities of the inks, for the purpose of enhancing the light resistance of the inks, or for other purposes.

In this embodiment, a liquid is transferred onto, and adhered to, the blades of the wiper portion M5020, and thus the wiping operation is performed with the wetted blades M5020, in order to solve the foregoing problem. Thereby, the present embodiment attempts at preventing the ejection faces from deteriorating due to the pigmented inks, at reducing the abrasion of the wiper, and at removing the accumulated matter by dissolving the ink residue accumulated on the ejection faces. Such a liquid is termed as the wetting liquid from the viewpoint of its function in the description. The wiping by use of this liquid is termed as the wet wiping.

This embodiment adopts a configuration in which the wetting liquid is stored inside the main body of the printing apparatus. Reference numeral M5090 denotes a wetting liquid tank. As the wetting liquid, a glycerin solution or the like is contained in the wetting liquid tank M5090. Reference numeral M5100 denotes a wetting liquid holding member, which is fibrous member or the like. The wetting liquid holding member M5100 has an adequate surface tension for the purpose of preventing the wetting liquid from leaking from the wetting liquid tank M5090. The wetting liquid holding member M5100 is impregnated with, and holds, the wetting liquid. Reference numeral M5080 denotes a wetting liquid transferring member, which is made, for example, of a porous material having an adequate capillary force. The wetting liquid transferring member M5080 includes a wetting liquid transferring part M5081 which is in contact with the wiper blade. The wetting liquid transferring member M5080 is also in contact with the wetting liquid holding member M5100 in filtrated with the wetting liquid. As a result, the wetting liquid transferring member M5080 is also infiltrated with the wetting liquid. The wetting liquid transferring member M5080 is made of the material having the capillary force which enables the wetting liquid to be supplied to the wetting liquid transferring part M5081 even if a smaller amount of wetting liquid remains Descriptions will be provided for operations of the wetting liquid transferring unit and the wiper portion.

First of all, the cap M5010 is set at the descending position, and thus is escaped to a position where the carriage M4000 does not contact the blades M5020A to M5020C, In this state, the wiper portion M5020 is moved in the −Y direction, and is caused to pass through the part of the blade cleaner M5060. Accordingly, the wiper portion M5020 is caused to abut on the wetting liquid transferring part M5081 (refer to FIG. 17). By keeping the wiper portion M5020 in contact with the wetting liquid transferring part M5081 for an adequate length of time, an adequate amount of wetting liquid is transferred onto the wiper portion M5020.

Subsequently, the wiper portion M5020 is moved in the +Y direction. The blade contacts the blade cleaner M5060 only in a part of the surface of the blade cleaner M5060, and no wetting liquid is adhered to the part. For this reason, the wetting liquid remains to be held on the blade.

The blade is returned to the position where the wiping operation has been started. Thereafter, the carriage M4000 is moved to the position where the wiping operation is designed to be performed. Subsequently, the wiper portion M5020 is moved in the −Y direction. Thereby, the ejection faces of the printing head H1001 can be wiped with the surface to which the wetting liquid is adhered.

1.3 Configuration of Electrical Circuit

Descriptions will be provided next for a configuration of an electrical circuit of this embodiment.

FIG. 18 is a block diagram for schematically describing the entire configuration of the electrical circuit in the printing apparatus J0013. The printing apparatus to which this embodiment is applied is configured chiefly of the carriage board E0013, the main substrate E0014, a power supply unit E0015, a front panel E0106 and the like.

The power supply unit E0015 is connected to the main substrate E0014, and thus supplies various types of drive power.

The carriage board E0013 is a printed circuit board unit mounted on the carriage M4000. The carriage board E0013 functions as an interface for transmitting signals to, and receiving signals from, the printing head H1001 and for supplying head driving power through the head connector E0101. The carriage board E0013 includes a head driving voltage modulation circuit E3001 with a plurality of channels to the respective ejecting portions of the printing head H1001. The plurality of ejecting portions corresponding respectively to the plurality of mutually different colors. In addition, the head driving voltage modulation circuit E3001 generates head driving power supply voltages in accordance with conditions specified by the main substrate E0014 through the flexible flat cable (CRFFC) E0012. In addition, change in a positional relationship between the encoder scale E0005 and the encoder sensor E0004 is detected on the basis of a pulse signal outputted from the encoder sensor E0004 in conjunction with the movement of the carriage M4000. Moreover, the outputted signal is supplied to the main substrate E0014 through the flexible flat cable (CRFFC) E0012.

Figure 20:
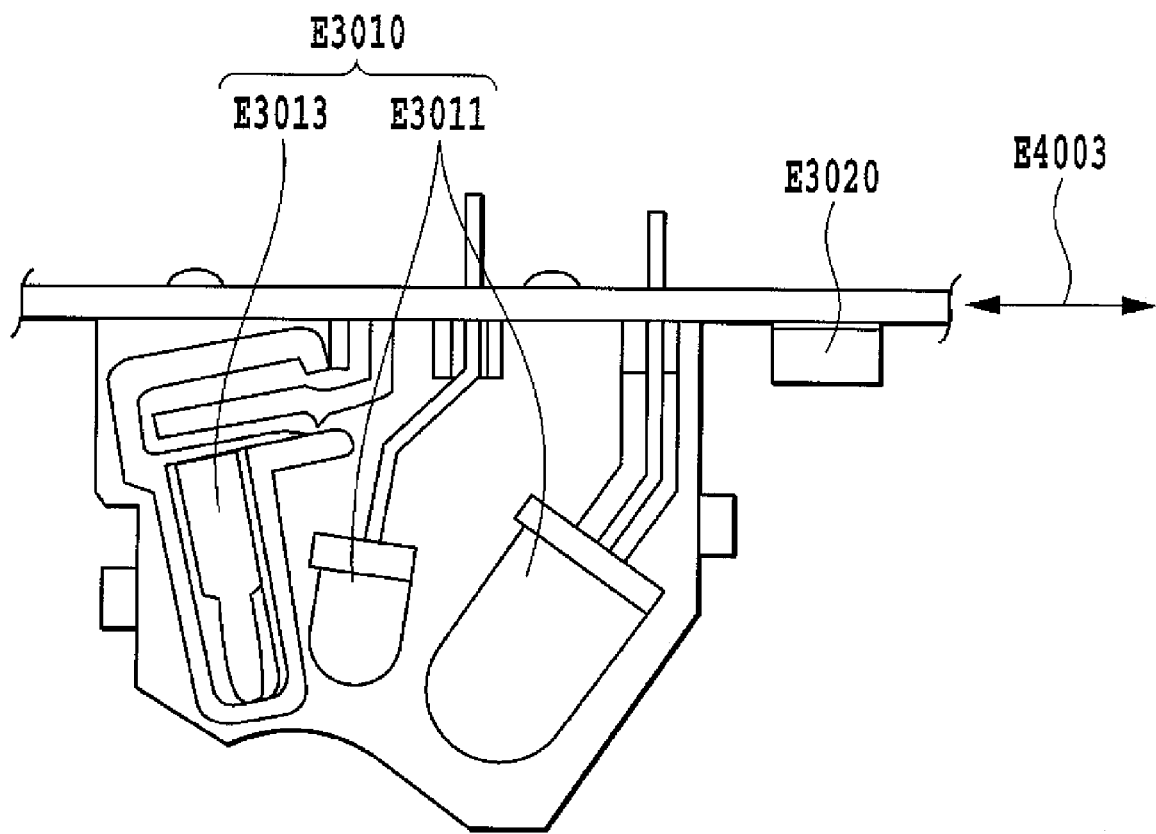
FIG. 20 is a diagram showing an example of a configuration of a multisensor system mounted on a carriage board shown in FIG. 18.

An optical sensor E3010 and a thermistor E3020 are connected to the carriage board E0013, as shown in FIG. 20. The optical sensor E3010 is configured of two light emitting devices (LEDs) E3011 and a light receiving element E3013. The thermistor E3020 is that with which an ambient temperature is detected. Hereinafter, these sensors are referred to as a multisensor system E3000. Information obtained by the multisensor system E3000 is outputted to the main substrate E00014 through the flexible flat cable (CRFFC) E0012.

The main substrate E0014 is a printed circuit board unit which drives and controls each of the sections of the ink jet printing apparatus of this embodiment. The main substrate E0014 includes a host interface (host I/F) E0017 thereon. The main substrate E0014 controls print operations on the basis of data received from the host apparatus J0012 (FIG. 1). The main substrate E0014 is connected to and controls various types of motors including the carriage motor E0001, the LF motor E0002, the AP motor E3005 and the PR motor E3006. The carriage motor E0001 is a motor serving as a driving power supply for causing the carriage M4000 to perform main scan. The LF motor E0002 is a motor serving as a driving power supply for conveying printing medium. The AP motor E3005 is a motor serving as a driving power supply for causing the printing head H1001 to perform recovery operations. The PR motor E3006 is a motor serving as a driving power supply for performing a flat-pass print operation; and the main substrate E0014 thus controls drive of each of the functions. Moreover, the main substrate E0014 is connected to sensor signals E0104 which are used for transmitting control signals to, and receiving detection signals from, the various sensors such as a PF sensor, a CR lift sensor, an LF encoder sensor, and a PG sensor for detecting operating conditions of each of the sections in the printer. The main substrate E0014 is connected to the CRFFC E0012 and the power supply unit E0015. Furthermore, the main substrate E0014 includes an interface for transmitting information to, and receiving information from a front panel E0106 through panel signals E0107.

The front panel E0106 is a unit provided to the front of the main body of the printing apparatus for the sake of convenience of user's operations. The front panel E0106 includes the resume key E0019, the LED guides M7060, the power supply key E0018, and the flat-pass key E3004 (refer to FIG. 6). The front panel E0106 further includes a device I/F E0100 which is used for connecting peripheral devices, such as a digital camera, to the printing apparatus.

Figure 19:
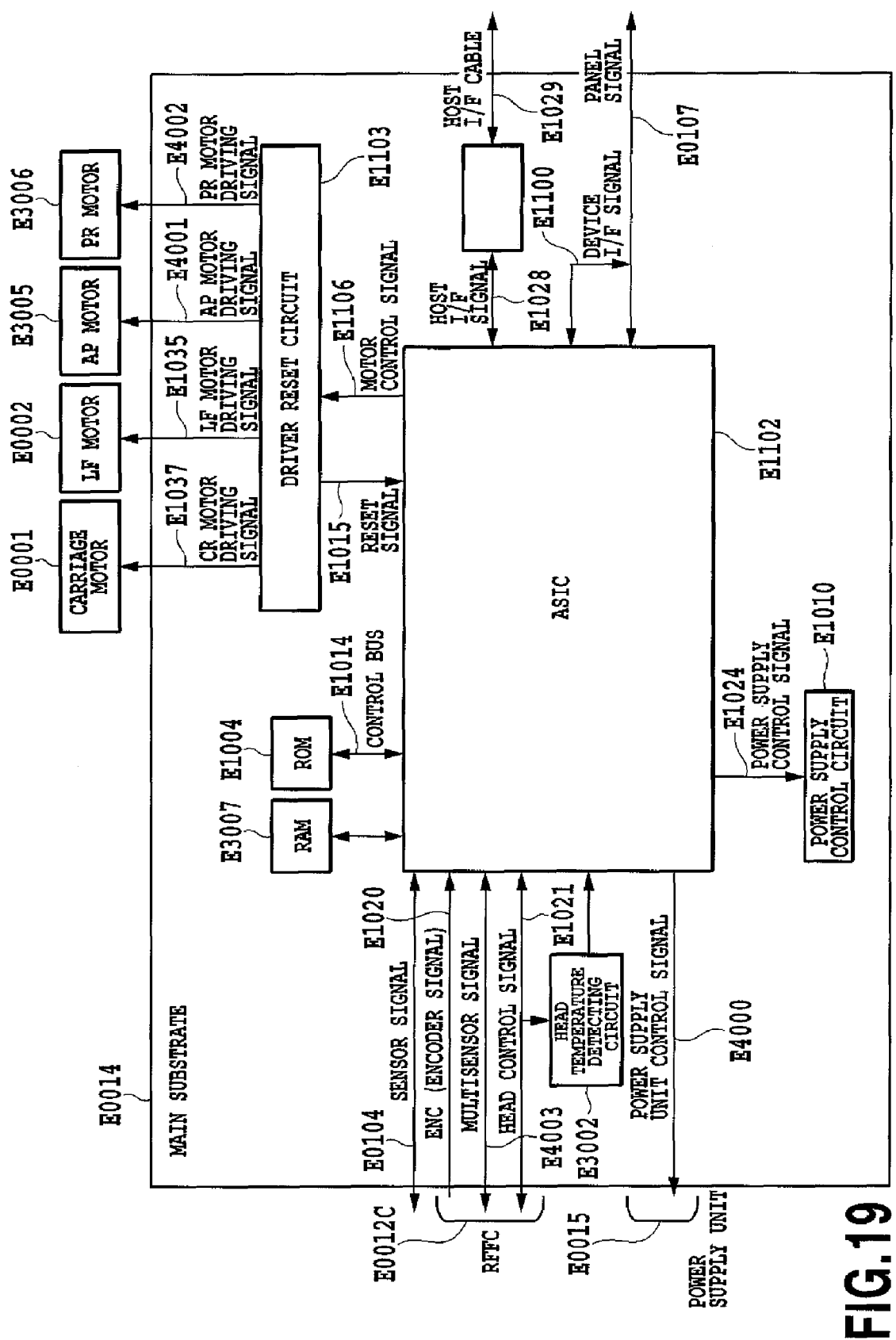
FIG. 19 is a block diagram showing an example of an internal configuration of a main substrate shown in FIG. 18.

FIG. 19 is a block diagram showing an internal configuration of the main substrate E1004.

In FIG. 19, reference numeral E1102 denotes an ASIC (Application Specific Integrated Circuit). The ASIC E1102 is connected to a ROM E1004 through a control bus E1014, and thus performs various controls in accordance with programs stored in the ROM E1004. For example, the ASIC E1102 transmits sensor signals E0104 concerning the various sensors and multisensor signals E4003 concerning the multisensor system E3000. In addition, the ASIC E1102 receives sensor signals E0104 concerning the various sensors and multisensor signals E4003 concerning the multisensor system. Furthermore, the ASIC E1102 detects encoder signals E1020 as well as conditions of outputs from the power supply key E0018, the resume key E0019 and the flat-pass key E3004 on the front panel E0106. In addition, the ASIC E1102 performs various logical operations, and makes decisions on the basis of conditions, depending on conditions in which the host I/F E0017 and the device I/F E0100 on the front panel are connected to the ASIC E1102, and on conditions in which data are inputted. Thus, the ASIC E1102 controls the various components, and accordingly drives and controls the ink jet printing apparatus.

Reference E1103 denotes a driver reset circuit. In accordance with motor controlling signals E1106 from the ASIC E1102, the driver reset circuit E1103 generates CR motor driving signals E1037, LF motor driving signals E1035, AP motor driving signals E4001 and PR motor driving signals 4002, and thus drives the motors. In addition, the driver reset circuit E1103 includes a power supply circuit, and thus supplies necessary power to each of the main substrate E0014, the carriage board E0013, the front panel E0106 and the like. Moreover, once the driver reset circuit E1103 detects drop of the power supply voltage, the driver reset circuit E1103 generates reset signals E1015, and thus performs initialization.

Reference numeral E1010 denotes a power supply control circuit. In accordance with power supply controlling signals E1024 outputted from the ASIC E1102, the power supply control circuit E1010 controls the supply of power to each of the sensors which include light emitting devices.

The host I/F E0017 transmits host I/F signals E1028, which are outputted from the ASIC E1102, to a host I/F cable E1029 connected to the outside. In addition, the host I/F E0017 transmits signals, which come in through this cable E1029, to the ASIC E1102.

Meanwhile, the power supply unit E0015 supplies power. The supplied power is supplied to each of the components inside and outside the main substrate E0014 after voltage conversion depending on the necessity. Furthermore, power supply unit controlling signals E4000 outputted from the ASIC E1102 are connected to the power supply unit E0015, and thus a lower power consumption mode or the like of the main body of the printing apparatus is controlled.

The ASIC E1102 is a single-chip semiconductor integrated circuit incorporating an arithmetic processing unit. The ASIC E1102 outputs the motor controlling signals E1106, the power supply controlling signals E1024, the power supply unit controlling signals E4000 and the like. In addition, the ASIC E1102 transmits signals to, and receives signals from, the host I/F E0017. Furthermore, the ASIC E1102 transmits signals to, and receives signals from, the device I/F E0100 on the front panel by use of the panel signals E0107. As well, the ASIC E1102 detects conditions by means of the sensors such as the PE sensor and an ASF sensor with the sensor signals E0104. Moreover, the ASIC E1102 controls the multisensor system E3000 with the multisensor signals E4003, and thus detects conditions. In addition, the ASIC E1102 detects conditions of the panels signals E0107, and thus controls the drive of the panel signals E0107. Accordingly, the ASIC E1102 turns on/off the LEDs E0020 on the front panel.

The ASIC E1102 detects conditions of the encoder signals (ENC) E1020, and thus generates timing signals. The ASIC E1102 interfaces with the printing head H1001 with head controlling signals E1021, and thus controls print operations. In this respect, the encoder signals (ENC) E1020 are signals which are receives from the CRFFC E0012, and which have been outputted from the encoder sensor E0004. In addition, the head controlling signals E1021 are connected to the carriage board E0013 through the flexible flat cable E0012. Subsequently, the head controlling signals E1021 are supplied to the printing head H1001 through the head driving voltage modulation circuit E3001 and the head connector E0101. Various types of information from the printing head H1001 are transmitted to the ASIC E1102. Signals representing information on head temperature of each of the ejecting portions among the types of information are amplified by a head temperature detecting circuit E 3002 on the main substrate, and thereafter the signals are inputted into the ASIC E1102. Thus, the signals are used for various decisions on controls.

In the figure, reference numeral E3007 denotes a DRAM. The DRAM E3007 is used as a data buffer for a print, a buffer for data received from the host computer, and the like. In addition, the DRAM is used as work areas needed for various control operations.

1.4 Configuration of Printing Head

Descriptions will be provided below for a configuration of the head cartridge H1000 to which this embodiment is applied.

The head cartridge H1000 in this embodiment includes the printing head H1001, means for mounting the ink tanks H1900 on the printing head H1001, and means for supplying inks from the respective ink tanks H1900 to the printing head H1001. The head cartridge H1000 is detachably mounted on the carriage M4000.

Figure 21:
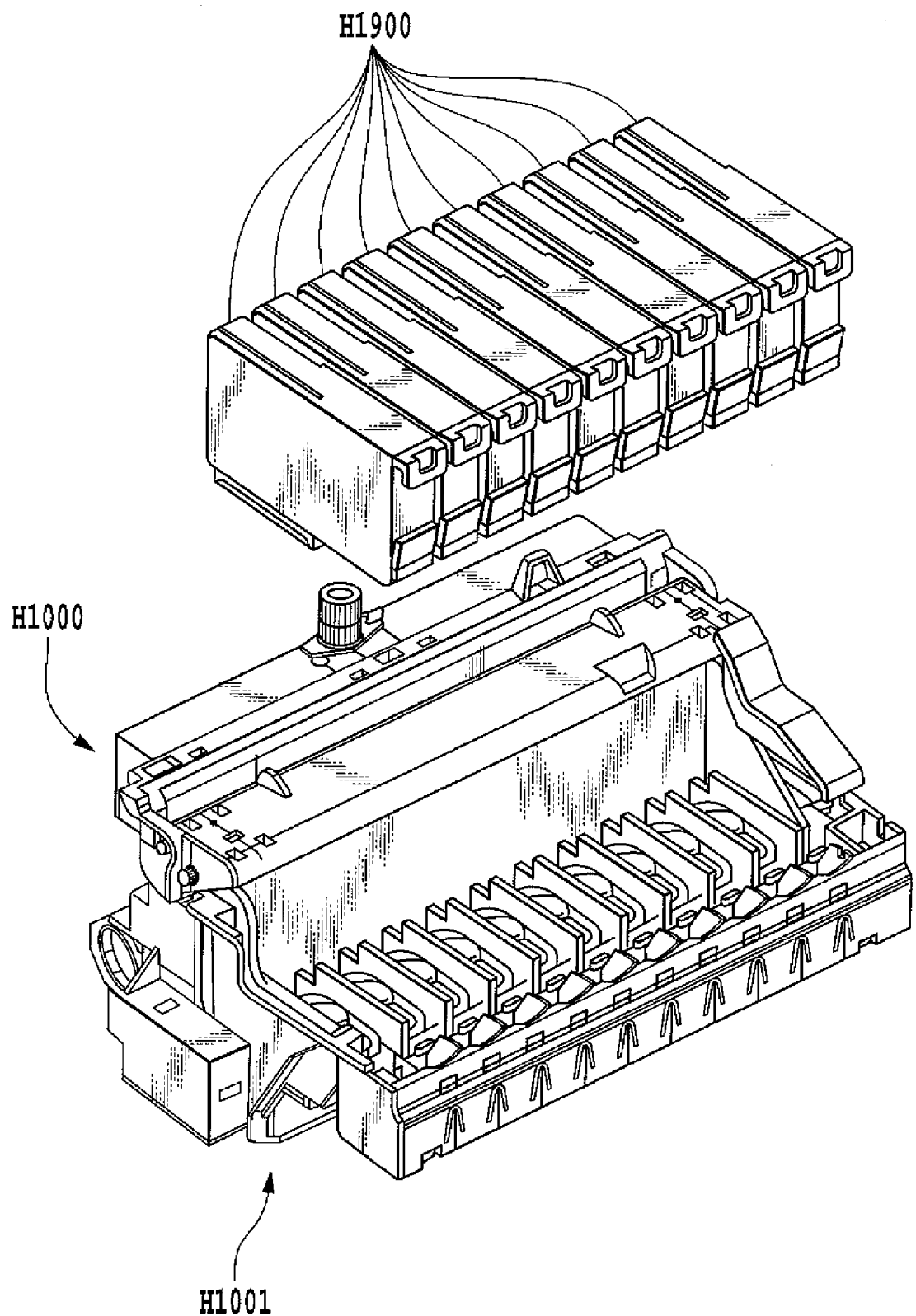
FIG. 21 is a perspective view of a head cartridge and ink tanks applied in the embodiment, which shows how the ink tanks are attached to the head cartridge.

FIG. 21 is a diagram showing how the ink tanks H1900 are attached to the head cartridge H1000 to which this embodiment is applied. The printing apparatus of this embodiment forms an image by use of the pigmented inks corresponding respectively to the ten colors. The ten colors are cyan (C), light cyan (Lc), magenta (M), light magenta (Lm), yellow (Y), black 1 (K1), black 2 (K2), red (R), green (G) and gray (Gray). For this reason, the ink tanks H1900 are prepared respectively for the ten colors. As shown in FIG. 21, each of the ink tanks can be attached to, and detached from, the head cartridge H1000. Incidentally, the ink tanks H1900 are designed to be attached to, and detached from, the head cartridge H1000 in a state where the head cartridge H1000 is mounted on the carriage M4000.

1.5 Configuration of Inks

Descriptions will be provided below for the ten color inks used in the present invention.

The ten colors used in the present invention are cyan (C), light cyan (Lc), magenta (M), light magenta (Lm), yellow (Y), black 1 (K1), black 2 (K2), gray (Gray), red (R) and green (G). It is desirable that all of the coloring agents used respectively for the ten colors should be pigments. In this respect, for the purpose of dispersing the pigments, publicly known dispersants may be used. Otherwise, for the purpose, it is sufficient that pigments surfaces are modified by use of a publicly known method, and that self-dispersants are added thereto. In addition, coloring agents used for at least some of the colors may be dyes as long as the use agrees with the spirit and scope of the present invention. Furthermore, coloring agents used for at least some of the colors may be what are obtained by harmonizing pigments and dyes in color, and a plurality of kinds of pigments may be included therein. Moreover, as for the ten colors of the present invention at least one kind of substance selected from the group consisting of an aqueous organic solvent, an additive, a surfactant, a binder and an antiseptic may be included in therein as long as the inclusion is within the spirit and the scope of the present invention.

2. Characteristic Structure

2.1 Suppression of Eccentricity-derived Unevenness

The present invention basically aims to provide a structure capable of suppressing deviation of dot-formation positions caused by insufficiency of conveyance accuracy due to eccentricity of a conveying roller.

Figure 22A:
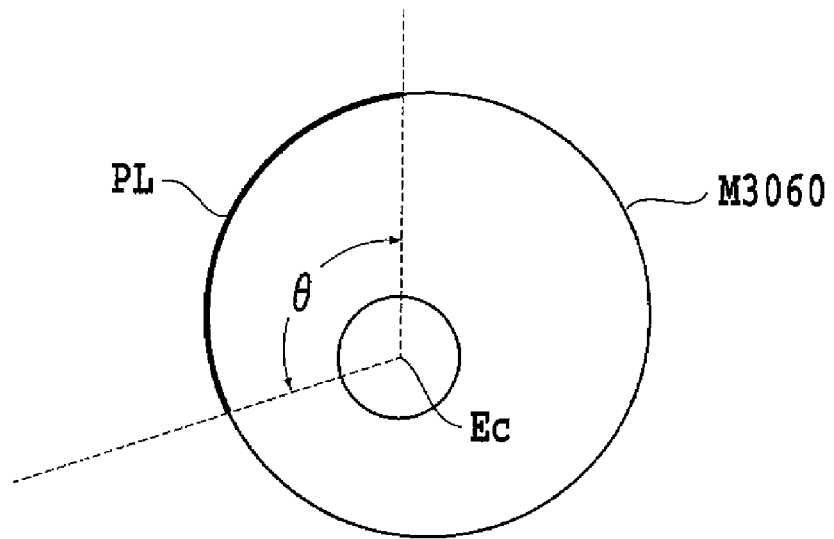
FIGS. 22A and 22B are schematic cross-sectional views each explaining a state in which an error is caused in the amount of conveyance of a printing medium even with rotation of a conveying roller used in a conveyance mechanism in this embodiment with an equal angle because the position of the conveying roller deviates from the central axis thereof.
Figure 22B:
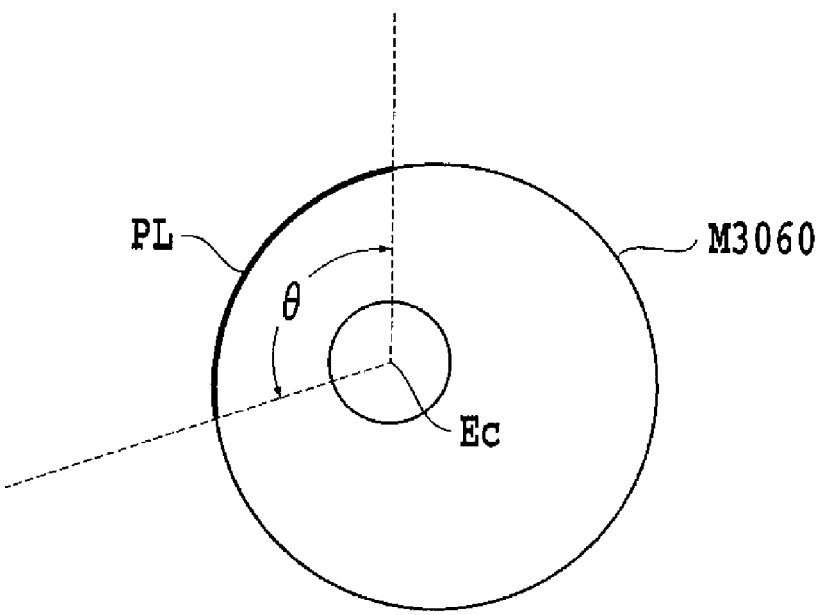

FIGS. 22A and 22B respectively show states in which the rotation central axis Ec of the conveying roller M3060 deviates from the geometric central axis. The presence of eccentricity causes a difference in length (an arc length) PL in a circumferential direction corresponding to an angle θ as shown in FIGS. 22A and 22B, even if the conveying roller M3060 is rotated by an equal angle θ. For this reason, an error is caused in the amount of conveyance of printing media.

Figure 23:
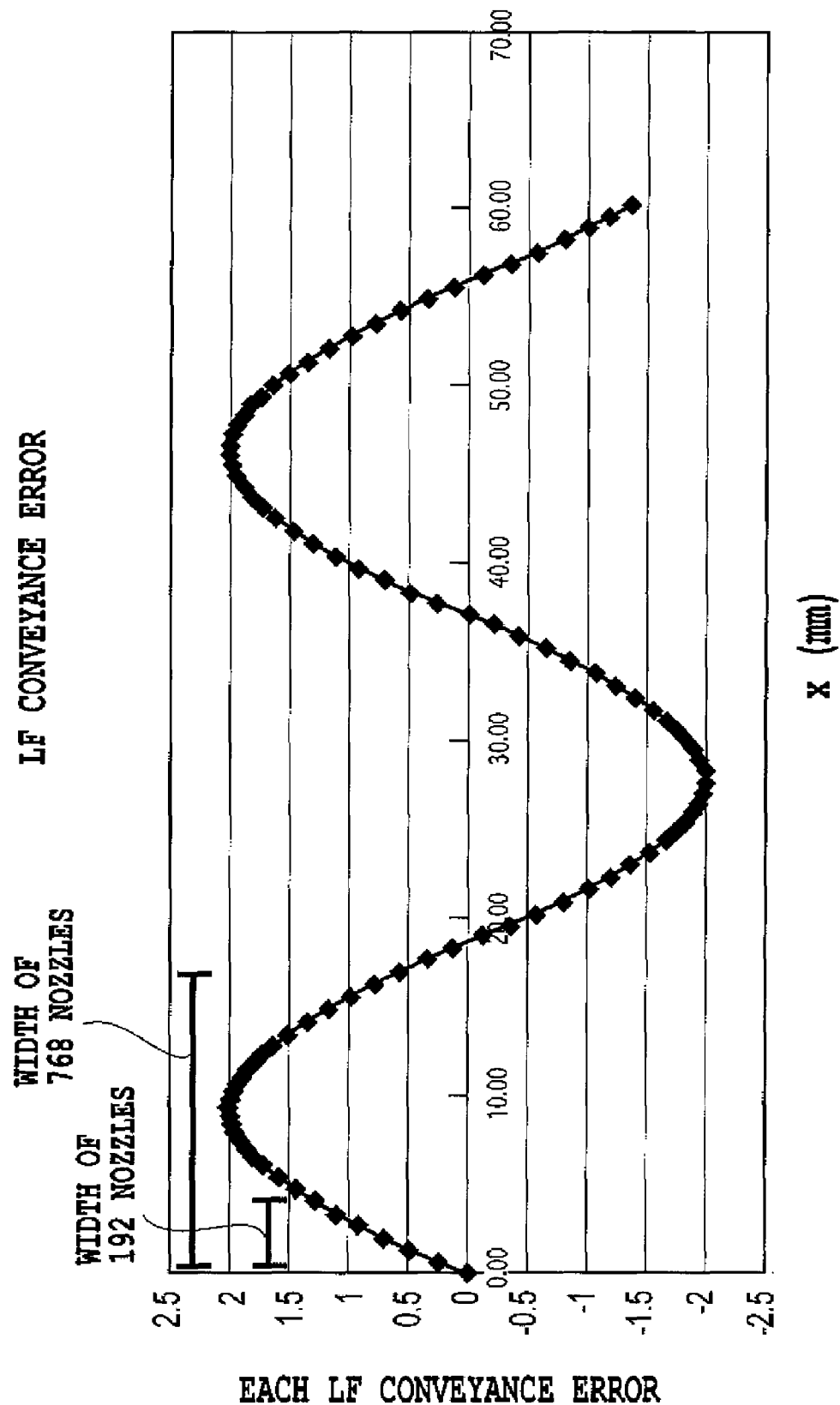
FIG. 23 is an explanatory view showing, with a graph, an error of conveyance accuracy due to eccentricity of the conveying roller.

FIG. 23 is a graph schematically showing an error of conveyance accuracy. As shown in FIG. 23, a conveyance error due to eccentricity is caused in both of a direction (a positive direction) in which the error is added to a normal amount of conveyance (an error-zero state), and a direction (a negative direction) in which the error is subtracted from the normal amount of conveyance. Here, as the conveyance error increases in the positive direction, positions of ink-dot-formation are placed more sparsely, so that white lines appear. Conversely, as the conveyance error increases in the negative direction, positions of ink-dot formation are placed more densely, so that black lines appear. Since the conveying roller is rotatably driven, the conveyance error appears with a length corresponding to one revolution of the conveying roller as one cycle. Note that a reduction in conveyance accuracy is caused by a combination of eccentricity of the conveying roller itself and eccentricity of a position where a conveying roller is attached. In any case, as shown in FIG. 23, the conveyance error appears with a length corresponding to one revolution of the conveying roller as one cycle.

Figure 24A:
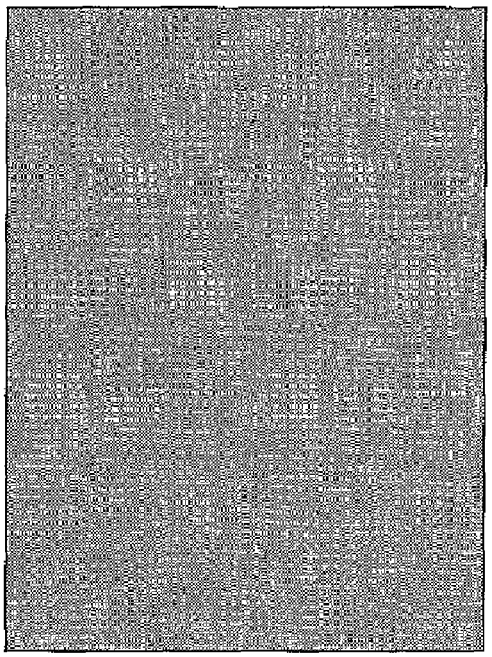
FIGS. 24A and 24B are views for respectively explaining an image without unevenness caused by eccentricity and an image with unevenness caused by eccentricity.
Figure 24B:
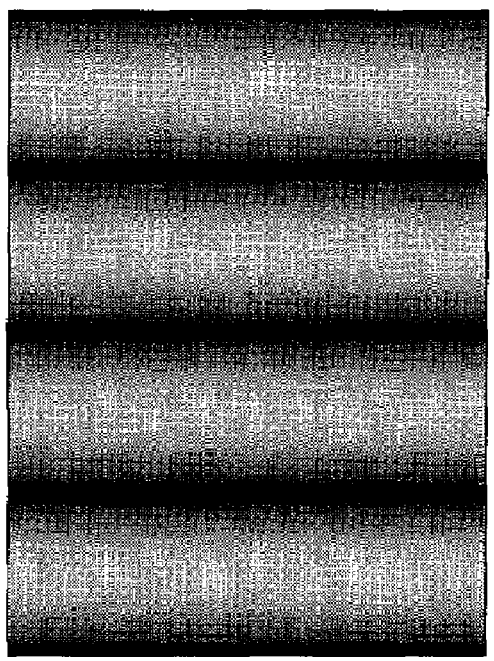

As a result, an image, which should be printed as that in the schematic diagram in FIG. 24A if the conveyance accuracy is ideal, is printed as an image having stripe-shaped unevenness (eccentricity-derived unevenness) periodically appearing in a conveyance direction with an amount of conveyance, which corresponds to one revolution of the conveying roller, as a cycle as shown in FIG. 24B. As mentioned above, this is easily recognized particularly at the time of monochrome-image printing, during which the achromatic image is printed by using ink K from the low density region. It should be noted that ink K indicates the aforementioned first black ink K1 or the second black ink K2. Here, suppose that the first black ink K1 is photo black ink for achieving a print with highly-glossy image on glossy paper, and that the second black ink K2 is matte black ink which is appropriate for matte paper having no glossy texture. In this case, the first black ink K1 can be used for the above printing.

In view of the aforementioned problem, the present inventors have recognized the fact that an influence on image quality due to the conveyance error on a printing medium depends on a length (a print swath) of the region printed in one scan of the printing head H1001 in a direction in which a printing medium is conveyed. That is, the present inventors have observed that the larger the print swath is, the more the eccentricity-derived unevenness is conspicuous. Conversely, the present inventors have observed that the smaller the print swath is, the less the eccentricity-derived unevenness appears. In other words, to narrow a nozzle-use range involved in printing is to reduce the amount of conveyance of a printing medium in each scan. The reduction in the amount of conveyance allows the total amount of conveyance needed for performing multi-pass printing to be small. Thus, the accumulated amount of conveyance errors is made small in a case where the printing on the region of the printing medium is completed by, for example, multi-pass printing. The following will further explain this point.

As mentioned above, 768 nozzles per one color, which may be involved in printing, are arranged on the printing head H1001 to allow printing with a density of 1200 dpi. Here, it is supposed that, using this printing head H1001, the following process is repeated 12 times. Specifically, in the process, a printing medium is conveyed, every one print scan, by the width corresponding to 64 (=768/12) nozzles. That is, it is supposed that 12-pass printing is performed in order to complete the printing of one image region of the printing medium by using the printing head H1001.

In this case, it is considered that the conveyance error shown in FIG. 23 is accumulated to correspond to 768 nozzles used for printing, and thereby influences the appearance of each printing region of the printing medium. Moving accumulated error values are obtained by calculating the accumulated error value for 768 nozzles by successively shifting 64 nozzles. The moving accumulated error values are shown as a curve of an "accumulated error for 768N" in FIG. 25. A cycle shown with this curve indicates a cycle of eccentricity-derived unevenness. It is considered that a magnitude of amplitude in the cycle corresponds to a degree of eccentricity-derived unevenness.

This eccentricity-derived unevenness can be corrected by narrowing the nozzle-use range involved in printing, to shorten the print swath in one scan. To narrow the nozzle-use range involved in printing to shorten the print swath in one scan is to reduce the amount of conveyance of a printing medium in each scan. As for the conveying roller M3060, to narrow the above range is to reduce a rotation angle for each scan.

Figure 26A:
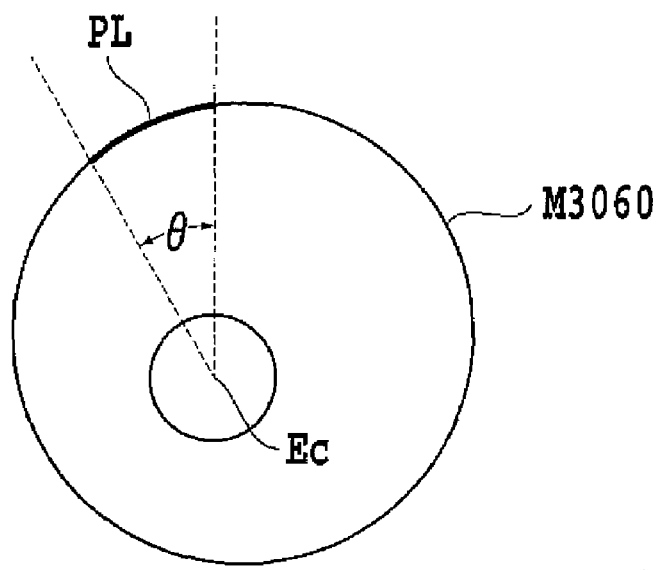
FIGS. 26A and 26B are schematic cross-sectional views each explaining a state in which the conveyance error is reduced by causing a rotation angle of the conveying roller to be smaller than that in FIGS. 22A and 22B.
Figure 26B:
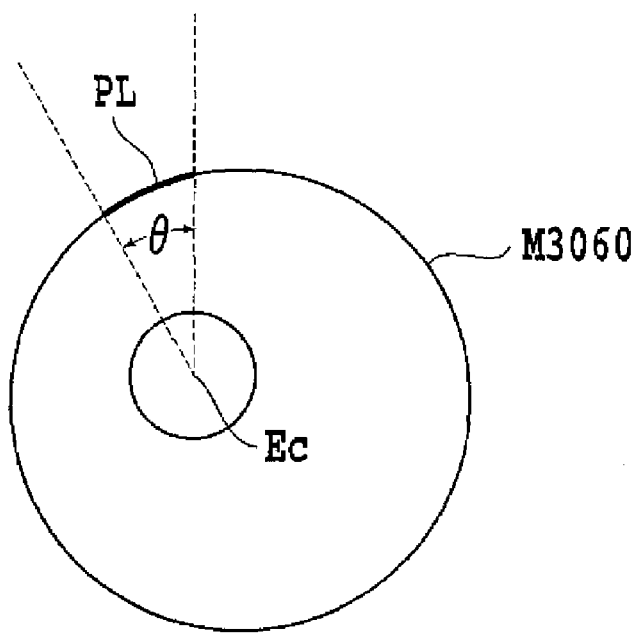

Each of FIGS. 26A and 26B shows a case where the rotation angle θ of the conveying roller M3060 is smaller than the cases respectively in FIGS. 22A and 22B. As is obvious from FIGS. 26A and 26B, although deviation of the rotation central axis Ec of the conveying roller M3060 causes a difference in length (arc length) PL in a circumferential direction corresponding to the angle θ, the difference is smaller than that in the case in each of FIGS. 22A and 22B. Thus, in a case where the printing on the region of the printing medium is completed by, for example, multi-pass printing, the reduction in the amount of conveyance allows the total amount of conveyance needed for performing multi-pass printing to be small and the accumulated amount of conveyance errors to be small.

Figure 25:
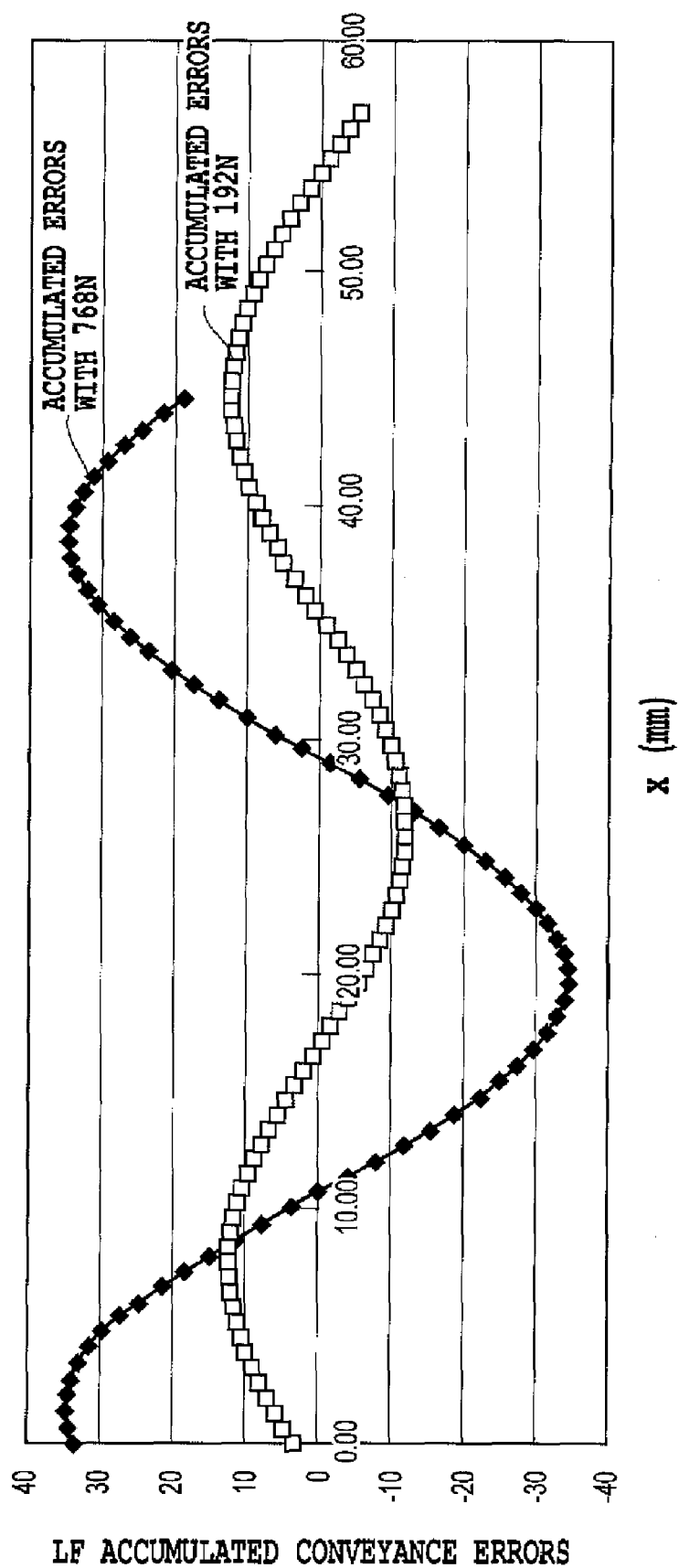
FIG. 25 is an explanatory view showing, with a graph, a change in an accumulated value of conveyance errors corresponding to the size of a nozzle-use range.

As one example, a case where the nozzle-use range involved in printing is narrowed, as described below, will be discussed. Specifically, out of the maximum printable swath corresponding to the range in which the 768 nozzles included in the printing head H1001 are arranged, the nozzle-use range involved in printing is narrowed to correspond to 192 (=768/4) nozzles so that the printing range is made to be ¼ of the above maximum printable swath. Also in this case, the conveyance error shown in FIG. 23 is accumulated to correspond to the 192 nozzles in the same way as that mentioned above to obtain moving accumulated error values. In this case, each accumulated error value for the 192 nozzles is calculated by successively shifting 16 (=192/12) nozzles, thereby a characteristic as shown by "accumulated error for 192N" in FIG. 25 is obtained. It can be understood from these results that the nozzle amplitude is reduced to about ¼, and that the degree of eccentricity-derived unevenness is accordingly reduced in a case where the nozzle-use range is narrowed to correspond to 192 nozzles, as compared with a case where all of 768 nozzles are used. This result corresponds to a difference in appearance between eccentricity-derived unevenness appearing on an image actually printed by using 768 nozzles and eccentricity-derived unevenness on an image printed by using 192 nozzles.

As mentioned above, the eccentricity-derived unevenness is likely to be visible particularly at the time when print is made for a monochrome image by using ink K dominantly. The present invention aims to obtain a printed image in which unevenness is appropriately suppressed according to the number of ink colors to be used at the time of printing an image.

In this embodiment, it is possible to select a monochrome image printing mode (a mode for particularly printing an achromatic image) in which the small number of ink colors are used for printing an image, or a mode employed for performing high-quality color printing on the high-quality printing medium. Then, according to the selected mode, the nozzle-use range involved in printing is narrowed, and the amount of conveyance of the printing medium is reduced.

2.2 Setting of Pprinting Mode, etc.

An explanation will be given of a structure for receiving selection settings of various types to be made by a user at the time of printing.

Figure 27:
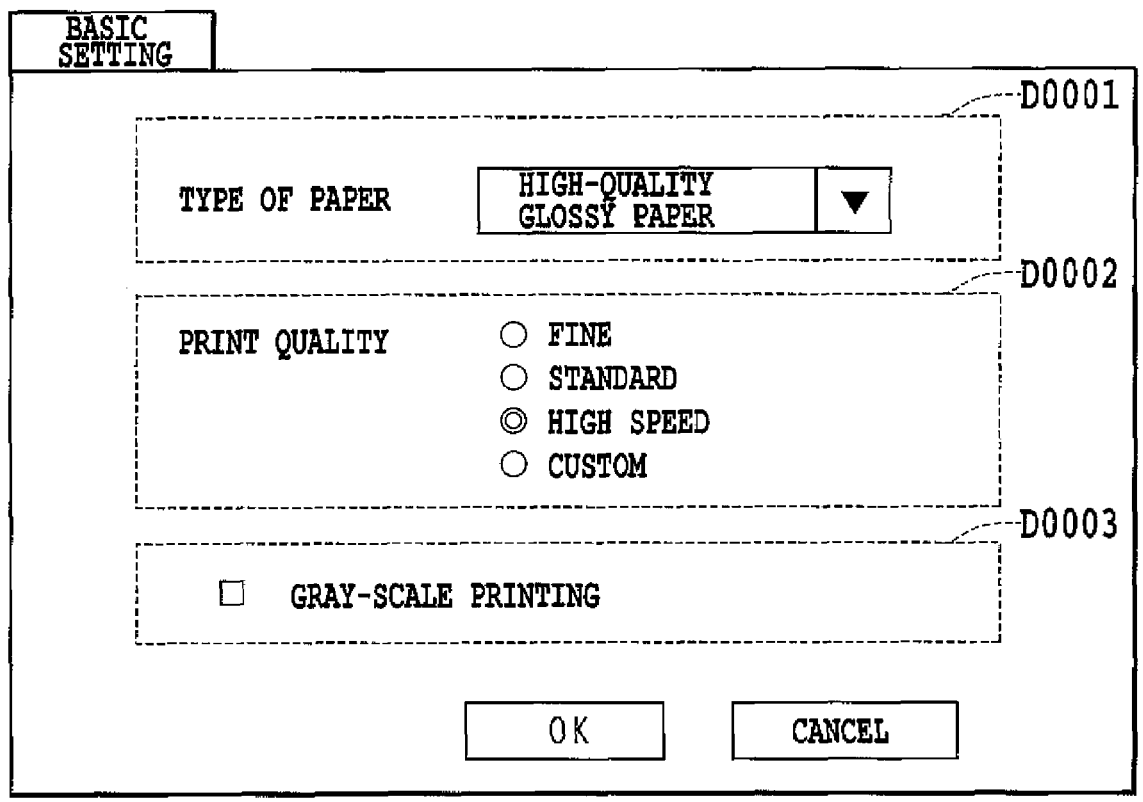

FIG. 27 shows an example of a UI screen that can be used when setting printing quality, a type of printing medium to be used at the time of printing, and the like. Here, D0001 indicates a portion where a type of printing medium to be used is designated. Here, the type of printing medium (high-quality glossy paper, low-priced glossy paper, plain paper, coated paper, and the like) can be selected from types listed in a pull-down menu displayed in response to an operation of a menu display button. D0002 indicates a portion where a printing mode relating to print quality is selected. Here, one of "fine" (high-quality printing), "standard," "high speed" (high-speed printing) and "custom," and the like can be selected with a corresponding radio button.

D0003 indicates a portion where one of color image printing modes and monochrome image printing mode is selected. When a checkbox D0003 of "gray-scale printing" is checked, printing (printing of an achromatic image in this embodiment) is carried out in the monochrome-image printing mode. When the checkbox is not checked, printing is carried out in the color-printing mode. Moreover, even when an inputted image is a color image, the image can be outputted as a monochrome image if the checkbox D0003 labeled "gray-scale printing" is checked.

Note that, here, the UI screen displayed on a monitor of the host apparatus J0012 is used to perform various settings. However, the present invention is not limited to the UI screen, and a control section, for example, provided to the printing apparatus, may be used.

In addition, in this embodiment, a different color-conversion LUT is used for each of the following two cases where the same achromatic image or the same achromatic image portion is printed. Specifically, the color-image printing mode is selected in one of the two cases, and the monochrome-image printing mode is selected in the other of the two cases.

Figure 28A:
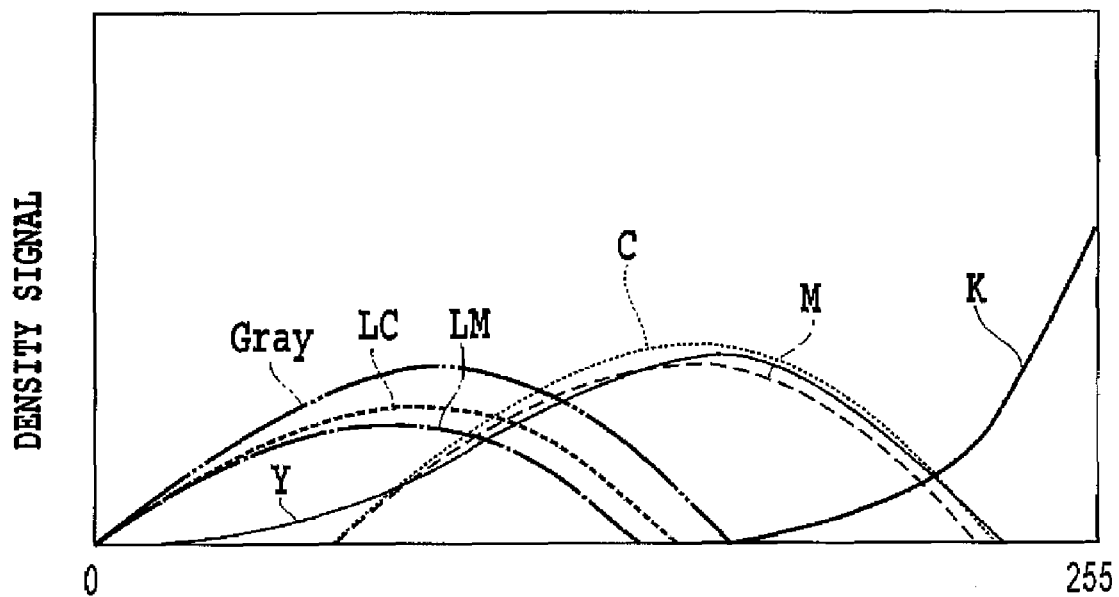
FIGS. 28A and 28B are explanatory views showing contents of a color-conversion LUT used when a color-image printing mode is selected, and when a monochrome-image printing mode is selected, respectively.
Figure 28B:
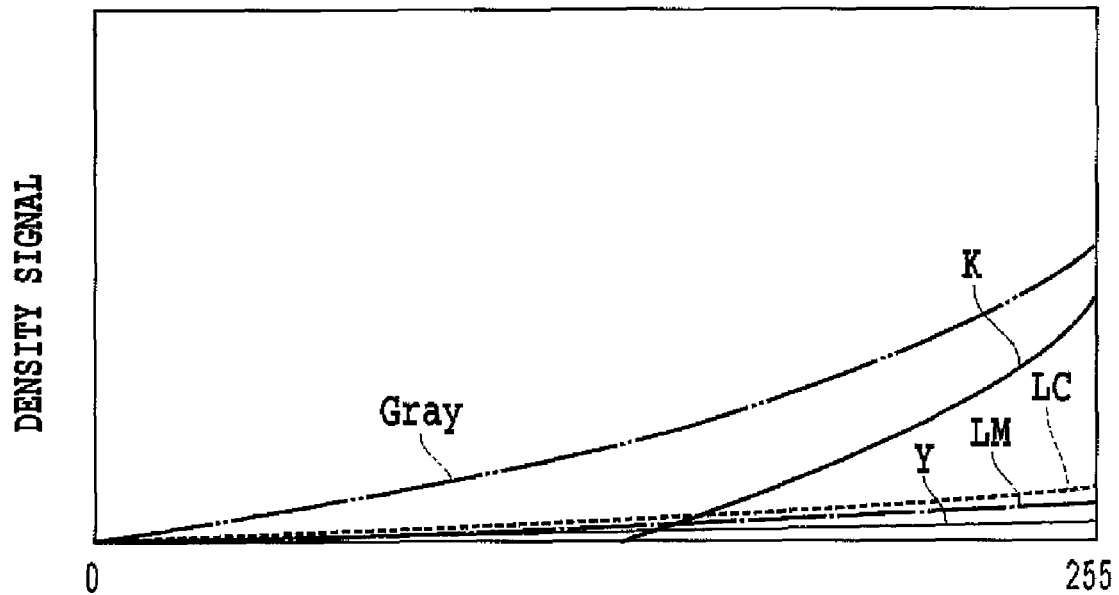

Each of FIGS. 28A and 28B shows a color-conversion LUT used in the subsequent process J0003 for expressing a gray line. FIG. 28A shows a color-conversion LUT of a case where the color-image printing mode is selected. FIG. 28B shows a color-conversion LUT of a case where the monochrome-image printing mode is selected. In each of FIGS. 28A and 28B shows the contents of the conventional color-conversion look-up table (LUT) in a case of using six colors (K, C, M, Y, Lm and Lc). In FIGS. 28A and 28B, the horizontal axis indicates a range of colors from white (W) represented by (R, G, B)=(0, 0, 0) to black (K) represented by (R, G, B)=(255, 255, 255). Moreover, the vertical axis corresponds to a density signal of each color outputted during the subsequent process J0003. Then, in the color-conversion LUT shown in FIG. 28A, inks of seven colors of Gray, Lc, Lm, C, M, Y and K (K1 or K2) are appropriately selected and used for the respective density regions. Specifically, Gray, Lc, Lm, and Y are mainly used in the low-density region, C, M and Y are mainly used in the intermediate-density region, and K is mainly used in the high-density region. On the other hand, in the color-conversion LUT shown in FIG. 28B, inks of five colors of Gray, Lc, Lm, Y and K (K1 or K2) are appropriately selected and used for the respective density regions. More specifically, Gray is dominantly used from the low-density region to the high-density region. By using Gray dominantly, it is possible to suppress granular impression and color deviation. In contrast, since Lc, Lm and Y are used only for toning, the amounts of these colors to be used are limited to be minute in any region, from the low-density region to the high-density region. Use of K begins from the intermediate-density region, and more amount of K is used as the printing proceeds from the intermediate-density region to the high-density region. This makes it possible to represent the gray scale having less granular impression and less color deviation.

2.3 Conditions for Determining Nozzles to be Used

In this embodiment, the narrowing (restriction) in the nozzle-use range involved in printing, or the reduction in the amount of conveyance of a printing medium is carried out according to the mode selection. Moreover, in this embodiment, in addition to the mode selection, the following conditions are used as the conditions for determining nozzles to be used.

A first condition is that a nozzle group used at the time when the nozzle-use range is restricted, is not fixed. The reason thereof is described below.

When printing is continued with the restricted number of used nozzles, a large difference occurs in the number of accumulated ejection operations between the nozzles used in the relevant printing and the other nozzles. It is recognized that a state of ink ejection from the nozzles varies depending on whether the number of accumulated ejection operations is large or small. It is considered that changes in the ink-ejection amount and in an ink-ejection speed occur mainly because of the deterioration in durability of an ejection mechanism (element and the like for generating energy used in the ink ejection) provided to the nozzles, as the accumulated number of ejection operations increases.

FIGS. 29A to 29C are schematic views each explaining an influence upon an image in a case where printing is continued with the restricted number of using nozzles. Each of FIGS. 29A and 29B illustrates a nozzle column corresponding to a certain color ink, and 768 nozzles are arranged in each nozzle column. FIG. 29A shows a case where the number of nozzles to be used is limited to 192 nozzles placed at the upper end side thereof in FIG. 29A at the time when the nozzle-use range involved in printing is narrowed. FIG. 29B shows a case where all of the nozzles are used without narrowing the nozzle-use range involved in printing.

In this embodiment, whether all of the nozzles are used in printing or some of the nozzles are used is determined according to the mode selection as mentioned above. Here, it is considered that an image printed with one print scan would appear as the image shown in FIG. 29C when the image is printed in the following manner. Specifically, first, a nozzle-use range is narrowed, and then the printing is continued by using a nozzle group of which the number of nozzles is restricted as shown in FIG. 29A. Thereafter, a uniform image is printed by use of all of the nozzles as shown in FIG. 29B. The reason for the appearance of the printed image is as follows. Specifically, the number of accumulated ejection operations of 192 nozzles placed on the upper end side thereof in FIG. 29A is larger than those of the other nozzles, and thereby durability is deteriorated to reduce the amount of ink ejection. As a result, only the portion where printing is made by using the relevant 192 nozzles appears to be pale. When such a density difference occurs on the printed image in one scan, a so-called band unevenness appears on an image finally completed.

Accordingly, this embodiment is designed to obtain the equal number of accumulated ejection operations in all of nozzles as much as possible without fixing the range of nozzles to be used at the time of the relevant printing, in the mode in which print is made with the restricted nozzle-use range.

Moreover, this embodiment is designed to appropriately narrow the nozzle-use range when print is made on the front portion or on the rear portion of the printing medium.

Figure 30:
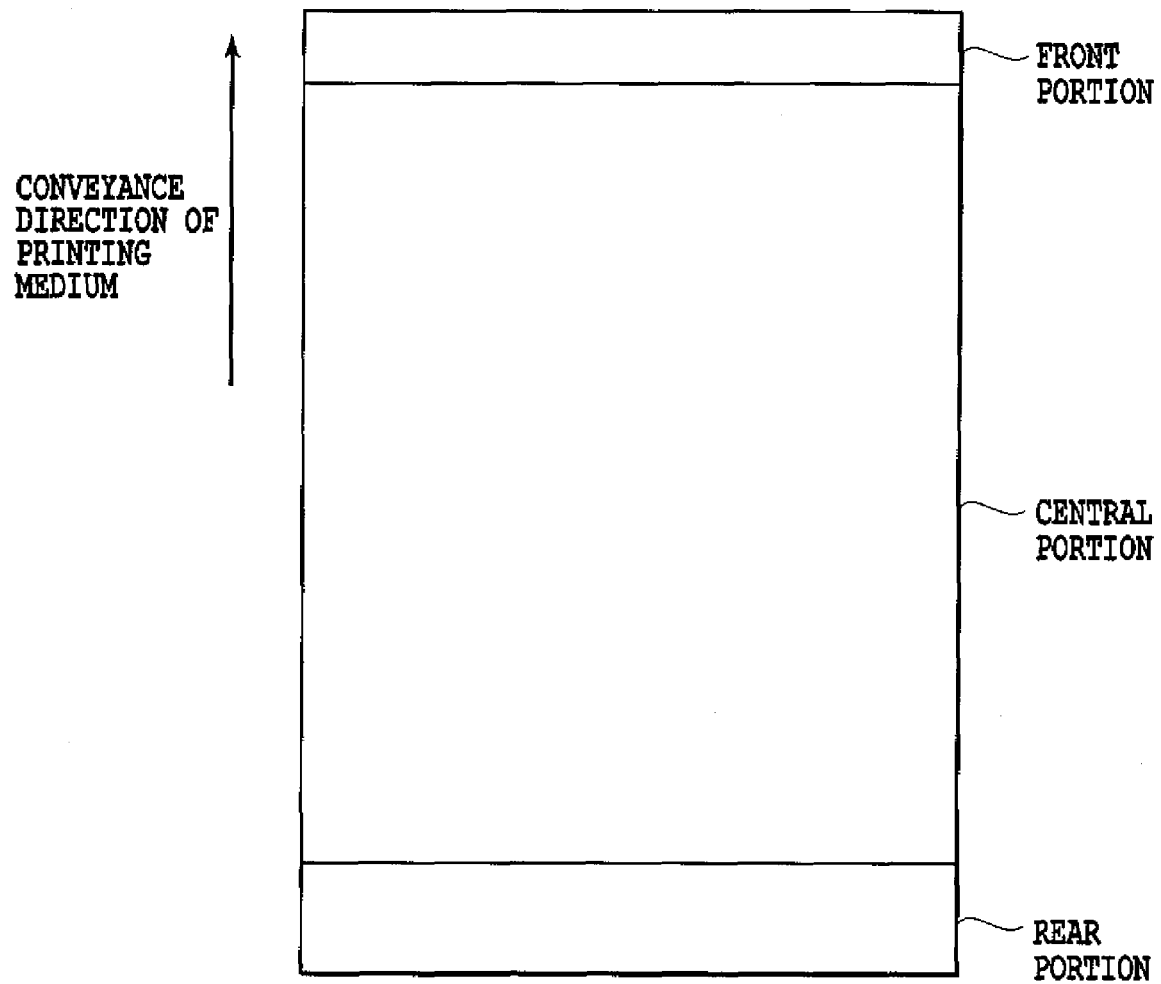
FIG. 30 is a view showing each of the front portion, the central portion and the rear portion at the time of making a print on a printing medium with a printing apparatus of the embodiment.

FIG. 30 is a view showing each region of the front portion, the central portion and the rear portion at the time when marginless printing is executed on an A4-size (294 mm×210 mm) printing medium with the printing apparatus of this embodiment. Here, the central portion of the printing medium is a region where print can be made with the printing medium held with both of the conveying roller M3060 and the paper discharging roller M3100. Moreover, the front portion is a region where print is made before the front end of the printing medium is supported by the paper discharging roller M3100, and the rear portion is a region where print is made after the rear end of the printing medium is separated from the conveying roller M3060.

One reason for narrowing (restricting) the nozzle-use range in the front portion and in the rear portion is how the platen M3040 provided between the conveying roller M3060 and the paper discharging roller M3100 is structured.

The printing apparatus of this embodiment provides an outputted product of the same quality as that of silver-salt photograph. The apparatus is structured as a printing apparatus which is capable of printing an image without margins with a style of printing so-called "marginless printing."

Figure 31:
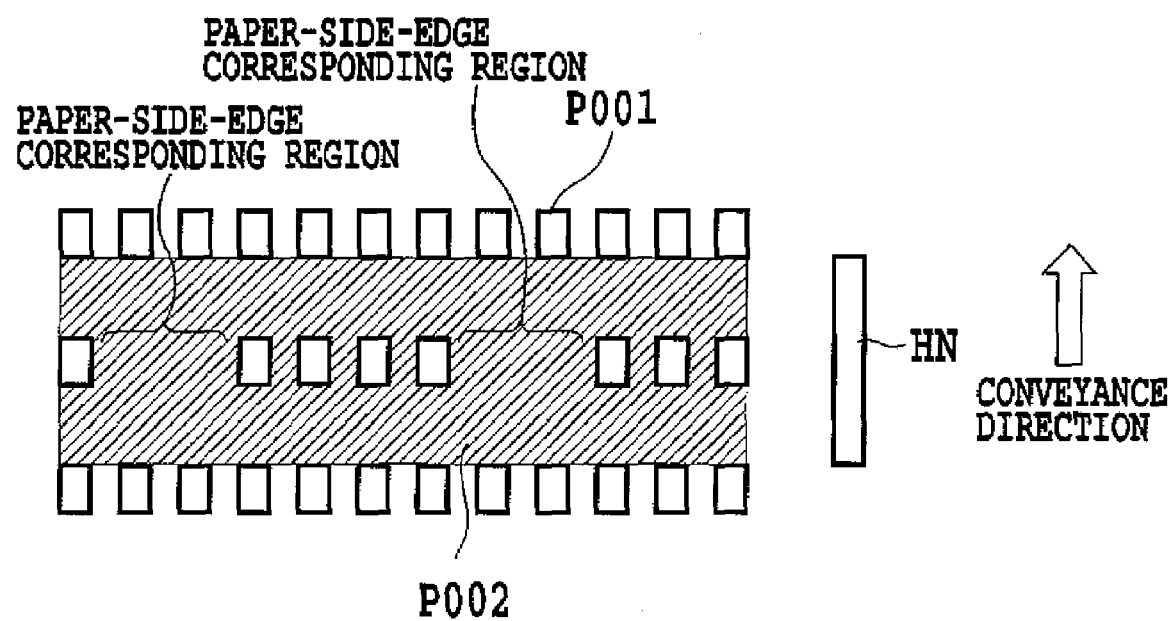
FIG. 31 is a schematic plan view of a platen of the printing apparatus of the embodiment as viewed from above.

FIG. 31 is a schematic plan view of a platen M3040 as viewed from above. The printing medium is conveyed to the upper side from the lower side in FIG. 31 along a conveyance direction shown by an arrow. In other words, the conveying roller M3060 and the paper discharging roller M3100 are respectively arranged at the lower side and the upper side in FIG. 31.

HN indicates a nozzle column provided to the printing head H1001, and FIG. 31 shows only one nozzle column corresponding to one color for simplicity. The platen M3040 has an opening, and holds the printing medium passing through the printing region where the nozzle column HN is scanned. In the opening, a plurality of ribs P001 for holding the printing medium are arranged as standing, and an ink-absorbing member P002 is provided for absorbing ink ejected outside the front and rear edges, as well as outside the side edge of the printing medium at the time of marginless printing.

In the opening of the platen M3040, ribs P001 are arranged along the end portion of the upstream side in the conveyance direction, and along the end portion of the downstream side. The distance between one of the ribs placed in the end portion of the upstream and the corresponding rib placed in the end portion of the downstream is supposed to be larger than a length corresponding to the maximum number of nozzles (768 nozzles in this embodiment) used at the time when the print is made on the central portion of the printing medium. This prevents the ribs from being smudged by ink ejected outside the right and left side edges of the printing medium.

Moreover, the ribs P001 are also arranged at the substantially central portion of the opening in the conveyance direction of the printing medium to support the printing medium. The ribs P001 arranged in the central portion are provided in a way that these ribs P001 would not be smudged by ink ejected outside the front and rear edges, and outside the right and left side edges of the printing medium at the time of marginless printing. Such a rib arrangement and the maximum number of nozzles involved in printing on the front and rear portions of the printing medium, are appropriately determined in consideration of the mutual relationship therebetween.

Another reason for restricting the nozzle-use range in printing the front and rear portions of the printing medium is that the printing medium is not concurrently supported by both of the conveying roller M3060 and the paper discharging roller M3100 at the time when print is made on the front portion or on the rear portion of the printing medium. In a state in which the printing medium is supported by only one of the rollers, flatness of the printing medium is not ensured, and a distance (hereinafter referred to as a head-to-paper distance) between the end portion (the front portion or the rear portion), which is not supported, and the printing head, varies more or less. Thereby, the resultant state is unstable. In the central portion, print scan is performed while ink is ejected at a timing corresponding to a predetermined head-to-paper distance maintained on the platen with the front and the back rollers. Thereby, ink droplets ejected at an appropriate timing form dots on the printing medium, and then the dots are arranged at an appropriate pitch. Thus, an image is formed. In contrast, in the front and the rear portions, due to the variable head-to-paper distance in the print swath thereof, the dot positions on the printing medium are also variable if the variation in the head-to-paper distance is large. This causes adverse effects on a resultant image, such as white lines, black lines, or granular impression.

For this reason, in this embodiment, the print swath of the printing head (that is, nozzle-use range at the time when print is made) is suppressed when print is made on the front and rear portions, and an amount of conveyance of the printing medium is reduced accordingly. This makes it possible to narrow the print swath of the printing head, and to suppress the variations in the head-to-paper distance in the print swath.

Figure 32:
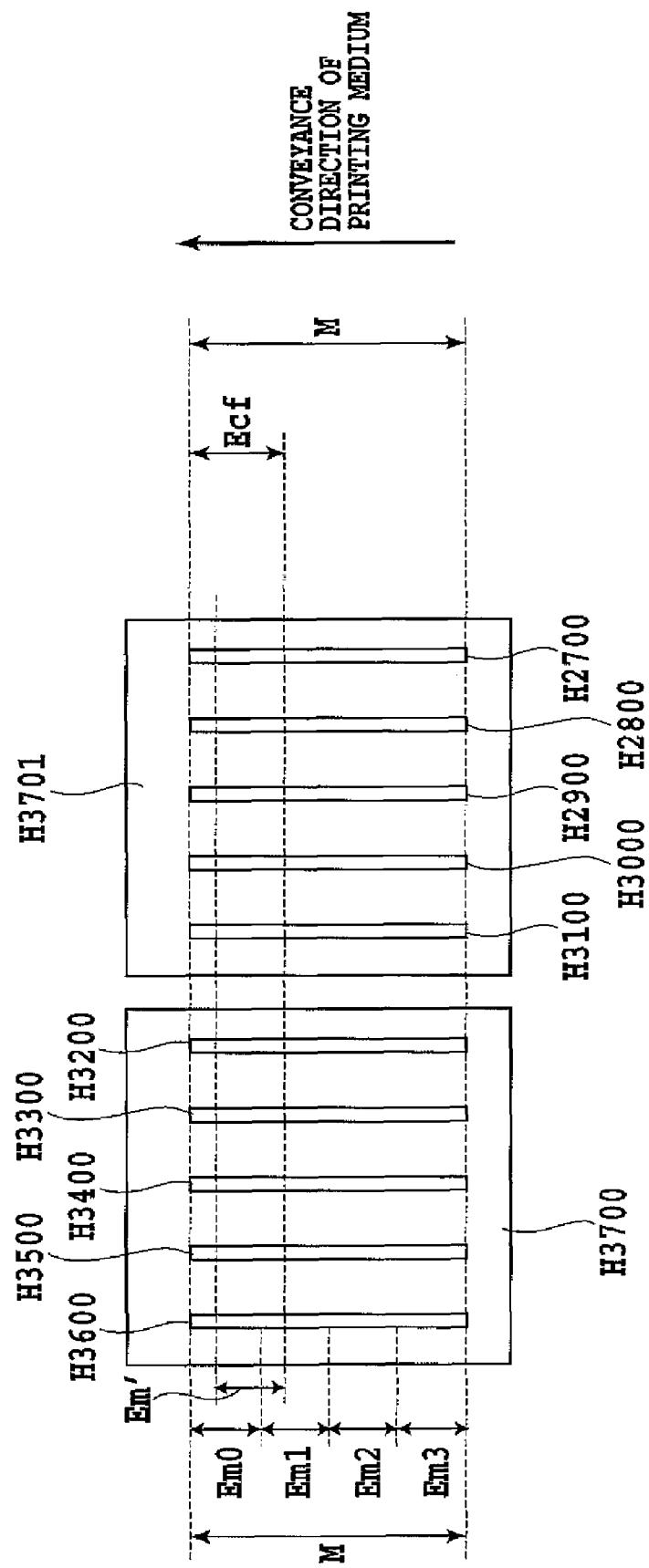
FIG. 32 is a view explaining a nozzle-use range according to a printing mode, and the like, and is a schematic view in which a printing head used in this embodiment is viewed from a nozzle-forming surface side.

FIG. 32 is a view explaining a nozzle-use range determined in consideration of the aforementioned conditions. FIG. 32 schematically shows a state of the printing head H1001 used in this embodiment, as viewed from the side of a surface in which the nozzles are formed. The printing head H1001 of this example includes two printing element substrates H3700 and H3701 each having five nozzle columns of the respective five colors out of the aforementioned ten colors. H2700 to H3600 indicate nozzle columns corresponding to inks of the respective ten different colors.

On the printing element substrate H3700, formed are nozzle columns H3200, H3300, H3400, H3500 and H3600 to which inks of gray, light cyan, black 1, black 2 and light magenta are respectively supplied, and from which inks of these colors are respectively ejected. On the other printing element substrate H3701, formed are nozzle columns H2700, H2800, H2900, H3000 and H3100 to which inks of cyan, red, green, magenta and yellow are respectively supplied, and from which inks of these colors are respectively ejected. Each nozzle column is composed of 768 nozzles arranged at an interval of 1200 dpi in a direction in which the printing medium is conveyed, and causes ink droplets of approximately two picoliter to be ejected. An opening area of each nozzle-ejection port is set at approximately 100 square μm.

In the mode where print is made with the restricted (narrowed) nozzle-use range, as shown in the left portion of FIG. 32, the entire range M of each nozzle column, that is, 768 nozzles are equally divided into four groups, and each of the divided regions (shown by marks Em0 to Em3 from the downstream side in the conveyance direction, that is, from the front end side of the printing medium) are used for printing on the central portion. Each of the nozzle regions Em0 to Em3 is composed of continuously-arranged 192 nozzles. In this embodiment, the divided region to be used for printing on the central portion is not fixed, and the regions Em0 to Em3 are appropriately switched to be used. For printing on the front and rear portions, used is a region Em' including 192 nozzles continuously arranged towards the inside, from a position biased inward by 64 nozzles from the lowermost downstream end portion. Incidentally, in this embodiment, the relevant divided region including 192 nozzles is used for printing on the front and rear portions, and on the central portion of the printing medium. However, the number of nozzles to be used for printing on the front and rear portions may be smaller than that used for printing on the central portion.

In the mode where print is made without restricting (narrowing) nozzle-use range, the entire range M of each nozzle column, that is, 768 nozzles are used for printing on the central portion of the printing medium. However, in a case of printing on the front and rear portions, used is a region Ecf including 256 nozzles positioned at the downstream side (the paper discharging roller side) in the conveyance direction of the printing medium as shown in the right portion of FIG. 32.

2.4 Embodiment of Printing Operation According to Set Printing Mode, and the Like.

An explanation will be given of a specific example of a printing operation carried out on the basis of the aforementioned nozzle-use range.

First Embodiment of Printing Operation

In a first embodiment of printing operation it is supposed that, in a case where the user checks a checkbox D0003 shown in FIG. 27 to select monochrome-image printing (gray-scale printing) mode, print is made on the entire surface of the printing medium including the central portion of the printing medium, with the restricted (narrowed) nozzle-use range. The printing mode used here is hereinafter referred to as "entire-surface nozzle-restriction printing (or a restricted printing mode)." In other cases, it is determined that print is made on at least the central portion of the printing medium, without restricting (narrowing) the nozzle-use range. This printing mode is hereinafter referred to as "normal printing (or a non-restriction printing mode)."

Figure 33:
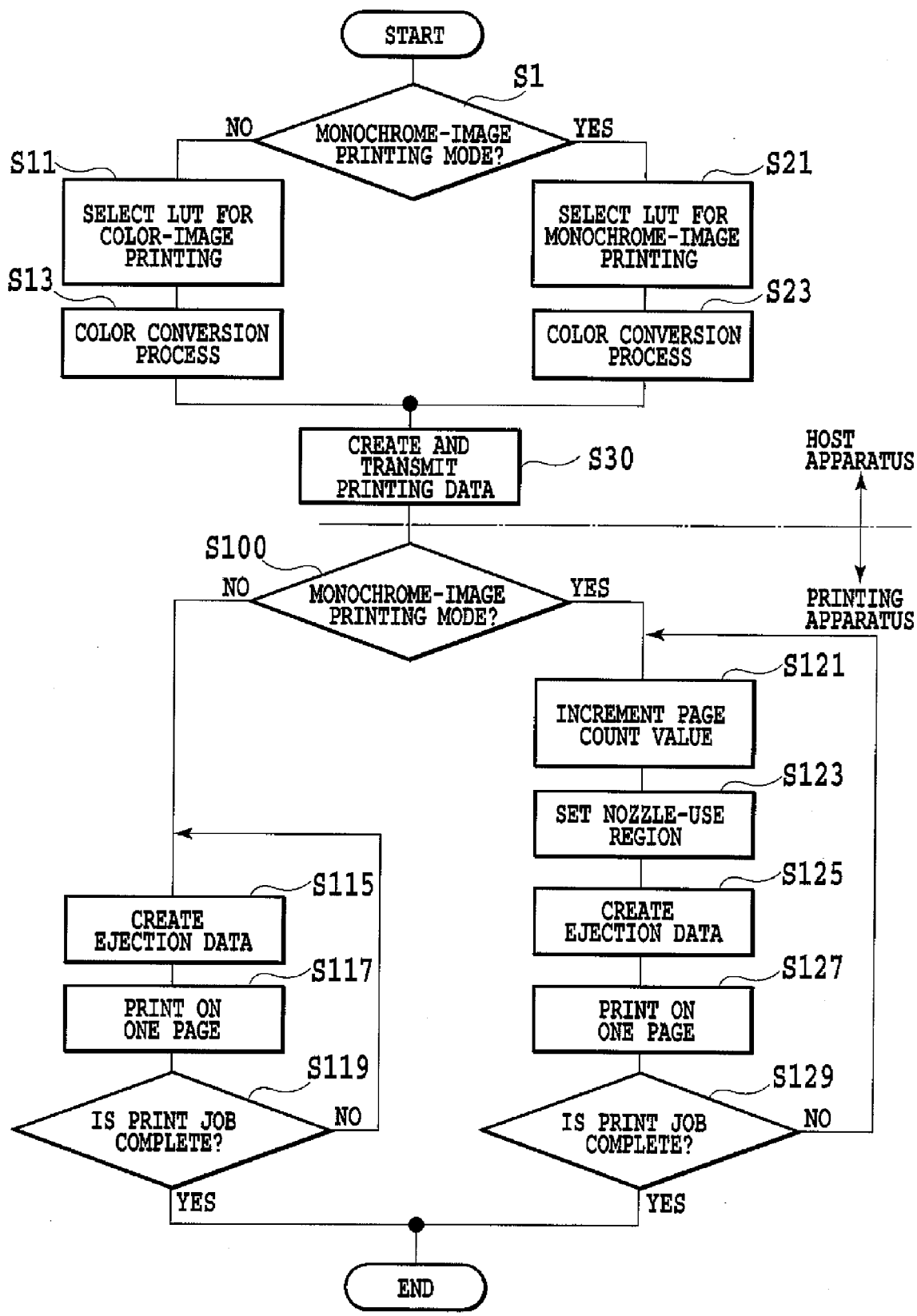
FIG. 33 is a flowchart showing an example of a printing process executed in a printing system of the embodiment.

FIG. 33 is a flowchart showing an example of a printing process executed in a printing system of this embodiment. First, in step S1, it is determined whether a monochrome-image printing mode is selected.

In a case where it is determined in step S1 that the monochrome-image printing mode is not selected, the operation proceeds to step S11 to select a color-conversion LUT for color-image printing. Thereby, a color-conversion process is carried out in step S13 on the basis of the selected color-conversion LUT. In this case, even when an image to be printed is an achromatic image, or has an image portion, the LUT shown in FIG. 28A is applied to the relevant image or image portion.

On the other hand, in a case where it is determined in step S1 that the monochrome-image printing mode is selected, the operation proceeds to step S21 to select a color-conversion LUT for monochrome image printing. Thereby, a color-conversion process is carried out in step S23 on the basis of the selected color-conversion LUT. In this case, even when an image to be printed is a color image, or has a color-image portion, the LUT shown in FIG. 28B is applied to the relevant image or image portion.

In step S30, data in which color-conversion has been carried out as described above undergoes a process required for creating print data. The above procedure is executed by a host apparatus J0012, which provides a printing apparatus J0013 with the created print data as well as the setting information shown in FIG. 2.

In accordance with the above process, the printing apparatus J0013 executes the following control.

In this control procedure, the printing apparatus J0013 first recognizes whether the selected mode is a monochrome-image printing mode (step S100).

In a case where it is determined in step S100 that the selected mode is not a monochrome-image printing mode, the printing apparatus J0013 executes normal printing. In this example, in a case of performing normal printing, it is determined that printing (eight-pass printing) is performed by scanning eight times by using 768 nozzles of each nozzle column for printing on the central portion of the printing medium. In a case of printing on the front and rear portions, it is determined that eight-pass printing is performed by using the region Ecf including 256 nozzles shown in the right portion of FIG. 32. It should be noted that eight-pass printing means that the print scan is performed eight times on one image region of the printing medium at the time of multi-pass printing. Four-pass printing has been explained with reference to FIGS. 4 and 5, and the same explanation holds true for eight-pass printing. In other word, nozzles (768 nozzles or 256 nozzles) to be used are divided into eight nozzle groups, and such a mask pattern that a complementary relationship is kept among these eight nozzle groups is applied to each of these nozzle groups in the similar manner to that in the above description to perform scanning. Then, in each scan, the printing medium may be conveyed by a length corresponding to the length of the divided region.

In the normal printing, suitable ejection data corresponding to the nozzle range to be used for printing on the front portion, the central portion and the rear portion of the printing medium is created (step S115). Thereby, a printing operation for one page of printing medium is executed (step S117). Then, the printing apparatus J0013 determines whether a print job is completed after every print on one page (step S119). When there is data on a next page in the print job, the operation returns to step S115 to repeat the series of aforementioned steps. When data on a next page is not present, this process is completed.

An operation performed at the time of normal printing will be explained in more detailed by using FIGS. 34A to 34C and FIGS. 35A and 35B.

For printing on the front portion of the printing medium, 256 nozzles positioned at the downstream side in the conveyance direction of the printing medium, are used as shown in FIG. 34A. The same holds true for printing on the rear portion (FIG. 34C). The nozzles to be used are thus restricted at the time print is made on the front and rear portions of the printing medium. Thereby, ink is prevented from being ejected on the ribs P001. For printing on the central portion of the printing medium, 768 nozzles of the entire range M, which can be involved in printing, are used as shown in FIG. 34B. Also in this case, the ribs P001 are appropriately arranged (that is, the ribs are not arranged in the positions corresponding to, for example, side edges of a standard-size printing medium) Thus, ink is not ejected on the ribs P001.

Figure 35A:
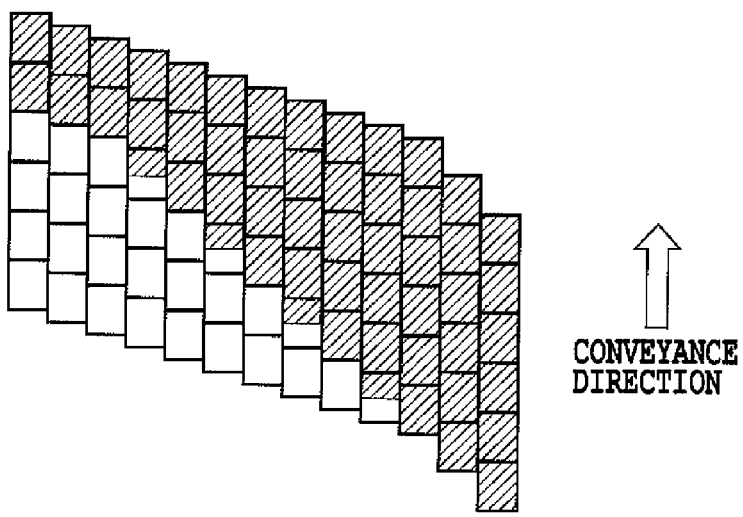
FIGS. 35A and 35B are schematic views each explaining an operation performed when normal printing is performed in the process in FIG. 33.
Figure 35B:
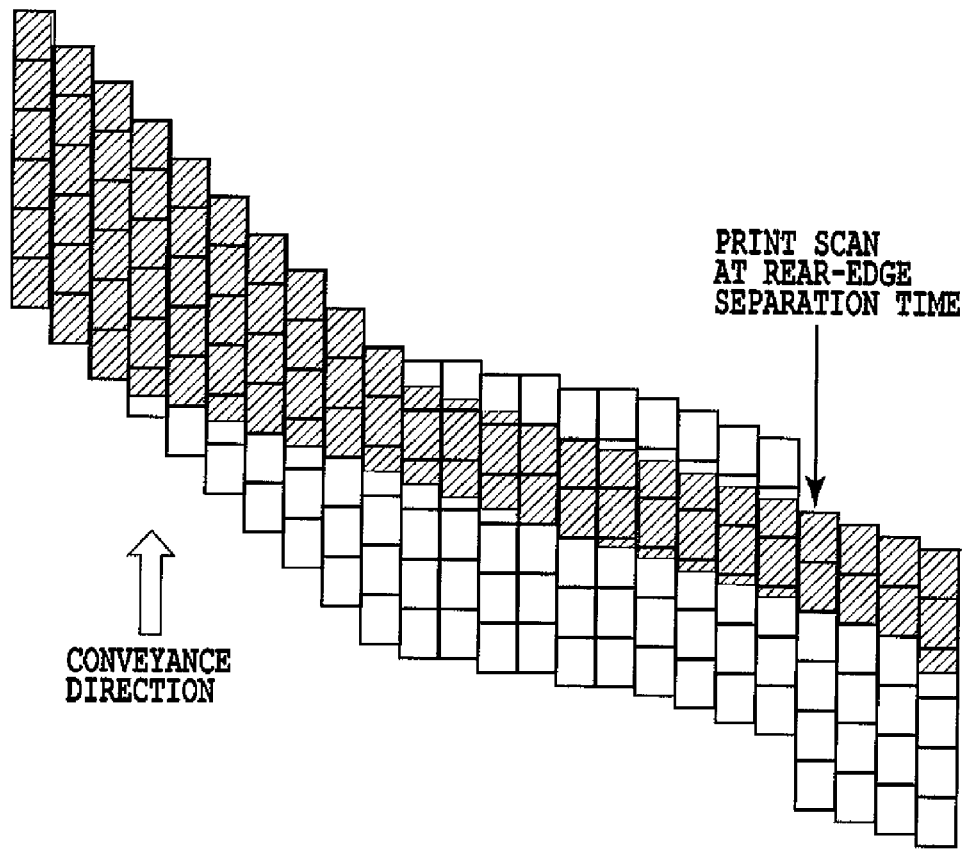

FIGS. 35A and 35B are views explaining forms of scanning and of nozzle usage at the time of normal printing. Here, FIG. 35A shows a state in which a position of printing is being moved from the portion in the vicinity of the front portion of the printing medium to the central portion thereof. FIG. 35B shows a state in which a position of printing is being moved from the central portion of the printing medium to the portion in the vicinity of the rear portion of the printing medium. In FIGS. 35A and 35B, a region corresponding to all of 768 nozzles is shown in the up-and-down directions, and a hatched portion of the region indicates the nozzle region to be used. Moreover, FIGS. 35A and 35B each shows the state in which the printing medium is being conveyed, from left to right of FIGS. 35A and 35B. The movement is represented by showing the nozzle columns as being shifted for every scan.

As shown in FIG. 35A, for printing on the front portion, at the beginning (the left side portion in FIG. 35A), print is made in such a manner that print scan is carried out by using 256 nozzles positioned at the downstream side in the conveyance direction, while conveyance corresponding to 32 nozzles (=256/8) between the print scans, is repeated. Then, the number of nozzles to be used is gradually increased, and the amount of conveyance is changed accordingly. After printing on the front portion is completed (the position of printing is moved to the central portion), print is made in such a manner that a series of scanning by using all of 768 nozzles, and conveyance corresponding to 96 (=768/8) is repeated.

As shown in FIG. 35B, during the time when the position of printing is being moved to the rear portion, the print scan is performed in such a manner that the nozzle-use range is gradually narrowed to make a print on the rear portion from a state (in the left side portion of FIG. 35B) in which print has been made on the central portion, while the printing medium is conveyed by an amount appropriate for each scan. Then, when the position of printing reaches the rear portion, that is, after the rear edge of the printing medium is beyond the conveying roller M3060, print is made in such a manner that the print scan is carried out by using 256 nozzles at the downstream side in the conveyance direction, while conveyance, which corresponds to 32 nozzles between the print scans, is repeated.

The timing at which the nozzle restriction for the rear portion is started can be determined on the basis of the timing at which the PE sensor E0007 detects the rear edge of the printing medium. In other words, on the basis of this timing detected by the PE sensor E0007, the printing apparatus recognizes the time (a rear-edge separation time) when the rear edge of the printing medium separates from a position where the printing medium is held between the conveying roller M3060 and the pinch roller M3070. Then, printing on the rear portion can be started from "print scan at the rear-edge separation time" shown in FIG. 35B. This makes it possible to suppress occurrence of unevenness due to an impact which tends to occur at the instant when the printing medium is released from the restraint by the conveying roller M3060 and the pinch roller M3070.

Referring back to FIG. 33, when the monochrome-image printing mode is recognized in step S100, the entire-surface nozzle-restriction printing is executed. In this example, in a case where the entire-surface nozzle-restriction printing is executed, it is determined that printing (12-pass printing) is performed by scanning 12 times by using 192 continuously-arranged nozzles for printing on the front and rear portions and on the central portion of the printing medium. Here, for printing on the front and rear portions, used is the area Em' including 192 continuously-arranged nozzles shown in the left portion of FIG. 32. However, for printing on the central portion, the region to be used is not fixed, and any one of the regions Em0 to Em3 is used for each page included in a print job. It should be noted that 12-pass printing means that the print scan (scanning) is performed 12 times on one image region of the printing medium at the time of multi-pass printing. Specifically, in this case, nozzles (192 nozzles) to be used are divided into 12 nozzle groups, and the similar mask pattern as that mentioned above is applied to each of these nozzle groups to perform print scan, while the conveyance of the printing medium, which corresponds to the length of the relevant divided region between the print scans, is carried out.

In a case of the entire-surface nozzle-restriction printing, first, in step S121, a page counter for counting the number of paper sheets on which print is made according to the print job is incremented by +1. Then, in step S123, a region involved in printing on the central portion of the printing medium of the relevant page, is set on the basis of the count value. For example, in a case of 4N-th page (N is a natural number), the region Em0 positioned at the lowermost downstream side in the conveyance direction can be used. For the 4N+1-th page, the region Em2 positioned at the second region from the lowermost downstream side in the conveyance direction can be used. For 4N+2-th page, the region Em2 can be used. Moreover, for a 4N+3-th page, the region Em3 can be used.

Next, suitable ejection data corresponding to the nozzle range to be used for printing on the front portion, the central portion and the rear portion of the printing medium is created (step S125), and a printing operation for one page of printing medium is executed (step S127). Then, the printing apparatus determines whether a print job is completed after every print on one page (step S129). When there is data on a next page in the print job, the operation returns to step S121 to repeat the series of aforementioned steps. When data on a next page is not present, this process is completed.

An operation performed at the time of the entire-surface nozzle-restriction printing, will be explained in more detail by using FIGS. 36A to 36C, FIGS. 37A and 37B, and FIGS. 40A and 40B.

Figure 36A:
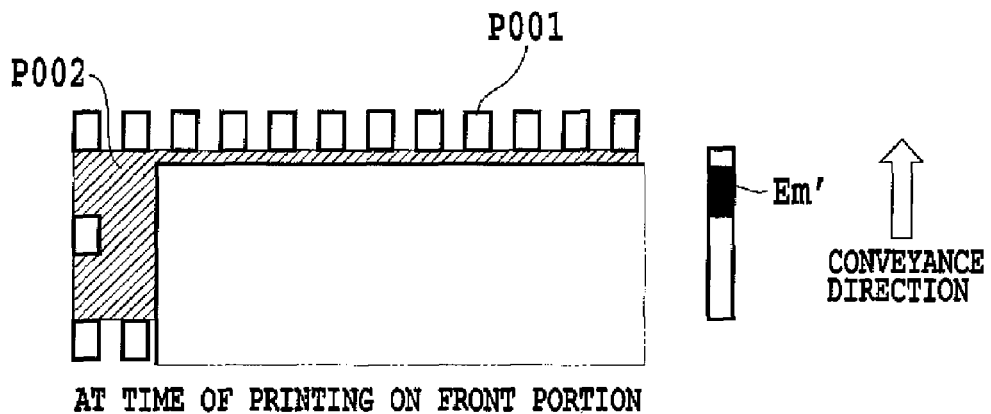
FIGS. 36A to 36C are schematic views each explaining an operation performed when entire-surface nozzle-restriction printing is performed in the process in FIG. 33.
Figure 36B:
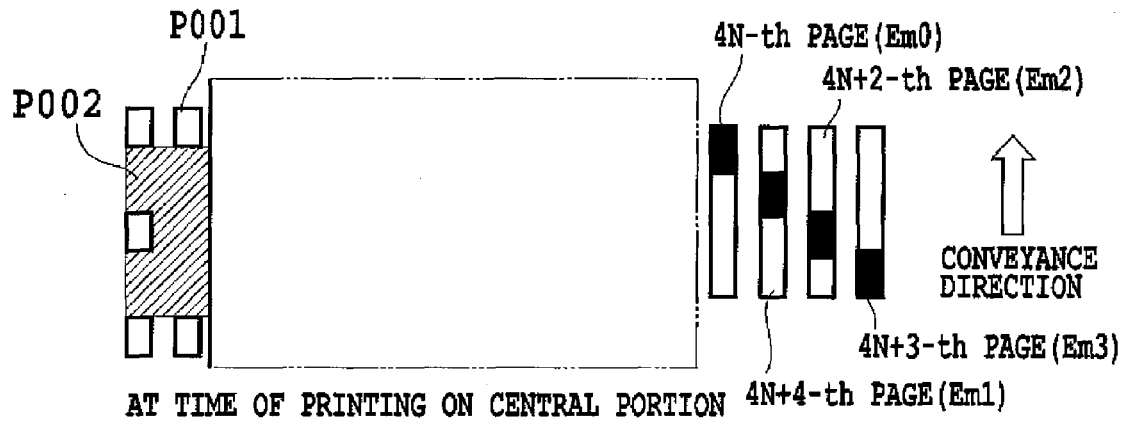
Figure 36C:
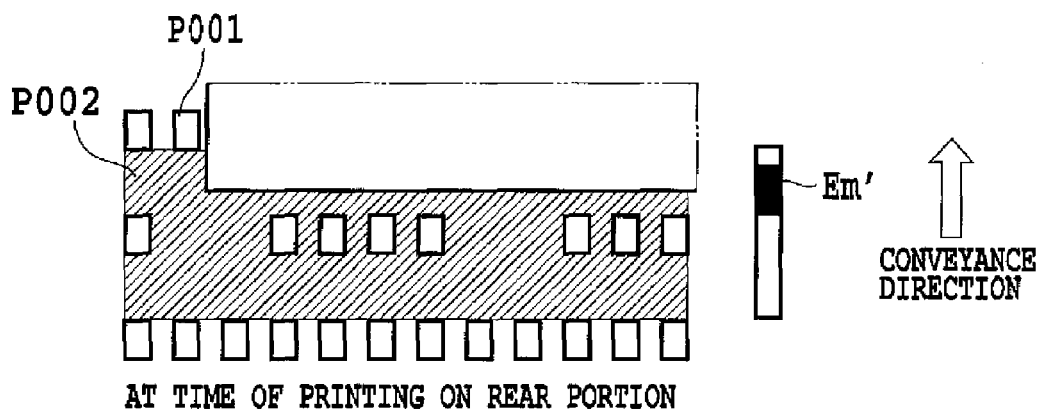

For printing on the front and rear portions, used are 192 nozzles which are included in the region Em', and which are biased inward by 64 nozzles from the lowermost downstream end portion in the conveyance direction of the recording medium, as shown in each of FIGS. 36A and 36C. Moreover, for printing on the central portion of the printing medium, the regions Em0 to Em3 are switched for every page to be used as shown in FIG. 36B. In these cases, no ink is ejected on the ribs P001, as in the case of normal printing.

FIGS. 37A and 37B to FIGS. 40A and 40B are views for explaining specific forms of scanning and nozzle usage on the 4N-th page to 4N+3-th page at the time of the entire-surface nozzle-restriction printing operation, respectively. FIGS. 37A, 38A, 39A and 40A each shows show a state in which a position of printing is being moved from the portion in a vicinity of the front portion to the central portion of the printing medium, and FIGS. 37B, 38B, 39B and 40B each show a state in which a position of printing is being moved from the central portion to the portion in a vicinity of the rear portion of the printing medium. In FIGS. 37A to 40B, the region corresponding to all of the 768 nozzles is shown in the up-and-down directions, and a hatched portion of the region indicates the nozzle region to be used. Moreover, FIGS. 37A and 37B to FIGS. 40A and 40B each show the state in which the printing medium is being conveyed, from left to right of each figure. The conveyance is represented by showing the nozzle columns as being shifted for every scan.

Figure 37A:
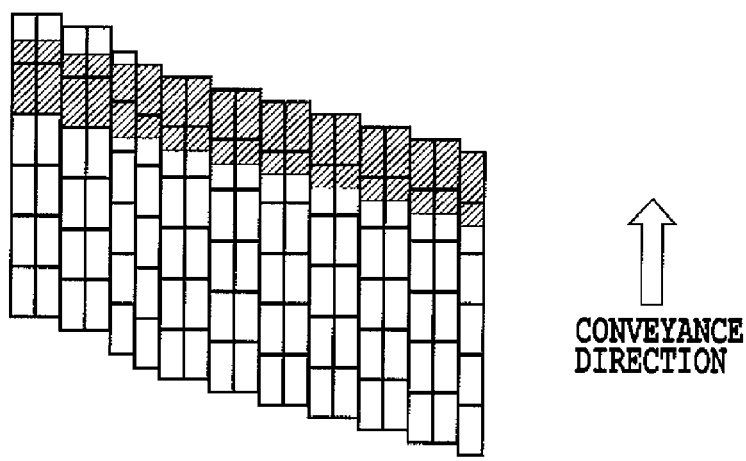
FIGS. 37A and 37B are schematic views each explaining an operation performed when the entire-surface nozzle-restriction printing is performed in the process in FIG. 33.
Figure 37B:
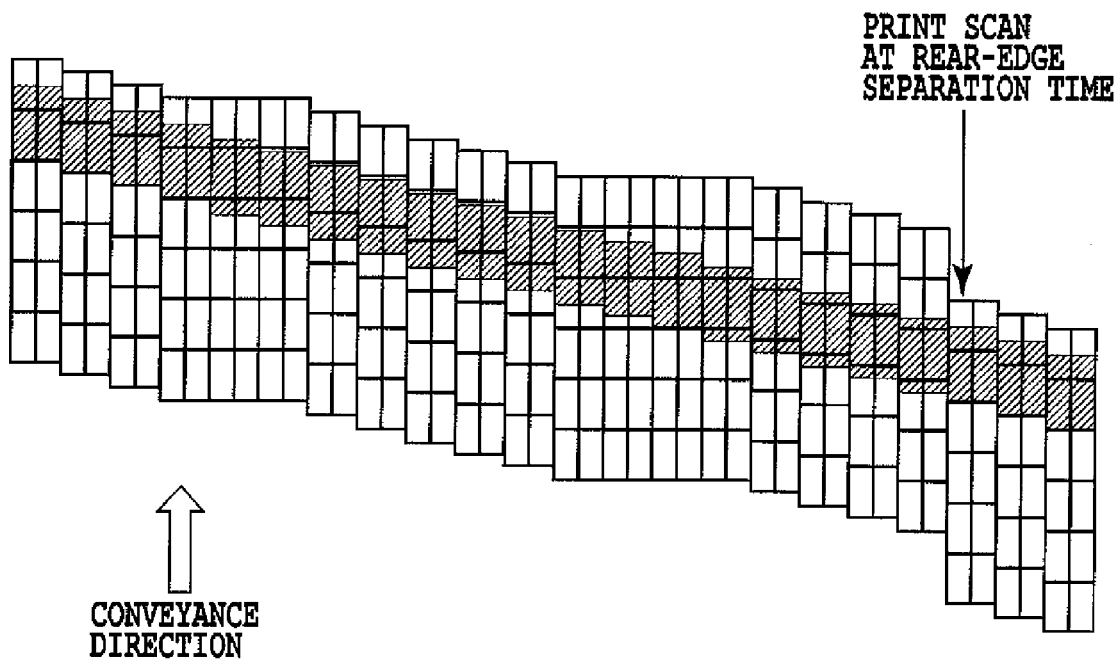
Figure 38A:
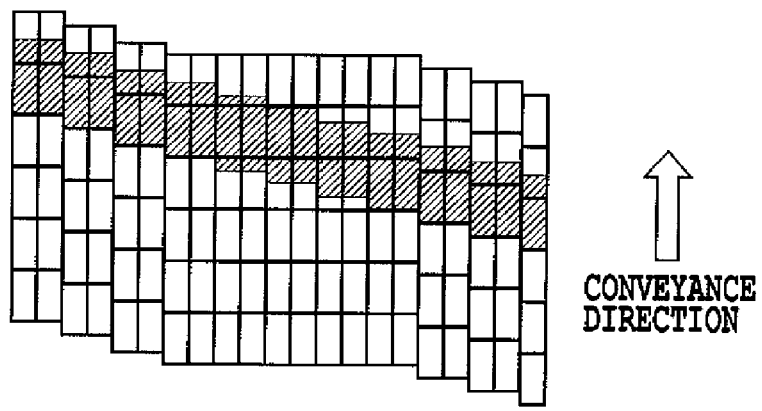
FIGS. 38A and 38B are schematic views each explaining an operation performed when the entire-surface nozzle-restriction printing is performed in the process in FIG. 33.
Figure 38B:
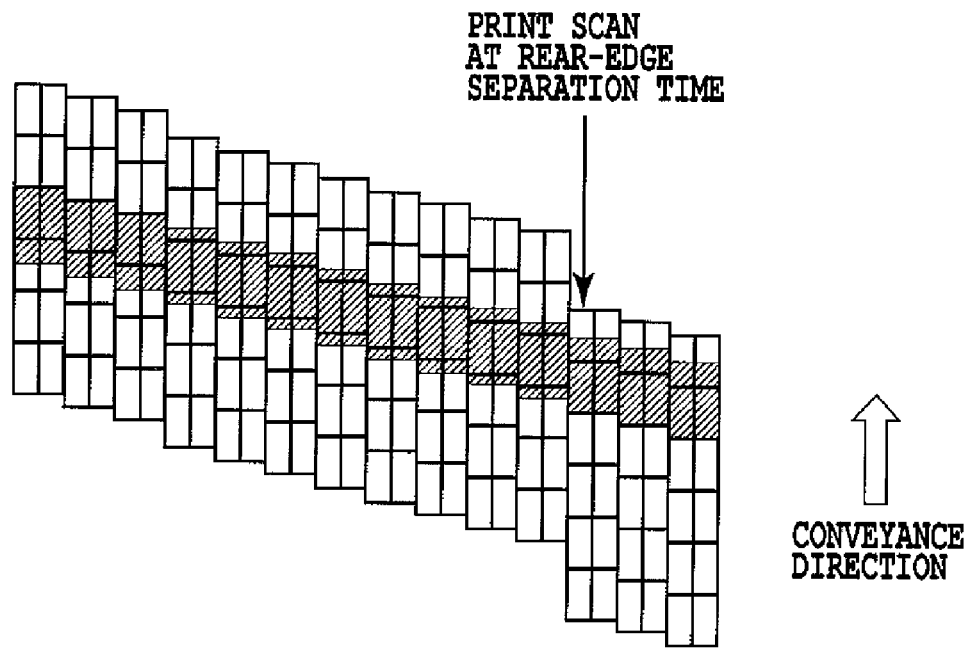
Figure 39A:
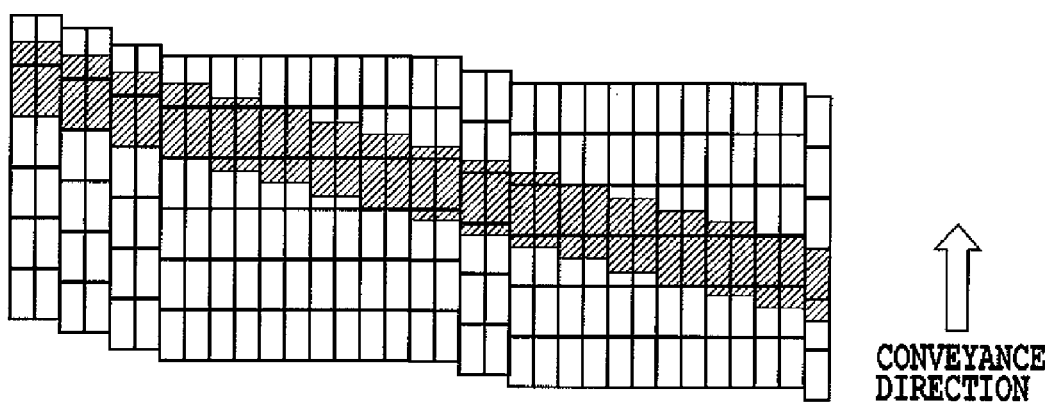
FIGS. 39A and 39B are schematic views explaining an operation performed when the entire-surface nozzle-restriction printing is performed in the process in FIG. 33.
Figure 39B:
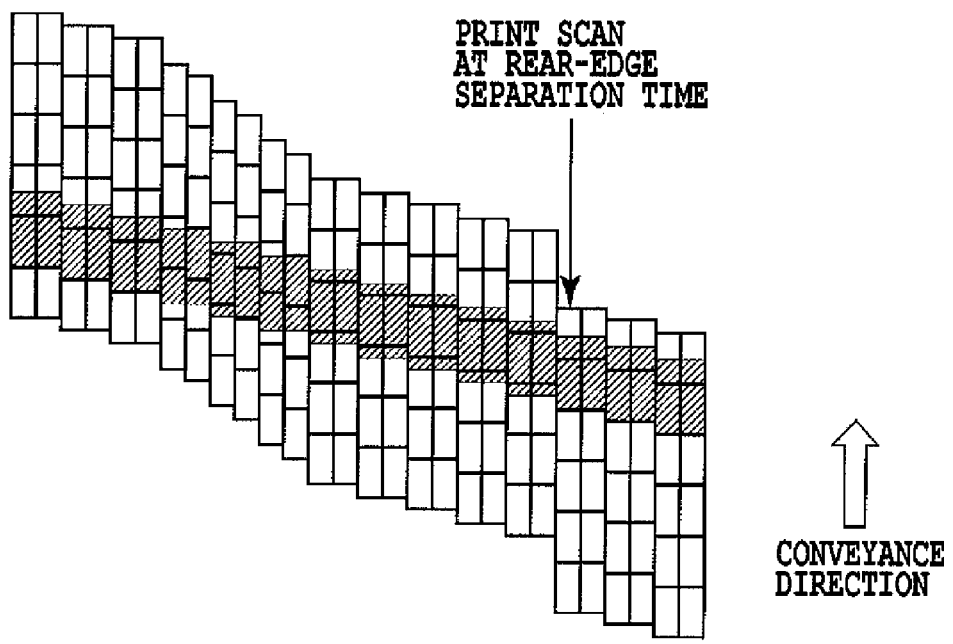
Figure 40A:
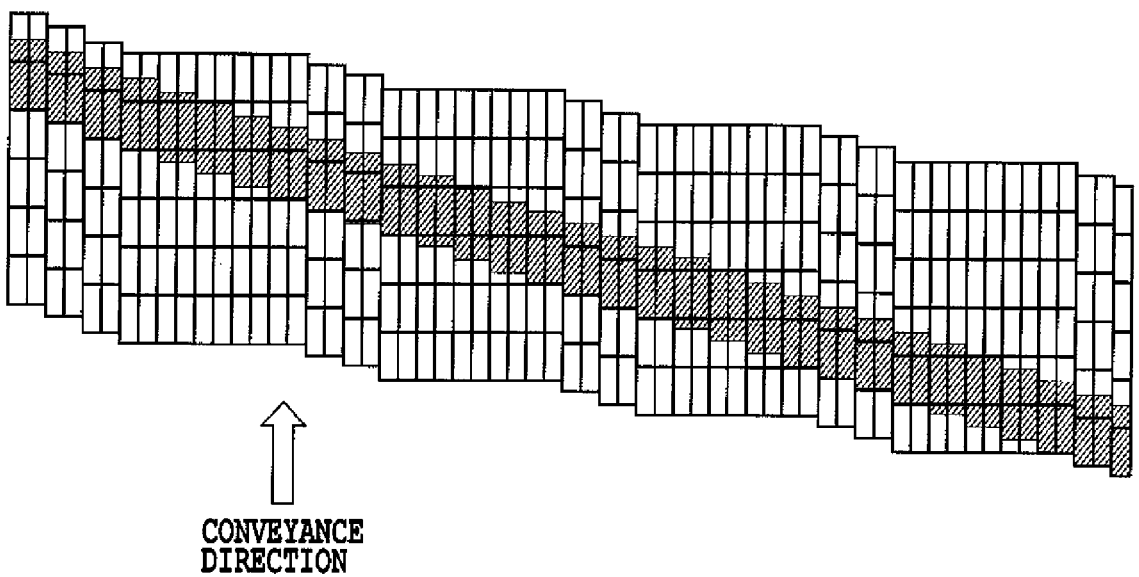
FIGS. 40A and 40B are schematic views each explaining an operation performed when the entire-surface nozzle-restriction printing is performed in the process in FIG. 33.
Figure 40B:
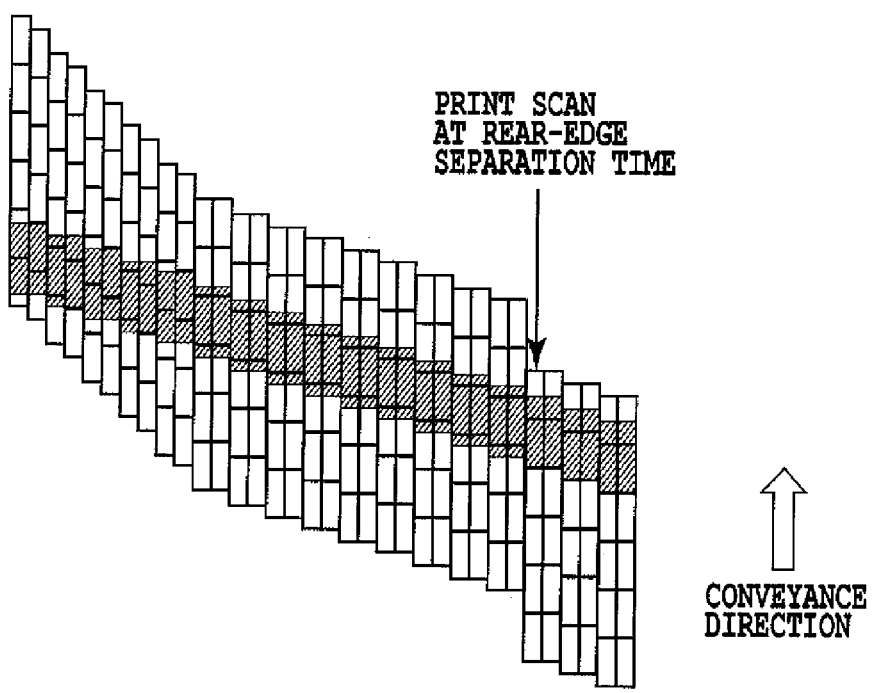

Note that FIGS. 37A and 37B show a case where print is made on the 4N-th page, and the nozzle region, which is used for printing on the central portion of the recording medium, is set to be Em0. Similarly, FIGS. 38A and 38B show a case where print is made on the 4N+1-th page, and the nozzle region, which is used for printing on the central portion of the recording medium, is set to be Em1. FIGS. 39A and 39B show a case where print is made on the 4N+2-th page, and the nozzle region, which is used for printing on the central portion of the recording medium, is set to be Em2. FIGS. 40A and 40B show a case where print is made on the 4N+3-th page, and the nozzle region, which is used for printing on the central portion of the recording medium, is set to be Em4.

As shown in these figures, when printing on the front and rear portions, print is made in such a manner that the print scan is performed on any one of the pages by using 192 nozzles positioned at the downstream side in the conveyance direction, while conveyance, which corresponds to 16 nozzles (=192/12) between the print scans, is repeated. Moreover, for printing on the central portion, print is made in such a manner that the print scan is performed by using 192 nozzles positioned in a set region out of the regions Em0 to Em3, while conveyance, which corresponds to 16 nozzles between the print scans, is repeated. At the time when a position of printing is moved from the front portion to the central portion, print is made while the employed nozzle group is shifted from that of the region Em' to that of the set region. At the time when a position of printing is moved from the central portion to the rear portion, print is made while the employed nozzle group is shifted from that of the set region to that of the region Em'. Incidentally, the timing at which the nozzle restriction for the rear portion is started is determined in the same way as that mentioned above.

According to the aforementioned structure, the nozzle-use range involved in printing is narrowed, or the amount of conveyance of the printing medium is reduced to thereby perform printing in the monochrome-image printing mode. Accordingly, it is possible to suppress the eccentricity-derived unevenness which is likely to be visible particularly on a monochrome image.

Figure 41A:
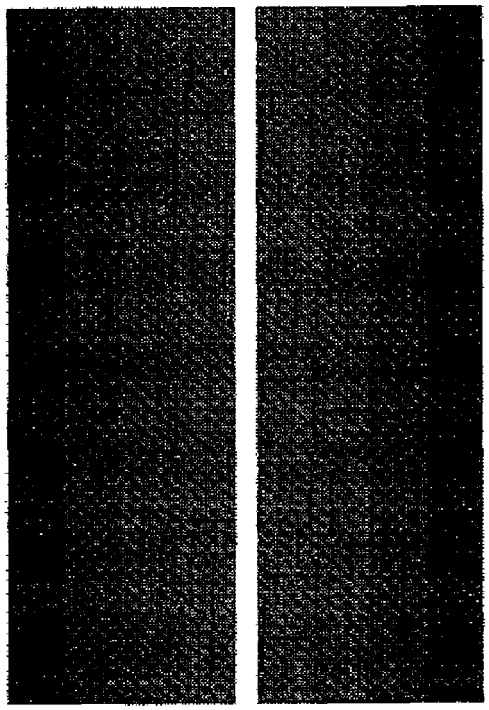
FIGS. 41A and 41B are explanatory views showing printing results in a case where a monochrome image is formed by normal printing, and where the monochrome image is printing with the entire-surface nozzle-restriction printing.
Figure 41B:
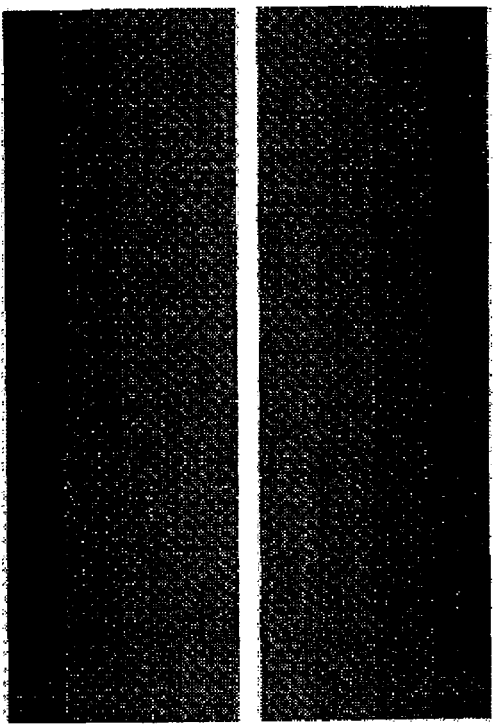

FIGS. 41A and 41B shows results of printing monochrome image in a case where the entire-surface nozzle-restriction printing was not performed, and in a case where the entire-surface nozzle-restriction printing was performed, respectively. Here, in the case where the entire-surface nozzle-restriction printing was not performed, all of the 768 nozzles were used. In the case where the entire-surface nozzle-restriction printing was performed, print was made in such a manner that the print scan was carried out by using 192 nozzles out of the 768 nozzles, while conveyance, which corresponded to the nozzle-use range between the print scans, was carried out. Moreover, glossy paper was used as the printing medium, in a condition that the diameter of a cross-section of the conveying roller was 11.847 mm, and that amplitude of variations in the amount of conveyance was 4 μm due to eccentricity of the conveying roller in a case where the amount of conveyance corresponded to 64 nozzles.

As is clear from FIG. 41A, when the entire-surface nozzle-restriction printing was not performed, eccentricity-derived unevenness is recognized in the image portions respectively having various densities. In contrast, as is clear from FIG. 41B, when the entire-surface nozzle-restriction printing was performed, little eccentricity-derived unevenness is visible in any of the image portions with any density.

In the above example, the nozzle-use region in the entire-surface nozzle-restriction printing is not fixed, but is switched from one to another for every page. Thus, it is possible to reduce variation in the number of nozzle-ejection operations.

Additionally, it is possible to count pages for every print job. However, it is preferable that a counter region is formed in an involatile memory such as EEPROM and the like to accumulatively manage the count value, and that the contents of the accumulated count value is held even when the apparatus is powered-off. Accordingly, regardless of the number of paper sheets on which print is made, and which is designated by each of various print jobs present at various timings in the course of time, it is made possible to achieve the substantially-equal use of the regions Em0 to Em3 for printing on the central portion of the printing medium. In other words, it is possible to reduce variation in the number of nozzle-ejection operations more effectively.

Although the above description has been provided for the regions Em0 to Em3 involved in printing of the central portion as being shifted for every page, the regions may be shifted for every multiple pages. Moreover, the switching of the restricted positions for nozzle use may be controlled with a dot count.

Figure 42:
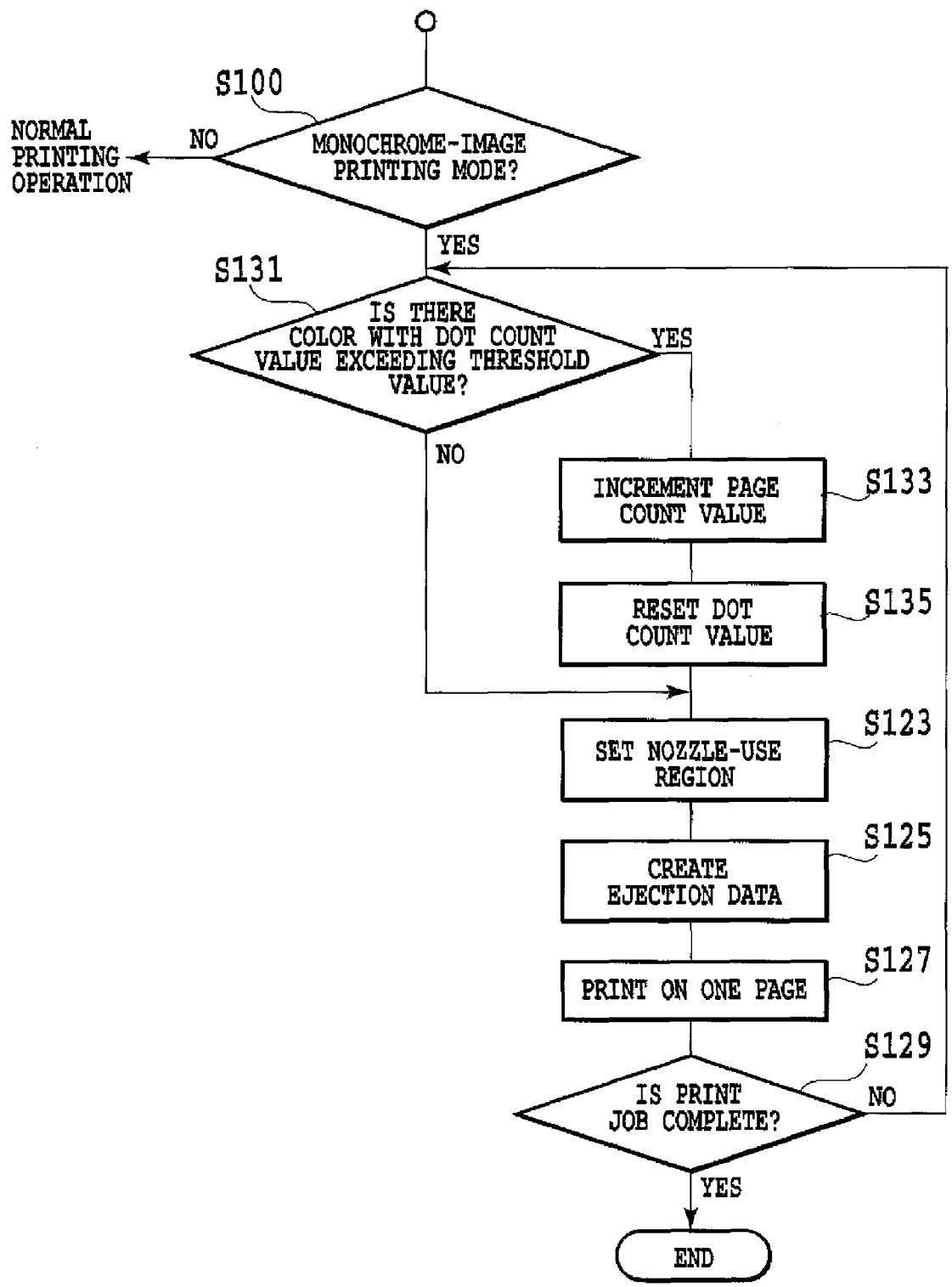
FIG. 42 is a flowchart showing the principal part of another example of a printing process executed in a printing system of the embodiment.
Figure 44:
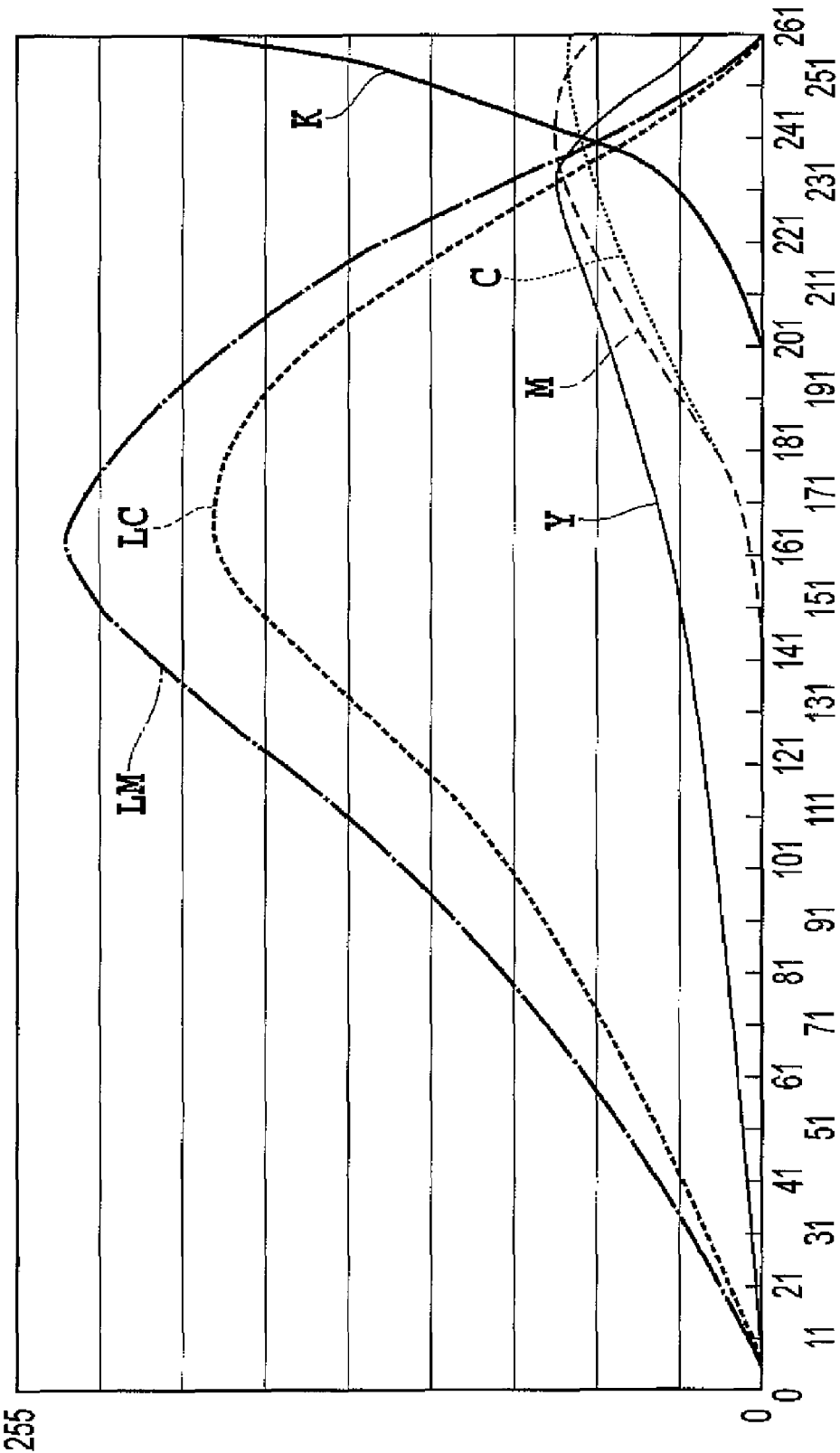
FIG. 44 is an explanatory view showing contents of a color-conversion LUT in a case where an achromatic portion is formed on a printing medium by using inks of a plurality of colors.
Figure 45:
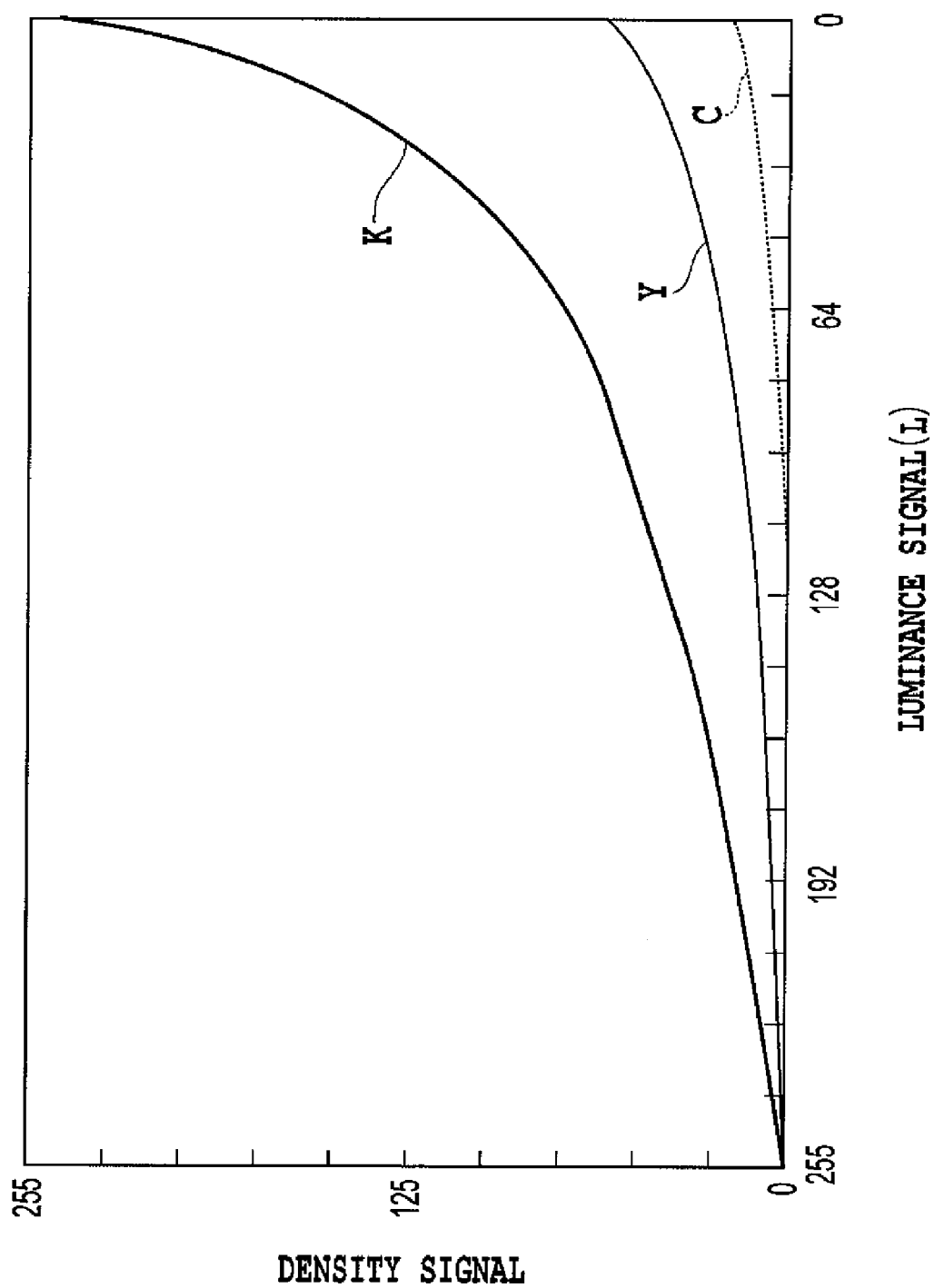
FIG. 45 is an explanatory view showing contents of a color-conversion LUT in a case where an achromatic portion is formed on a printing medium by using ink K dominantly.
Figure 46B:
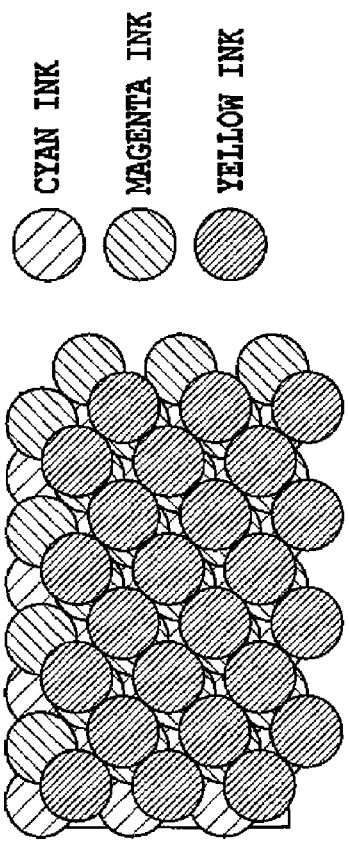
FIGS. 46A and 46B are schematic views showing dot arrangement in a case where an image having uniform density is printed by using ink K dominantly, and dot arrangement in a case where an image having uniform density is printed by using inks of three colors of C, M and Y, respectively.
Figure 46A:
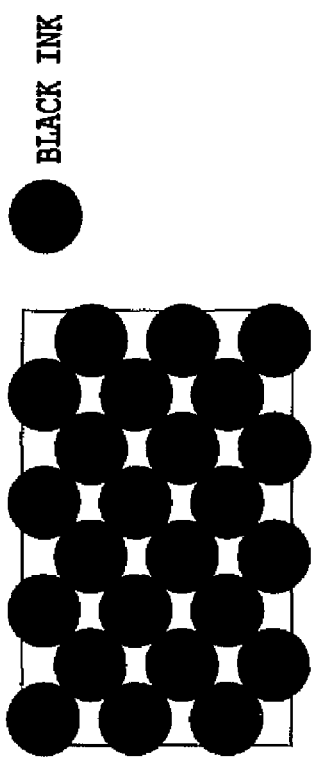
Figure 47B:
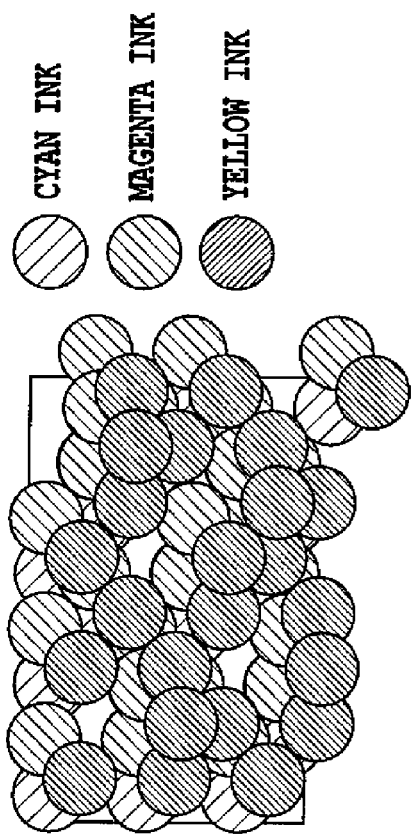
FIGS. 47A and 47B are explanatory views each showing dot arrangement at the time when deviation in dot-landing positions occurs in a case where the same image as that in FIGS. 23A and 23B is formed.
Figure 47A:
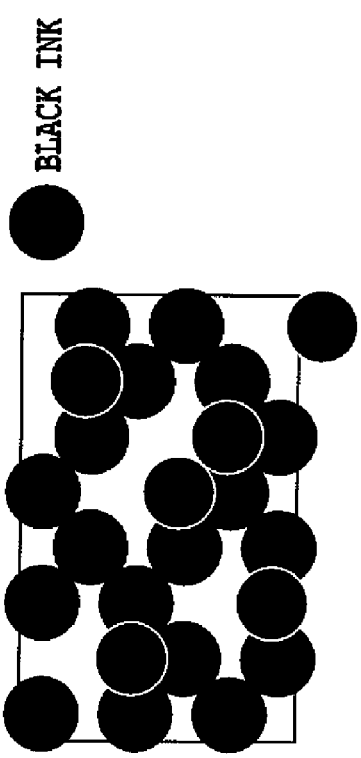

FIG. 42 is a flowchart showing the principal part of a printing procedure at the time when the dot count is used. In this process, determination on a dot count value is made in step S131 after the monochrome-image printing mode is recognized in step S100. Here, the dot count value is an accumulated value of the number of nozzle-ejection operations for each color ink. In step S131, it is determined whether a dot count value of any of the colors exceeds a predetermined threshold value as shown in FIG. 43, for example. In a case where the dot count value is determined to exceed the threshold value, the operation proceeds to step S133 to increment the page counter by +1, and to further reset the dot count value in step S135. Thereafter, the operation proceeds to a process, in step S123, of setting a nozzle-use region. Furthermore, in a case where it is determined in step S131 that any of the dot count values of any color does not exceed the threshold value, the operation immediately returns to step S123.

In the aforementioned control procedure, the regions Em0 to Em3, which are involved in printing on the central portion, are not always switched for every page. Instead, in a case where a dot count value of even one of the colors exceeds the threshold value, the page count value is increased to switch the regions. Thus, by using the dot count value, it is made possible to reduce variation in the number of accumulated ejection operations even in a case where print is made with a different duty for every page.

Moreover, in the above explanation, only the number of paper sheets on which print is made by monochrome-image printing is supposed to be counted. However, an effect can be expected by counting the number of paper sheets on which print is made in various printing modes including normal printing. The reason thereof is that such counting is also considered to make it possible to generally reduce concentration or bias in the nozzles to be used for printing a monochrome image. Moreover, the number of times when a print job is received may be counted, instead of the number of paper sheets to be printed. In this case, although the various numbers of paper sheets to be printed are considered to be included in each print job, the numbers of accumulated ejection operations are substantially equalized as numerous print jobs are processed over a long period of time. Thus, it is possible to generally reduce bias in the nozzles to be used.

Moreover, for example, in a case where multiple printing regions each with a space (a non-printing region) interposed in between are present in one page in the conveyance direction, it is possible to switch the nozzle-use regions for every printing region, instead of switching the nozzle-use regions for every page. In other words, such a form that the nozzle-use regions are switched in one page may be used. In this case, the aforementioned dot count may be used in combination.

Furthermore, the form of switching of nozzle-use ranges is not limited to the sequential switching in which the nozzle-use regions are switched in a regular order of Em0, Em1, Em2 and Em3. The first region to be used may be that other than Em0. Alternatively, for example, it is possible to use a form of switching in which one of the nozzle-use regions Em0 to Em3 is randomly selected.

In addition, it is possible to appropriately set the nozzle range to be used for printing on the front and rear portions to be a range which does not cause such inconvenience that ink is ejected onto the ribs. Specifically, since arrangement positions of the ribs P001, and the presence or absence of the ribs may be determined in various ways, it is possible to appropriately determine the nozzle range to be used for printing on the front and rear portions accordingly. Then, as in the aforementioned embodiment, the nozzle range to be used for printing on the front and rear portions may be determined separately from the nozzle range to be used for printing on the central portion. Alternatively, the nozzle range can be used in a state where any one of Em0 to Em3 to be used for printing on the central portion is fixed, or in which the Em0 to Em3 are switched. Moreover, for printing on one sheet of printing medium, the same range (a block) may be used for printing both on the front and rear portions and on the central portion. Furthermore, different ranges may be used for printing respectively on the front portion and on the rear portion, and the numbers of nozzles to be used (each of sizes of continuously arranged ranges) may be different from one another.

Additionally, since the eccentricity-derived unevenness is markedly conspicuous at the time of printing the achromatic monochrome image in which ink K is used dominantly, the entire-surface nozzle-restriction printing is determined to be executed in a case of the gray-scale printing in the above embodiment. However, even in a case of printing the monochrome image by using inks of other colors dominantly, or in a case of printing a slightly-colored monochrome image (a sepia photograph, and the like), the eccentricity-derived unevenness occurs with a greater or lesser degree of visibility. Generally, in a case of printing such an image that the coverage of the printing medium is low due to the small number of ink colors to be used, the eccentricity-derived unevenness may possibly occur with a greater or lesser degree of visibility. Accordingly, the entire-surface nozzle-restriction printing may be carried out not only in a case of performing the gray-scale printing in which ink K is used dominantly, but also in these printing modes by recognizing them.

MODIFICATION EXAMPLE 1

In the aforementioned example, the entire-surface nozzle-restriction printing is supposed to be uniformly carried out when the achromatic-monochrome-image printing (gray-scale printing) mode is selected. However, even when the gray-scale printing mode is selected, the entire-surface nozzle-restriction printing may not be carried out depending on the condition (for example, a type of printing medium, user setting, and the like). Consequently, in this modification example 1, it is made possible to select a gray-scale printing in which the entire-surface nozzle-restriction printing is not employed, in addition to a gray-scale printing in which the entire-surface nozzle-restriction printing is employed.

(i) Type of Printing Medium

A high-level image quality is demanded for printing media (high-quality glossy paper, low-priced glossy paper, and the like.) to be mainly used for printing a photographic image. On the other hand, image quality of such a high level is not required for plain paper. Accordingly, the required level of image-quality is different depending on the type of printing medium. Thus, an allowable range for eccentricity-derived unevenness can be made different in accordance with the type of printing medium. Specifically, the allowable range for eccentricity-derived unevenness can increased for plain paper as compared to glossy paper and the like.

Consequently, in this example, it is made possible to select, according to the type of printing medium, whether or not to perform the "entire-surface nozzle-restriction printing" used as measures against the eccentricity-derived unevenness. More specifically, the entire-surface nozzle-restriction printing is set in a case where the checkbox D0003 of "gray-scale printing" on the UI screen in FIG. 27 is checked, and high-quality glossy paper or low-priced glossy paper is selected as the "type of paper" shown in D0001. That is, in a case where print is made on high-quality glossy paper and on low-priced glossy paper, the nozzles to be used are restricted to thereby reduce the eccentricity-derived unevenness as much as possible. On the other hand, in a case where the checkbox D0003 of "gray-scale printing" is checked, and plain paper is selected as the "type of paper," the normal printing is set instead of the entire-surface nozzle-restriction printing. That is, in a case of printing on the plain paper, the nozzle restriction is not performed, and all of the nozzles are used. Accordingly, print is made with the printing speed being prioritized. Note that the normal printing is set in a case where the checkbox D0003 of "gray-scale printing" on the UI screen in FIG. 27 is not checked. Table 1 provides a summary of the aforementioned matters.

TABLE 1

| PRESENCE OR ABSENCE OF CHECKED CHECKBOX OF "GRAY-SCALE PRINTING" | TYPE OF PRINTING MEDIUM | PRINTING-CONDITION SETTING |
| --- | --- | --- |
| PRESENT | GLOSSY PAPER | ENTIRE-SURFACE NOZZLE-RESTRICTION PRINTING |
| PRESENT | PLAIN PAPER | NORMAL PRINTING |
| ABSENT | GLOSSY PAPER, PLAIN PAPER | NORMAL PRINTING |

(ii) User Setting

The explanation will be given of the structure in which the user can freely select any one of the gray-scale printing mode in which the entire-surface nozzle-restriction printing is employed, and the gray-scale printing mode in which the entire-surface nozzle-restriction printing is not used.

In order to implement this structure, a checkbox X for executing the "entire-surface nozzle-restriction printing" is provided to the UI screen in FIG. 27. The checkbox X is structured so that the checkbox X is selectable only when the checkbox D0003 of "gray-scale printing" is checked. Specifically, when the checkbox D0003 of "gray-scale printing" is not checked, the checkbox X is grayed out, and cannot be selected. In contrast, in a case where the checkbox D0003 of "gray-scale printing" is checked, and where the checkbox X is also checked, the "entire-surface nozzle-restriction printing" is executed. In other words, the "entire-surface nozzle-restriction printing" can be executed regardless of the type of printing medium, when the user so wishes. This structure makes it possible to expand a range of selection that the user can make, and meet a wide spectrum of user needs.

Second Embodiment of Printing Operation

In the first embodiment, the entire-surface nozzle-restriction printing is performed only when the monochrome-image printing (gray-scale printing) mode is executed. However, even in a case where the color image is printed, the eccentricity-derived unevenness occurs with a greater or lesser degree of visibility. The aforementioned printing apparatus allows the user to perform various selection settings for printing. For example, the provided structure makes it possible to select a type of printing medium, and to select a printing mode in which a printing speed is prioritized over printing quality or a printing mode in which the printing quality is prioritized over the printing speed. It can be said that the user generally wishes images of high quality to be printed in a case where the higher-quality printing medium is selected, and where a mode for higher-quality printing is selected. Accordingly, in the aforementioned case, it is strongly desired that the eccentricity-derived unevenness be suppressed as much as possible.

Consequently, in this embodiment, for printing an image other than the monochrome image, it is determined whether to perform the entire-surface nozzle-restriction printing or normal printing, according to the printing quality. That is, when the high-quality printing mode is selected, the eccentricity-derived unevenness is viewed as less evident by performing the entire-surface nozzle-restriction printing. Thus, it is made possible to obtain a print-out of high quality that the user wishes to obtain.

An explanation will be hereinafter given of a case where the user selects "high-quality glossy paper" on a menu display D0001 for selecting the type of printing medium, and does not check the checkbox D0003, that is, in a case where color-image printing is performed. Incidentally, a color-conversion LUT for color-image printing is used for the LUT for an inputted-signal value.

When the user selects an item (for example, "standard") other than "fine" with a relevant one of radio buttons on the display portion D0002 in FIG. 27, the normal printing is carried out. Specifically, for printing on the central portion of the printing medium, 8-pass printing is performed by using all 768 of the nozzles in each nozzle column. For printing on the front and rear portions, 8-pass printing is performed by using a region Ecf including 256 nozzles shown in the right portion of FIG. 32. The printing operation in this case is the same as that explained in the first embodiment by using FIGS. 34A to 34C and FIGS. 35A and 35B. Furthermore, the reason for narrowing the nozzle-use range for printing on the front and rear portions is the same as that described in the first embodiment.

On the other hand, when the user selects the item of "fine," the entire-surface nozzle-restriction printing is carried out. In this case, the entire range M of each nozzle column, that is, 768 nozzles are divided into four groups, and are used appropriately as shown in the left portion of FIG. 32. Specifically, for printing on the front and rear portions, a used region is the region Em' including 192 nozzles shown in the left portion of FIG. 32, and 12-pass printing is performed. For printing on the central portion, the used region is not fixed, and any one of the regions Em0 to Em3 is used for data on each page, included in the print job, and 12-pass printing is performed. The printing operation in this case is the same as that explained in the first embodiment by using FIGS. 36A to 40B.

Note that the same control process as mentioned above can be used in this embodiment. It is needless to say that the same modification as that of the first embodiment can be added to this embodiment.

2.5 Others

The gist of the present invention is that the narrowing the nozzle-use range and the reduction in the amount of conveyance is carried out in the entire printing region in order to suppress unevenness occurring in the printed image due to the errors in conveying the printing medium. Accordingly, although explanation has been provided in each of the aforementioned embodiments for the printing apparatus capable of achieving marginless printing, this is not essential for the present invention. Moreover, although in the aforementioned embodiments, illustrated are the use of the roller as the conveyance mechanism and periodic variations in the amount of conveyance due to the eccentricity of the conveying roller, the present invention is adaptable regardless of the structure of the conveyance mechanism and of the presence or absence of the periodicity of variations in the amount of conveyance. This is because the accumulated amount of conveyance errors is reduced by narrowing the nozzle-use range and by reducing the amount of conveyance of the printing medium.

Moreover, the number of ink colors, the number of nozzles (printing elements), the narrowing ratio for the nozzle-use range, the reduction ratio for the amount of conveyance of the printing medium, the number of passes for the multi-pass printing, a type of employed mask patterns therefor, and the like, are herein shown merely as examples. Hence, it is needless to say that other conditions can be employed as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-147291, filed May 26, 2006, which is hereby incorporated by reference herein in its entirety.

What is claimed is:

1. An ink jet printing apparatus for printing an image on a printing medium by performing a print scan for making a print while causing a printing head provided with printing element arrays for different colors, in each of the arrays printing elements for ejecting ink are arranged, to scan in a direction different from an arrangement direction of the printing elements with respect to the printing medium, and by conveying the printing medium in a conveying direction intersecting with the direction of the print scan, the apparatus comprising:

a print controller capable of executing a monochrome-image printing mode and a color-image printing mode, in the monochrome-image printing mode, the print scan is performed to effect a print by restricting usable printing elements in a printing element array used for printing a monochrome image to a part of the printing elements arranged continuously, over an entire print region on the printing medium, and in the color-image printing mode, the print scan is performed to effect a print without restricting usable printing elements in a printing element array used for printing a color image to a part of the printing elements, on at least a part of the printing region of the printing medium; and a shifting unit for shifting a position of the continuously-arranged printing elements as the part of the usable printing elements in the monochrome-image printing mode, wherein the monochrome image is an achromatic monochrome image, the printing head has a printing element array for ejecting an achromatic ink, and a printing element array for ejecting a chromatic ink, and the achromatic monochrome image is printed by ejecting the achromatic ink and the chromatic ink from the printing head.

2. An ink jet printing apparatus as claimed in claim 1, wherein the print controller is capable of executing a second monochrome-image printing mode in which the print scan is performed to effect a print without restricting the usable printing elements in the printing element array used for printing a monochrome image to the part of the printing elements, on at least a part of the printing region of the printing medium.

3. An ink jet printing apparatus as claimed in claim 2, wherein the print controller (A) executes the monochrome-image printing mode in a case where the monochrome-image printing is designated, and where a first type of printing medium is designated as the type of the printing medium, and (B) executes the second monochrome-image printing mode in a case where the monochrome-image printing is designated, and where a second type of printing medium is designated as the type of the printing medium.

4. An ink jet printing apparatus as claimed in claim 2, wherein the part of the printing region of the printing medium is a central portion of the printing medium in the conveying direction of the printing medium, and in the second monochrome-image printing mode, the print scan is performed to effect the print without restricting the usable printing elements to the part of the printing elements on the central portion, while the print scan is performed to effect the print by restricting the usable printing elements to the continuously-arranged printing elements being the part of the usable printing elements on at least one of a front portion and a rear portion of the printing medium.

5. An ink jet printing apparatus as claimed in claim 1, wherein the part of the printing region of the printing medium is a central portion of the printing medium in the conveying direction of the printing medium, and in the color-image printing mode, the print scan is performed to effect the print without restricting the usable printing elements to the part of the printing elements on the central portion, while the print scan is performed to effect the print by restricting the usable printing elements to the continuously-arranged printing elements being the part of the usable printing elements on at least one of a front portion and a rear portion of the printing medium.

6. An ink jet printing apparatus as claimed in claim 1, wherein the print controller determines whether the monochrome-image printing mode is executed, according to at least one of conditions including a type of printing medium and quality of an image to be printed.

7. An ink jet printing apparatus as claimed in claim 1, wherein the shifting unit shifts the position every page or every multiple pages of the printing media.

8. An ink jet printing apparatus as claimed in claim 1, further comprising a counter which counts the number of used printing media, wherein, according to a counted value by the counter, the shifting unit shifts the position.

9. An ink jet printing apparatus as claimed claim 1, further comprising a managing unit which manages an accumulated value of the number of ink ejection operations executed by the printing head, wherein, after the accumulated value of the number of ink ejection operations exceeds a predetermined threshold, the shifting unit shifts the position at a timing when a page of a printing medium is changed to another one.

10. An ink jet printing apparatus as claimed in claim 1, wherein the shifting unit shifts the position within one page.

11. A method of ink jet printing an image on a printing medium by performing a print scan for making a print while causing a printing head provided with printing element arrays for different colors, in each of the arrays printing elements for ejecting ink are arranged, to scan in a direction different from an arrangement direction of the printing elements with respect to the printing medium, and by conveying the printing medium in a conveying direction intersecting with the direction of the print scan, the method comprising the step of:

setting a printing mode to be executed from among a plurality of printing modes including a monochrome-image printing mode and a color-image printing mode, in the monochrome-image printing mode, the print scan is performed to effect a print by restricting usable printing elements in a printing element array used for printing a monochrome image to a part of the printing elements arranged continuously, over an entire print region on the printing medium, and in the color-image printing mode, the print scan is performed to effect a print without restricting usable printing elements in a printing element array used for printing a color image to a part of the printing elements, on at least a part of the printing region of the printing medium, wherein a position of the continuously-arranged printing elements as the part of the usable printing elements is shifted according to a predetermined condition in the monochrome-image printing mode, wherein the monochrome image is an achromatic monochrome image, the printing head has a printing element array for ejecting an achromatic ink, and a printing element array for ejecting a chromatic ink, and the achromatic monochrome image is printed by ejecting the achromatic ink and the chromatic ink from the printing head.

12. A printing system including an ink jet printing apparatus for printing an image on a printing medium by performing a print scan for making a print while causing a printing head provided with printing element arrays for different colors, in each of the arrays printing elements for ejecting ink are arranged, to scan in a direction different from an arrangement direction of the printing elements with respect to the printing medium, and by conveying the printing medium in a conveying direction intersecting with the direction of the print scan, and a host apparatus for selecting a printing mode to be executed in the ink jet printing apparatus, the system comprising:

a selector that selects the printing mode to be executed from among a plurality of printing modes including a monochrome-image printing mode and a color-image printing mode, in the monochrome-image printing mode, the print scan is performed to effect a print by restricting usable printing elements in a printing element array used for printing a monochrome image to a part of the printing elements arranged continuously, over an entire print region on the printing medium, and in the color-image printing mode, the print scan is performed to effect a print without restricting usable printing elements in a printing element array used for printing a color image to a part of the printing elements, on at least a part of the printing region of the printing medium;

a unit for executing the printing mode selected by the selector; and a unit for shifting a position of the continuously-arranged printing elements as the part of the usable printing elements in the monochrome-image printing mode, wherein the monochrome image is an achromatic monochrome image, the printing head has a printing element array for ejecting an achromatic ink, and a printing element array for ejecting a chromatic ink, and the achromatic monochrome image is printed by ejecting the achromatic ink and the chromatic ink from the printing head.

* * * * *